(12) United States Patent
Yoshimura et al.

(10) Patent No.: US 6,930,746 B2
(45) Date of Patent: Aug. 16, 2005

(54) METHOD OF SCATTERING FINE PARTICLES, METHOD OF MANUFACTURING LIQUID CRYSTAL DISPLAY, APPARATUS FOR SCATTERING FINE PARTICLES, AND LIQUID CRYSTAL DISPLAY

(75) Inventors: Kazuya Yoshimura, Osaka (JP); Makoto Nakahara, Osaka (JP); Takatoshi Kira, Osaka (JP); Daisuke Ikesugi, Osaka (JP); Akihiko Tateno, Kyoto (JP); Hiroyuki Nakatani, Kyoto (JP); Masaki Ban, Saitama (JP); Hiroshi Murata, Tokyo (JP); Masaaki Kubo, Tokyo (JP)

(73) Assignees: Sekiusi Chemical Co., Ltd., Osaka (JP); Sharp Kabushiki Kaisha, Osaka (JP)

( * ) Notice: Subject to any disclaimer, the term of this patent is extended or adjusted under 35 U.S.C. 154(b) by 155 days.

(21) Appl. No.: 10/459,523

(22) Filed: Jun. 12, 2003

(65) Prior Publication Data

US 2003/0206264 A1 Nov. 6, 2003

Related U.S. Application Data

(62) Division of application No. 09/623,370, filed as application No. PCT/JP99/01021 on Mar. 3, 1999, now Pat. No. 6,618,112.

(30) Foreign Application Priority Data

| Mar. 3, 1998 | (JP) | ............................................. 10/50748 |
| Mar. 31, 1998 | (JP) | ............................................. 10/85401 |
| Mar. 31, 1998 | (JP) | ............................................. 10/86620 |
| Nov. 9, 1998 | (JP) | ........................................... 10/317722 |
| Dec. 15, 1998 | (JP) | ........................................... 10/356738 |

(51) Int. Cl.$^7$ ......................................... G02F 1/1339
(52) U.S. Cl. ..................................... 349/155; 349/187
(58) Field of Search ................................. 349/155, 187

(56) References Cited

U.S. PATENT DOCUMENTS

4,971,829 A    11/1990   Komura et al.

FOREIGN PATENT DOCUMENTS

EP              0257902 A1     3/1988

(Continued)

OTHER PUBLICATIONS

Patent Abstracts of Japan, vol. 1997, No. 06, Jun. 30, 1997 & JP 9 043635 A (NEC Corp.), Feb. 14, 1997.

Primary Examiner—Frank G. Font
Assistant Examiner—Timothy L. Rude
(74) Attorney, Agent, or Firm—Connolly, Bove, Lodge & Hutz LLP

(57) ABSTRACT

The present invention has its object to provide a method of spraying particles by which predetermined quantities of particles can be disposed on specified electrodes, in particular a method of spraying particles by which spacers can be sprayed in interelectrode gaps selectively even in the case of substrates comprising pattern-forming transparent electrodes, such as those used in liquid crystal display devices, and a method of producing liquid crystal display devices of high contrast and high display uniformity by which spacers can be disposed in interelectrode gaps without sacrificing the aperture ratio and by which spacers can be disposed on the substrate without irregularity to attain a uniform cell thickness over the whole substrate, as well as a particle spraying apparatus and a liquid crystal display device.

The present invention provides a method of spraying particles
which comprises applying a voltage of the same polarity as the particle charge polarity to a plurality of electrodes formed on a substrate
and spraying the particles while utilizing the repulsive force operating on the particles,
wherein means is employed for preventing the particles from being forced out of the electrode domain comprising the plurality of electrodes.

28 Claims, 67 Drawing Sheets

FOREIGN PATENT DOCUMENTS

| | | |
|---|---|---|
| JP | 02-301724 A | 12/1990 |
| JP | 03-293328 | 12/1991 |
| JP | 04-204417 | 7/1992 |
| JP | 05-066407 A | 3/1993 |
| JP | 06-067184 | 3/1994 |
| JP | 06-148654 | 5/1994 |
| JP | 09-061837 A | 3/1997 |

Area where no spacer is disposed

METHOD OF SCATTERING FINE PARTICLES, METHOD OF MANUFACTURING LIQUID CRYSTAL DISPLAY, APPARATUS FOR SCATTERING FINE PARTICLES, AND LIQUID CRYSTAL DISPLAY

CROSS-REFERENCE TO RELATED APPLICATION

The present application is a Divisional application of Ser. No. 09/623,370 filed Dec. 1, 2000 now U.S. Pat. No. 6,618,112 which is a National Phase Application of PCT/JP99/01021 filed Mar. 3, 1999; which claims priority from Japanese Patent Application JP 10/50748 filed Mar. 31, 1998; Japanese Patent Application JP 10/86620 filed Mar. 31, 1998; Japanese Patent Application JP 10/317722 filed Nov. 9, 1998 and Japanese Patent Application JP 10/356738 filed Dec. 15, 1998.

TECHNICAL FIELD

The present invention relates to a method of spraying particles, a method for producing a liquid crystal display device, a particle sprayer and a liquid crystal display device.

BACKGROUND ART

With the advancement of electronic technology, particles have been put to wide, practical use in various fields. Among such particles, there maybe mentioned particles used as spacers in liquid crystal display devices, for instance.

In one of the fields of application of such particles, liquid crystal display devices, for instance, are widely used in personal computers, portable electronic apparatus and the like. Generally, a liquid crystal display device comprises, as shown in FIG. 75, a liquid crystal layer 7 sandwiched between two paired insulating substrates 1, on which color filters 4, a black matrix 5, transparent electrodes 3, an alignment layer 9 and so on are formed.

The distance between the above paired insulating substrates 1, namely the thickness of the liquid crystal layer, influences the transmittance of light and, therefore, if the liquid crystal layer thickness is not maintained constant all over the display area of a liquid crystal display device, satisfactory display will not be attained. For this reason, spacers 8, for example glass fibers or truly spherical plastic beads, are disposed between the paired insulating substrates so that the liquid crystal layer thickness may be maintained constant all over the display area.

These spacers are dispersed uniformly on the alignment layer, for example, by spraying, together with a compressed gas, from a nozzle (dry spraying) or spraying of a liquid composed of spacers and a volatile liquid (wet spraying) after alignment layer formation. Thereafter, the insulating substrate is paired with a counterpart insulating substrate for panel alignment and a liquid crystal, for example a nematic liquid crystal, is filled into the space between the paired insulating substrates with spacers sandwiched therebetween.

When, however, spacers are disposed also on pixel electrodes within the display area, light leakage occurs from such spacers and the substantial aperture ratio is thereby reduced, so that such problems as display unevenness and reduced contrast arise.

For solving such problems as mentioned above, it is only necessary to dispose spacers only in those electrode gaps which are nondisplay areas, namely only at sites of a black matrix, which is constituted of a light shield layer. The black matrix is provided for the purpose of improving the display contrast of the liquid crystal display device and, in the case of TFT type liquid crystal display devices, for the purpose of preventing their elements from erroneously operating in response to external light.

For TFT type liquid crystal display devices, a technology of disposing spacers at sites corresponding to the black matrix, namely at sites other than display pixel sites, is disclosed in Japanese Kokai Publication Hei-04-256925 which comprises maintaining the gate electrode and drain electrode at the same electric potential in the step of spraying spacers. Further, Japanese Kokai Publication Hei-05-61052 discloses a method comprising applying a positive voltage to the circuit electrodes and charging spacers negatively and spraying them by dry method. In these technologies, it is intended to control spacer disposition by applying a voltage to electrodes formed on the substrate.

However, they have a problem. Namely, application of a voltage to the substrate having thin film transistors (TFTs) formed thereon, for the purpose of controlling the spacer disposition, may lead to destruction of elements by that voltage, hence to failure to function as a liquid crystal display device.

There is another problem. Namely, such technologies as mentioned above cannot be employed in STN (supertwisted nematic) type liquid display devices since the sites corresponding to the black matrix are spaces among transparent electrodes.

On the other hand, as a technology of disposing spacers in spaces between stripe-form transparent electrodes constituted by disposing a plurality of linear transparent electrodes in parallel on a substrate, as in STN type liquid crystal display devices, there are disclosed, in Japanese Kokai Publication Hei-03-293328 and Japanese Kokai Publication Hei-04-204417, methods of producing liquid crystal display devices which comprise charging spacers either positively or negatively and applying a voltage of the same polarity to the transparent electrodes on the substrate in the step of spacer spraying.

In particular, according to Japanese Kokai Publication Hei-04-204417, a conductor is disposed below the electrode substrate in a spacer sprayer for positive voltage application so that the velocity of falling of negatively charged spacers may be controlled. It is further disclosed that, for avoiding adhesion of negatively charged spacer particles to the wall of the spray chamber, the chamber should be made of a conductor to enable negative voltage application.

However, when, in practicing these methods, the spacer charge amount and/or the voltage to be applied to electrodes is selected at a low level (voltage value: not higher than about 1,000 V), the repulsive force (repellent force) between spacers and electrodes becomes weak, and the force for shifting spacers to interelectrode spaces becomes insufficient, hence the selectivity toward spacer disposition in electrode-free areas (interelectrode areas) becomes poor, with the result that a number of spacers are disposed also on each electrode, as shown in FIG. 76.

Conversely when the spacer charge amount and/or the voltage to be applied to electrodes is increased (voltage value: about several kilovolts), the repulsive force between spacers and electrodes becomes strong and the selectivity toward spacer disposition in electrode-free areas (interelectrode areas) is improved, as shown in FIG. 77.

In this case, however, the repulsive force acts more strongly over the set of electrodes, so that the tendency of spacers to be turned out of the domain of the electrodes increases; as a result, no spacers are disposed at all in the peripheral region of the electrode domain, hence the cell thickness cannot be controlled in the peripheral region of the electrode domain. Although such phenomenon occurs already at a state at which the repulsive force is still weak, the area of spacer-free portions unfavorably and markedly increases as the repulsive force increases.

In Japanese Kokai Publication Hei-08-76132, there is disclosed a method of disposing spacers more selectively as compared with the methods mentioned above. The method comprises charging spacers to be sprayed either positively or negatively, applying a voltage opposite in polarity of the spacer charge to first electrodes provided in areas on the insulating substrate where spacers are to be disposed, and applying a voltage of the same polarity as the spacer charge polarity to second electrodes provided in areas on the insulating substrate where no spacers are to be disposed, to thereby apply a repulsive force and an attractive force between spacers and the electrodes so that the spacers may be disposed either on the first electrodes or on the second electrodes with good selectivity.

This method, however, has a problem in that the contrast is decreased by the occurrence of spacers on the electrodes. Another problem is that when this method is applied to the production of simple matrix type liquid crystal display devices, it is necessary to form electrodes for spacer disposition in addition to the pixel electrodes and the aperture ratio decreases accordingly.

SUMMARY OF THE INVENTION

Accordingly, it is an object of the present invention to solve the above problems and provide a method of spraying particles by which predetermined quantities of particles can be disposed on specified electrodes, in particular a method of spraying particles by which spacers can be sprayed in interelectrode gaps selectively even in the case of substrates comprising pattern-forming transparent electrodes, such as those used in liquid crystal display devices, and a method of producing liquid crystal display devices of high contrast and high display uniformity by which spacers can be disposed in interelectrode gaps without sacrificing the aperture ratio and by which spacers can be disposed on the substrate without irregularity to attain a uniform cell thickness over the whole substrate, as well as a particle spraying apparatus and a liquid crystal display device.

In a first aspect, the present invention provides a method of spraying particles
which comprises applying a voltage of the same polarity as the particle charge polarity to a plurality of electrodes formed on a substrate
and spraying the particles while utilizing the repulsive force operating on the particles,
wherein means is employed for preventing the particles from being forced out of the electrode domain comprising the plurality of electrodes.

In a second aspect, the invention provides a method for producing a liquid crystal display device comprising
spraying spacers onto at least one of a first substrate comprising at least pattern-forming transparent electrodes and having at least one display area and a second substrate to be disposed opposedly above the first substrate
and filling a liquid crystal into the space between both the substrates,
wherein accessory electrodes are provided outside the display area and, in spraying positively or negatively charged spacers onto the substrate, two or more voltages differing in voltage value are applied to respective transparent electrodes
and a voltage is applied to the accessory electrodes as well to thereby control the electric field generated above the transparent electrodes and above the accessory electrodes so as to cause selective spacer disposition only in a predetermined transparent electrode gap among the gaps between respective neighboring transparent electrodes.

In a third aspect, the invention provides a method for producing a liquid crystal display device comprising
spraying spacers onto at least one of a first substrate comprising at least pattern-forming transparent electrodes and a dummy electrode and a second substrate to be disposed opposedly above the first substrate
and filling a liquid crystal into the space between both the substrates,
wherein, in spraying positively or negatively charged spacers onto the substrate, two or more voltages differing in voltage value are applied to respective transparent electrodes and a voltage is applied to the dummy electrode as well,
the predetermined transparent electrode gaps in which spacers are to be selectively disposed are provided between respective two neighboring transparent electrodes,
the number of transparent electrodes is even,
and the two or more voltages differing in value are applied in a manner such that when the spacer charge polarity is positive (+), the lowest of the two or more voltages differing in value is applied to the respective two neighboring transparent electrodes between which spacers are to be disposed in the middle,
and when the spacer charge polarity is negative (−), the highest of the two or more voltages differing in value is applied to the respective two neighboring transparent electrodes between which spacers are to be disposed in the middle.

In a fourth aspect, the invention provides a method for producing a liquid crystal display device comprising
spraying spacers onto at least one of a first substrate comprising at least pattern-forming transparent electrodes and a dummy electrode and a second substrate to be disposed opposedly above the first substrate
and filling a liquid crystal into the space between both the substrates,
wherein, in spraying positively or negatively charged spacers onto the substrate, the substrate is disposed in close contact with an earthed conductive stage,
a conductor is provided in a state electrically insulated from the conductive stage,
said conductor being a conductive frame having an opening,
and said conductive frame being disposed on the periphery of the substrate with or without partial overlapping with the substrate periphery,
and wherein a voltage is applied to the transparent electrodes and the conductive frame.

In a fifth aspect, the invention provides a method for producing a liquid crystal display device comprising
spraying spacers onto at least one of a first substrate comprising at least pattern-forming transparent electrodes and an alignment layer and having at least one display area and a second substrate to be disposed opposedly above the first substrate and filling a liquid crystal into the space between both the substrates, wherein, in spraying positively or negatively charged spacers onto the substrate, the substrate is disposed in close contact with an earthed conductive stage, a voltage having the same polarity as the spacer charge polarity is applied to the transparent electrodes on the substrate, a conductor is provided, outside the display area, in a state electrically isolated from the conductive stage and a voltage having the same polarity as the polarity of the voltage applied to the transparent electrodes is applied to the conductor to thereby form almost the same electric field within and without the substrate.

In a sixth aspect, the invention provides a method for producing a liquid crystal display device comprising spraying spacers onto at least one of a first substrate comprising at least pattern-forming transparent electrodes and an alignment layer and having one or more display areas and a second substrate to be disposed opposedly above the first substrate and filling a liquid crystal into the space between both the substrates, wherein, in spraying positively or negatively charged spacers onto the substrate, the substrate is disposed in close contact with an earthed conductive stage smaller in size than the substrate to allow the substrate periphery to be apart from the conductive stage and a voltage of the same polarity as the spacer charge polarity is applied to the transparent electrodes on the substrate.

In a seventh aspect, the invention provides a particle sprayer for disposing charged particles selectively on a substrate having a plurality of electrodes which comprises a nozzle for spraying charged particles onto the substrate, a conductive stage having a fixed position and serving to hold the substrate onto which charged particles are to be sprayed, a plurality of push-up pins for mounting the substrate on and dismounting the substrate from the conductive stage, a probe for applying a voltage identical in polarity with the charged particles to a plurality of electrodes on the substrate disposed on the conductive stage, and a conductor being electrically insulated from the conductive stage, said conductor being a conductive frame provided with an opening smaller in size than the substrate, and said conductive frame being disposed on the top of the substrate disposed on the conductive stage and being applied a voltage of the same polarity as the charged particle polarity thereto.

In an eighth aspect, the invention provides a liquid crystal display device as obtainable by utilizing the method of spraying particles according to the first aspect of the invention.

In a ninth aspect, the invention provides a liquid crystal display device as obtainable by the method for producing a liquid crystal display device according to the second or third aspect of the invention.

In a tenth aspect, the invention provides a liquid crystal display device as obtainable by the method for producing a liquid crystal display device according to the fourth, fifth or sixth aspect of the invention using the particle sprayer according to the seventh aspect of the invention.

projects out from a flat surface facing the substrate on the conductive frame to the dummy electrode for voltage application and wherein the needle terminal (probe) has a certain length and connects a side of the conductive frame and a side of the dummy electrode.

Figure 51:
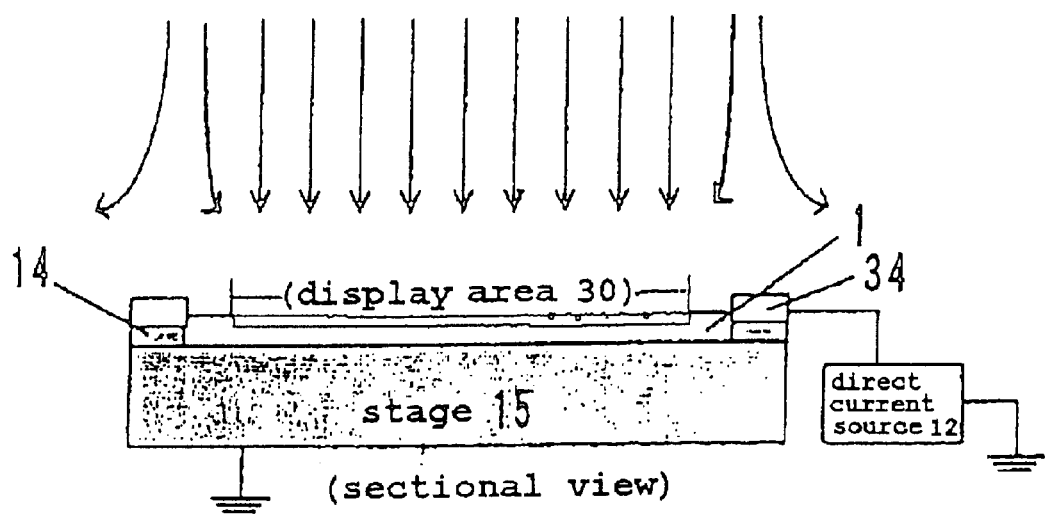

FIG. 51 is a schematic side view illustrating how spacers are sprayed onto the first substrate in an embodiment of the method for producing a liquid crystal display device according to the present invention.

Figure 52:
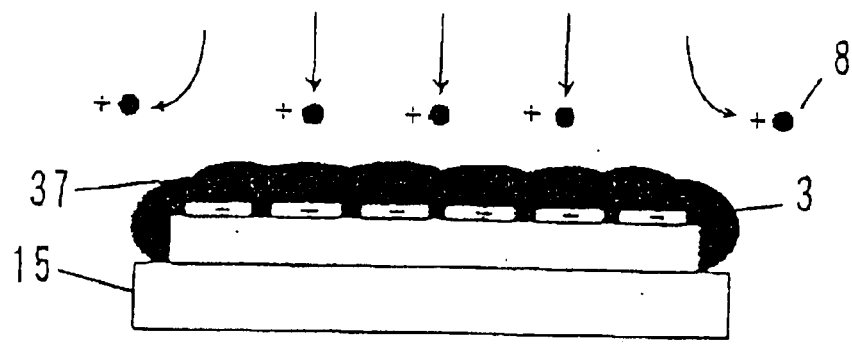

FIG. 52 is a schematic sectional view illustrating the equipotential surface over the substrate when the stage is not earthed.

Figure 53:
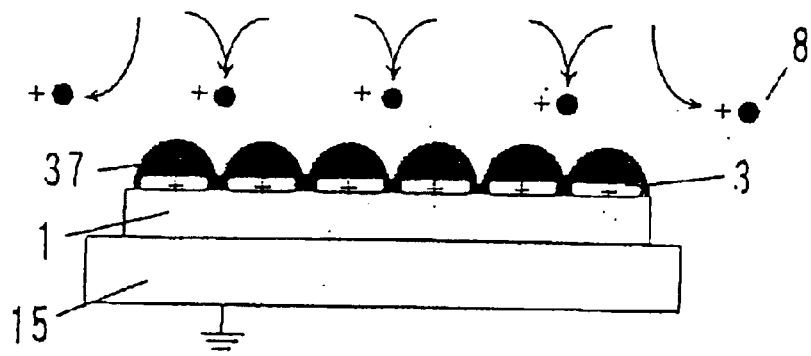

FIG. 53 is a schematic sectional view illustrating the equipotential surface over the substrate in the method for producing a liquid crystal display device according to the present invention.

Figure 54:
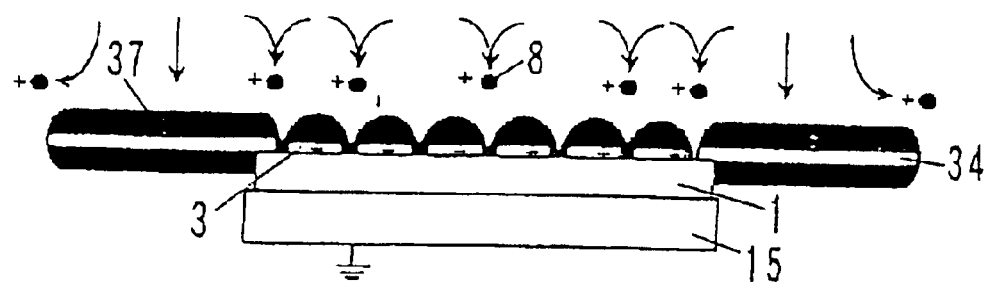

FIG. 54 is a schematic sectional view illustrating the equipotential surface over the substrate in the method for producing a liquid crystal display device according to the present invention.

Figure 55:
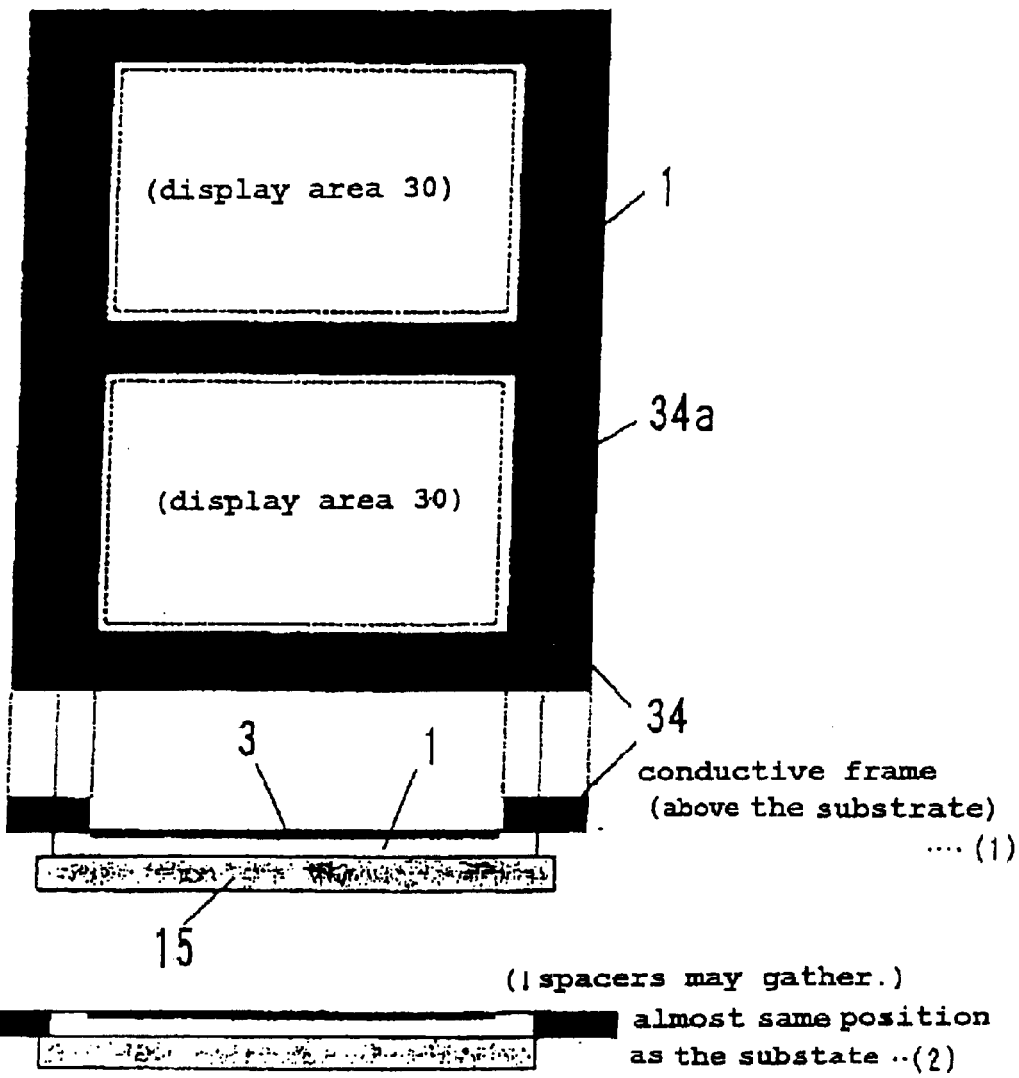

FIG. 55 is a schematic view, inclusive of a plan view and sectional views, illustrating the relation between the substrate and the conductive frame in the method for producing a liquid crystal display device according to the present invention.

Figure 56:
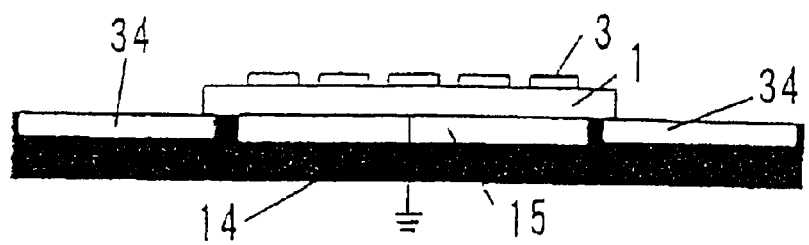

FIG. 56 is a schematic sectional view illustrating the case where the conductive stage and conductive frame are formed in isolation from each other on an insulator in practicing the method for producing a liquid crystal display device according to the present invention.

Figure 57:
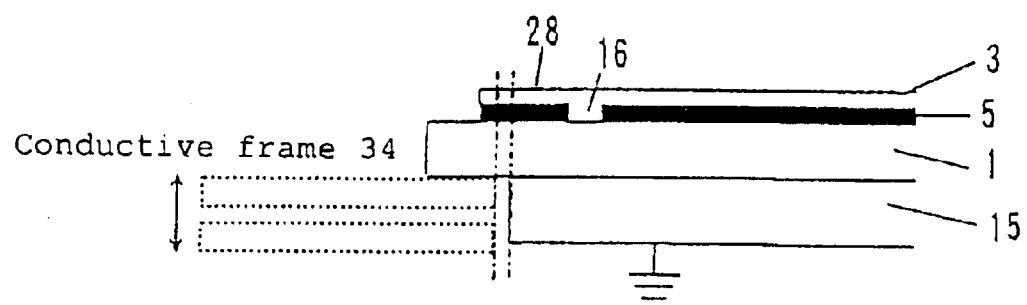

FIG. 57 is a schematic sectional view illustrating the relation between the conductive stage and conductive frame in the method for producing a liquid crystal display device according to the present invention, with a substrate end portion being shown on exaggerated scale.

Figure 58:
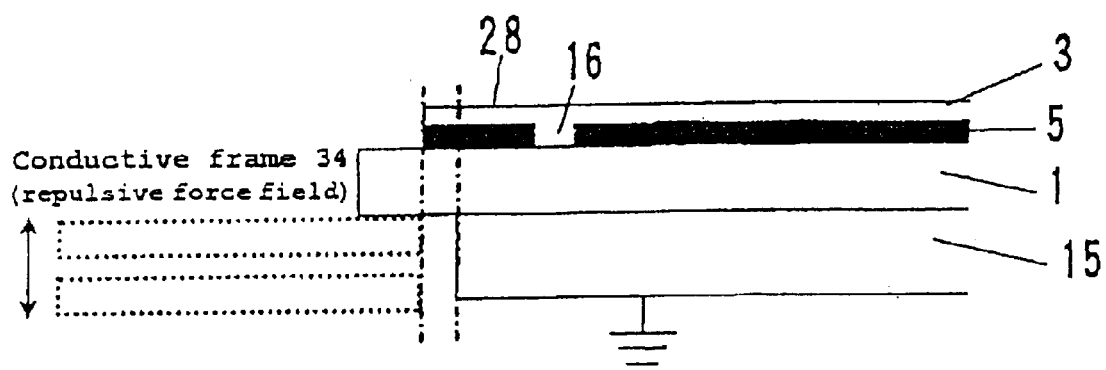

FIG. 58 is a schematic sectional view illustrating the relation between the conductive stage and conductive frame in the method for producing a liquid crystal display device according to the present invention, with a substrate end portion being shown on exaggerated scale.

Figure 59:
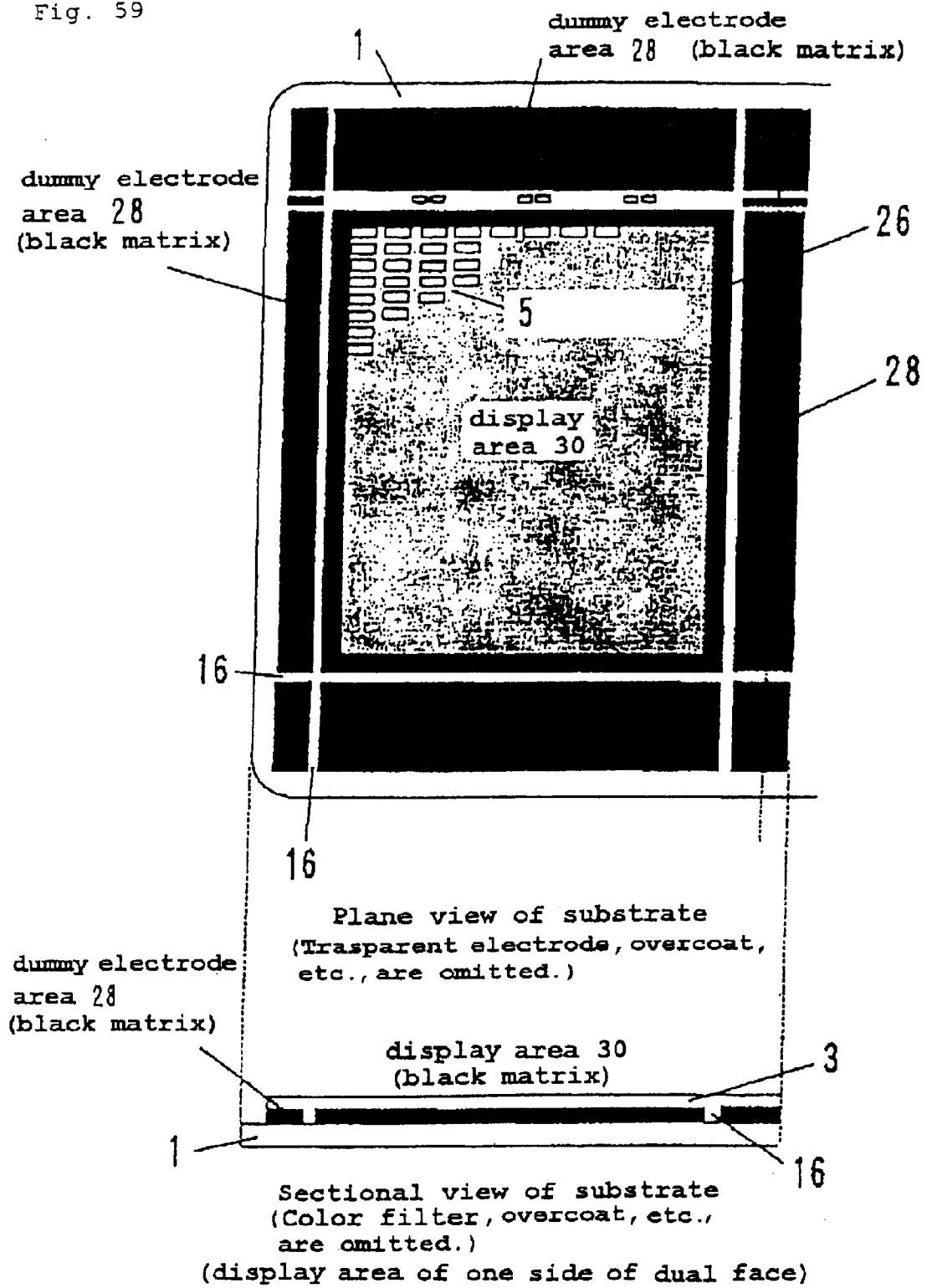

FIG. 59 is a schematic view, inclusive of a plan view and a sectional view, illustrating the picture frame-like state of the black matrix in the method for producing a liquid crystal display device according to the present invention.

Figure 60:
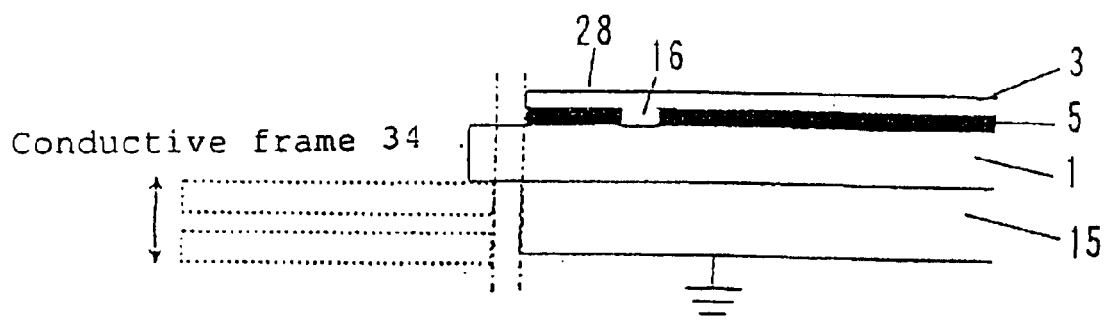

FIG. 60 is a schematic sectional view illustrating the relation between the conductive stage and conductive frame in the method for producing a liquid crystal display device according to the present invention, with a substrate end portion being shown on exaggerated scale.

Figure 61:
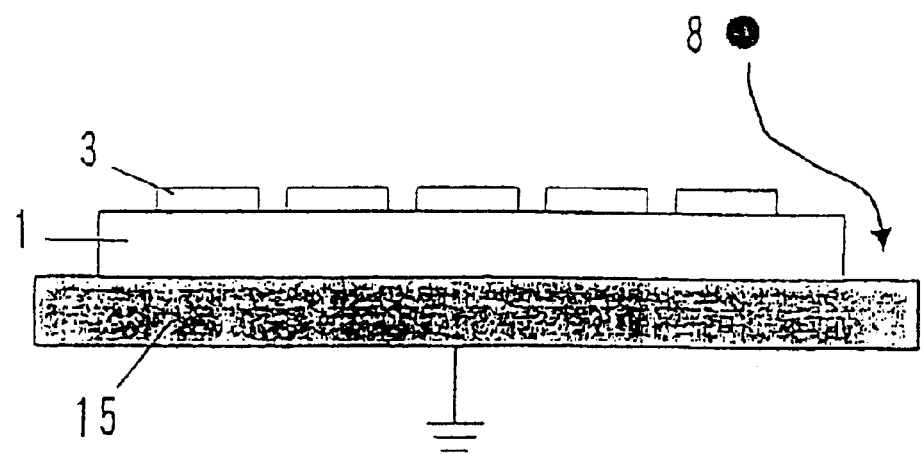

FIG. 61 is a schematic sectional view illustrating the relation between the substrate and stage in the prior art method for producing a liquid crystal display device.

Figure 62:
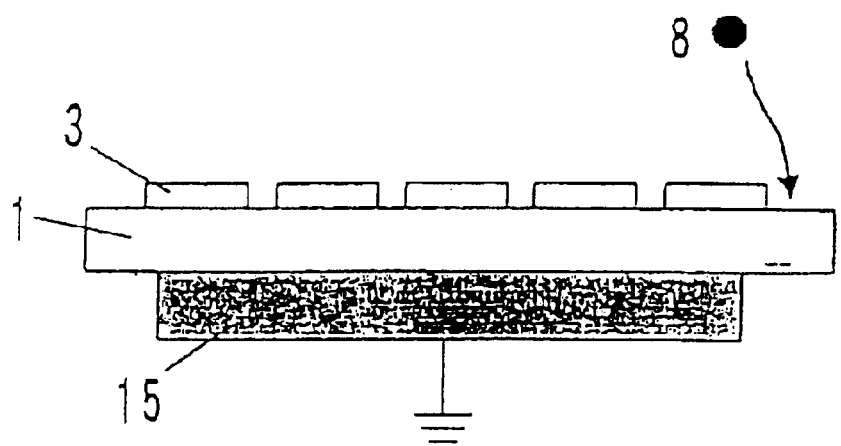

FIG. 62 is a schematic sectional view illustrating the relation between the substrate and stage in the method for producing a liquid crystal display device according to the present invention.

Figure 63:
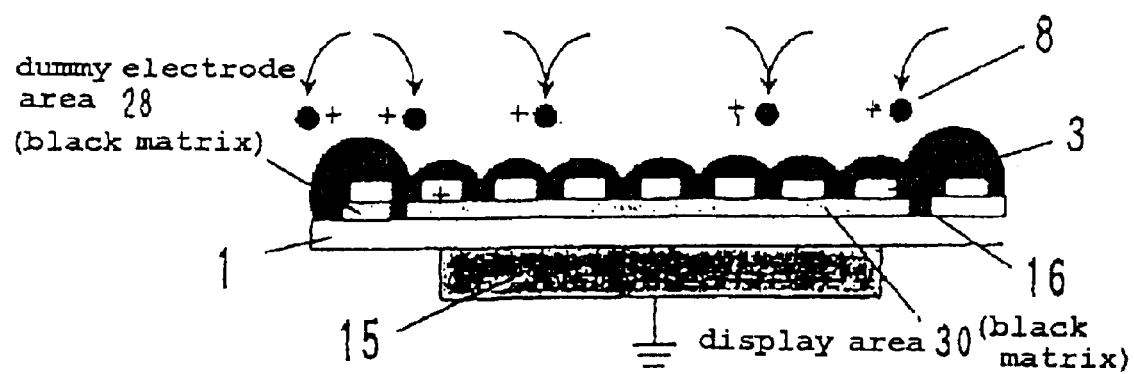

FIG. 63 is a schematic sectional view illustrating the equipotential surface over the substrate in the method for producing a liquid crystal display device according to the present invention.

Figure 64:
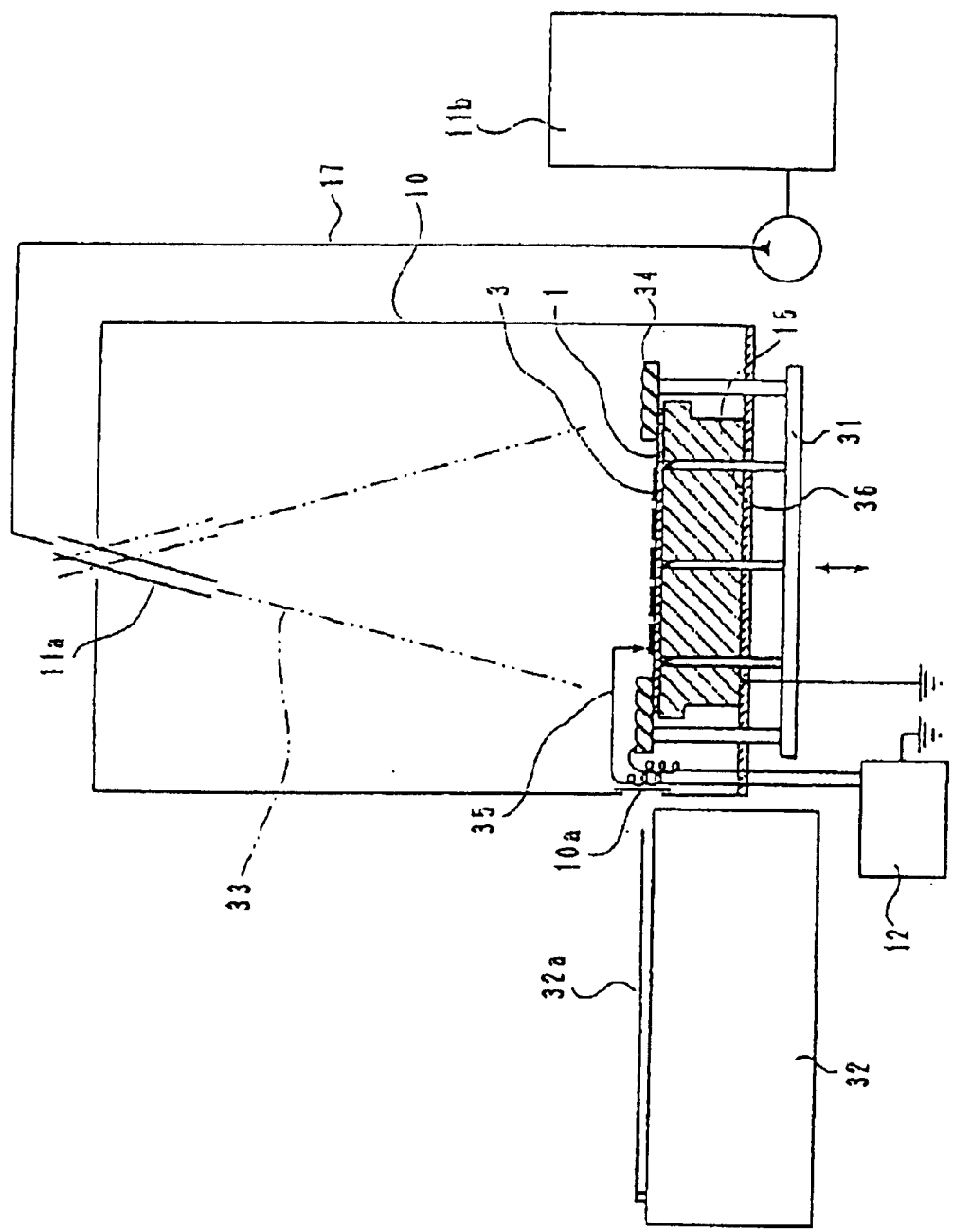

FIG. 64 is a schematic sectional view illustrating an example of the particle sprayer according to the present invention.

Figure 65:
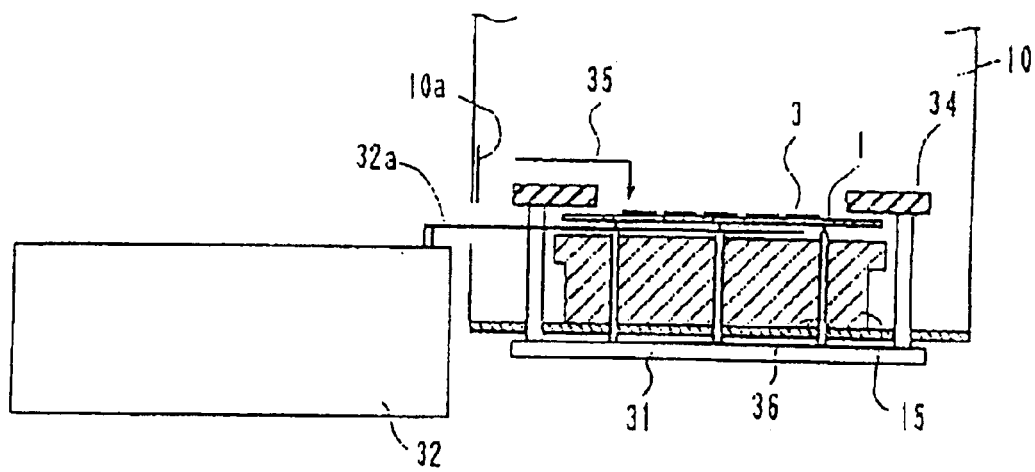

FIG. 65 is a schematic sectional view illustrating the feeding and carrying-out of the substrate in the sprayer shown in FIG. 64.

Figure 66:
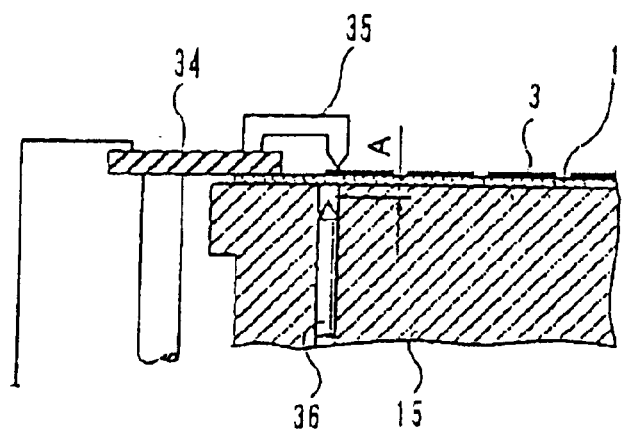

FIG. 66 is a schematic sectional view illustrating, on exaggerated scale, the essential elements shown in FIG. 64.

Figure 67:
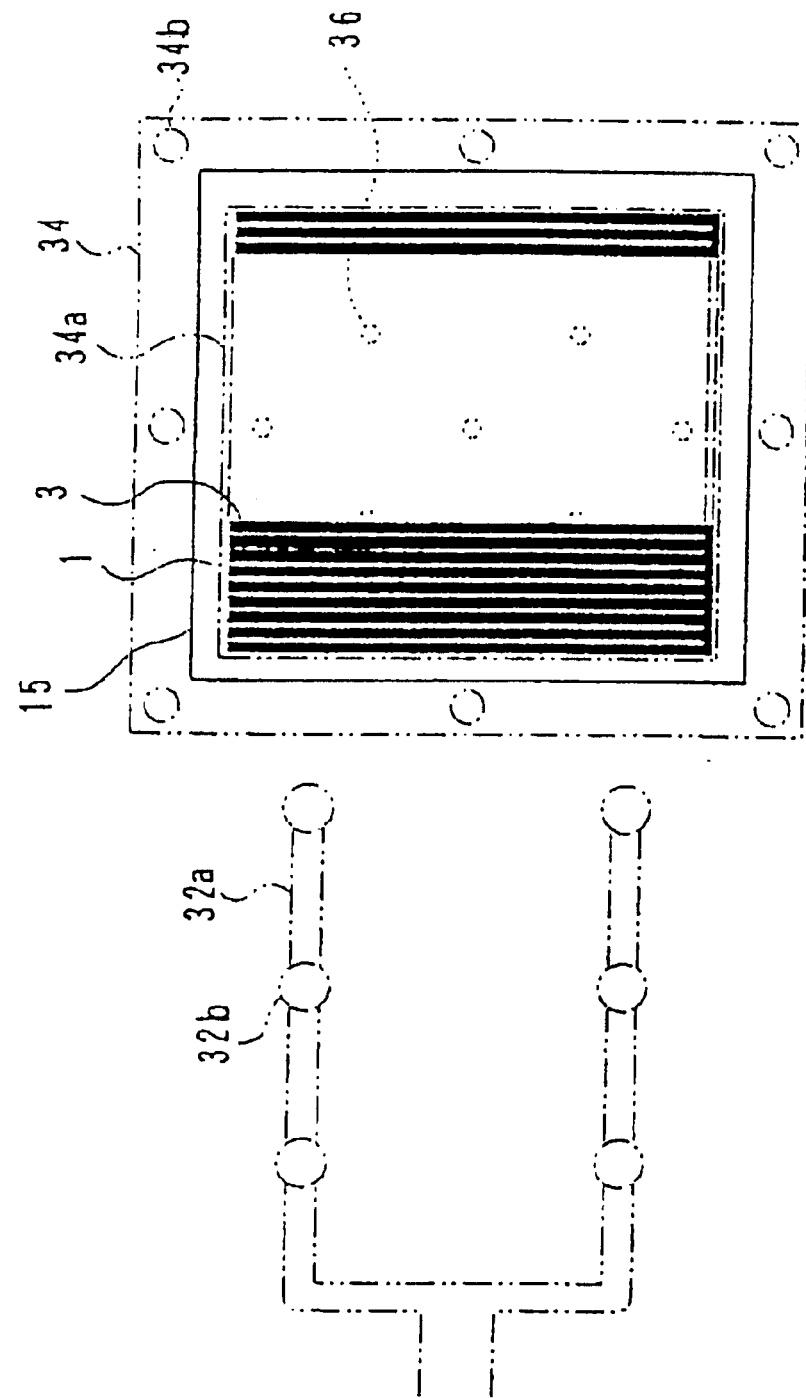

FIG. 67 is a schematic plan view illustrating the relation between the substrate and conductive frame in the particle sprayer according to the present invention.

Figure 68:
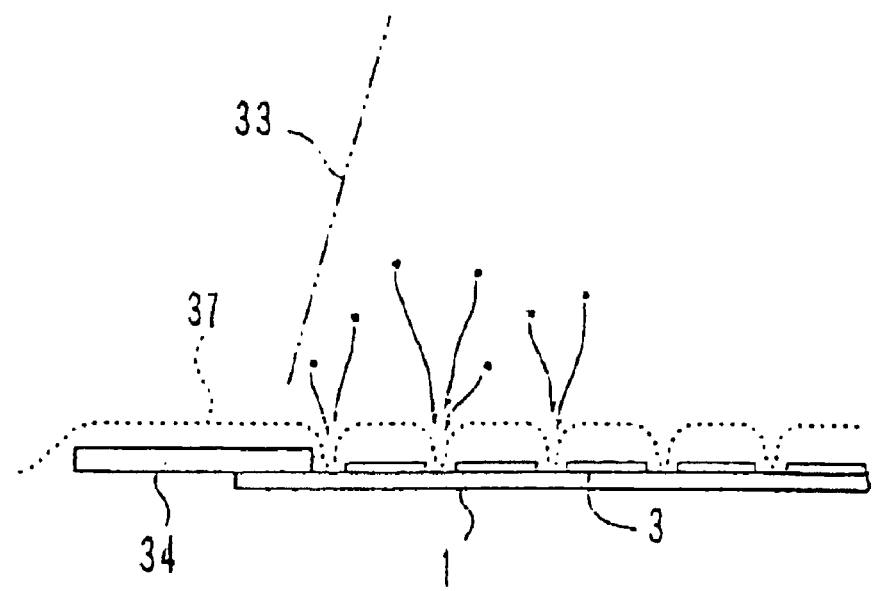

FIG. 68 is an explanatory drawing showing an equipotential line obtainable upon application of a voltage to the conductive frame and to the transparent electrodes in the particle sprayer according to the present invention.

Figure 69:
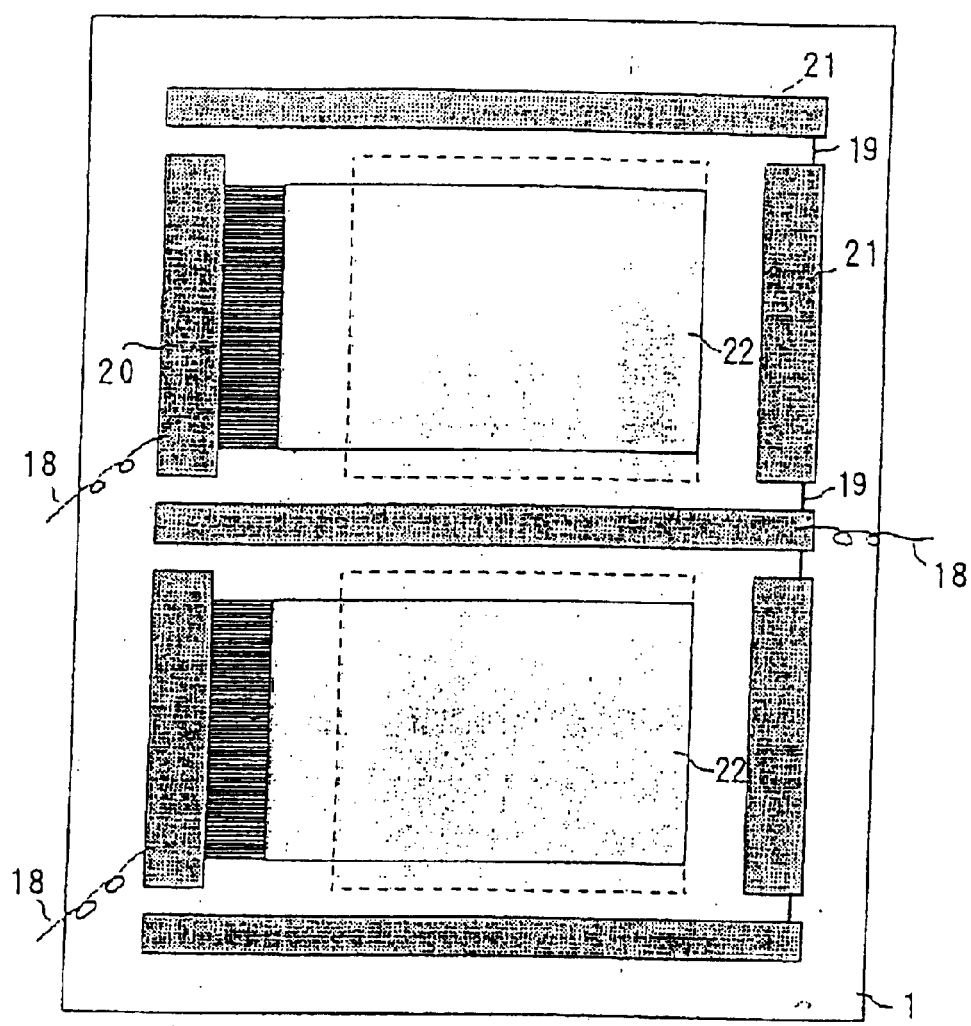

FIG. 69 is a plan view showing the electrodes on the insulating substrate in an embodiment of the present invention.

Figure 70:
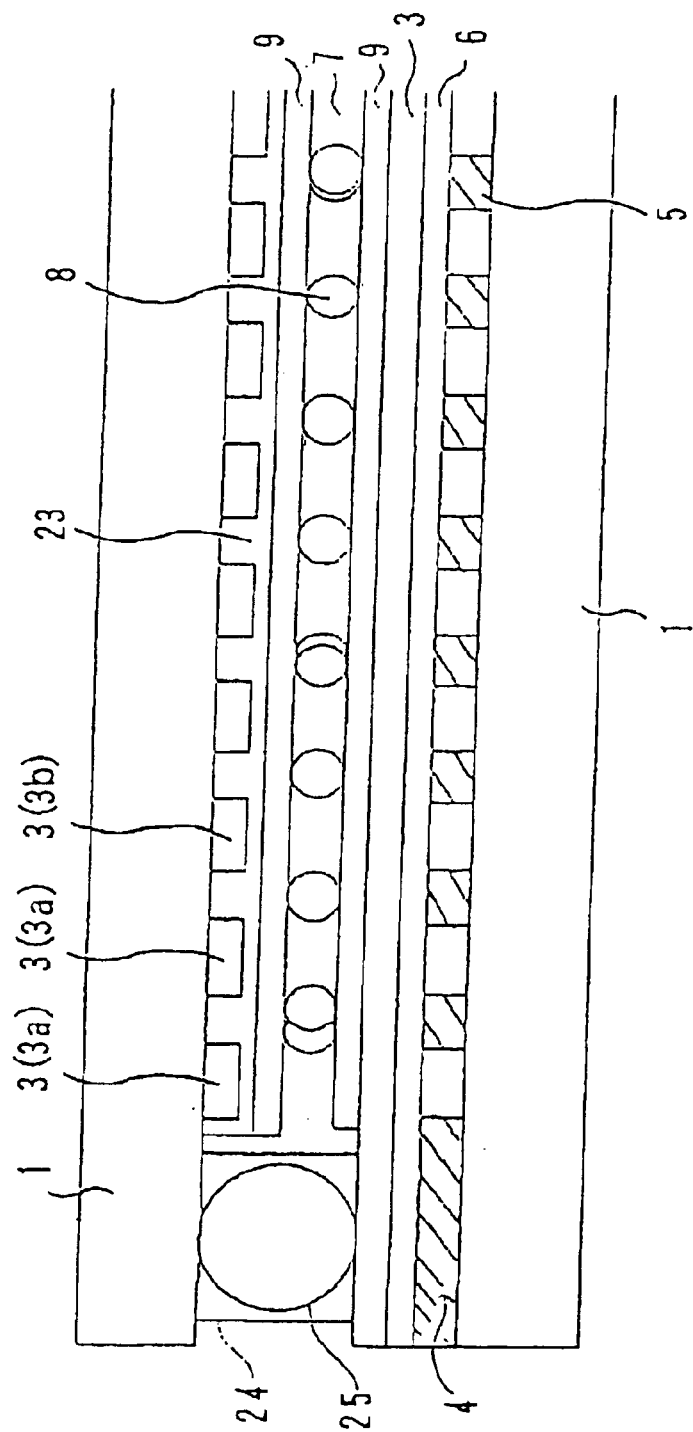

FIG. 70 is a schematic sectional view showing a liquid crystal display device according to the present invention.

Figure 71:
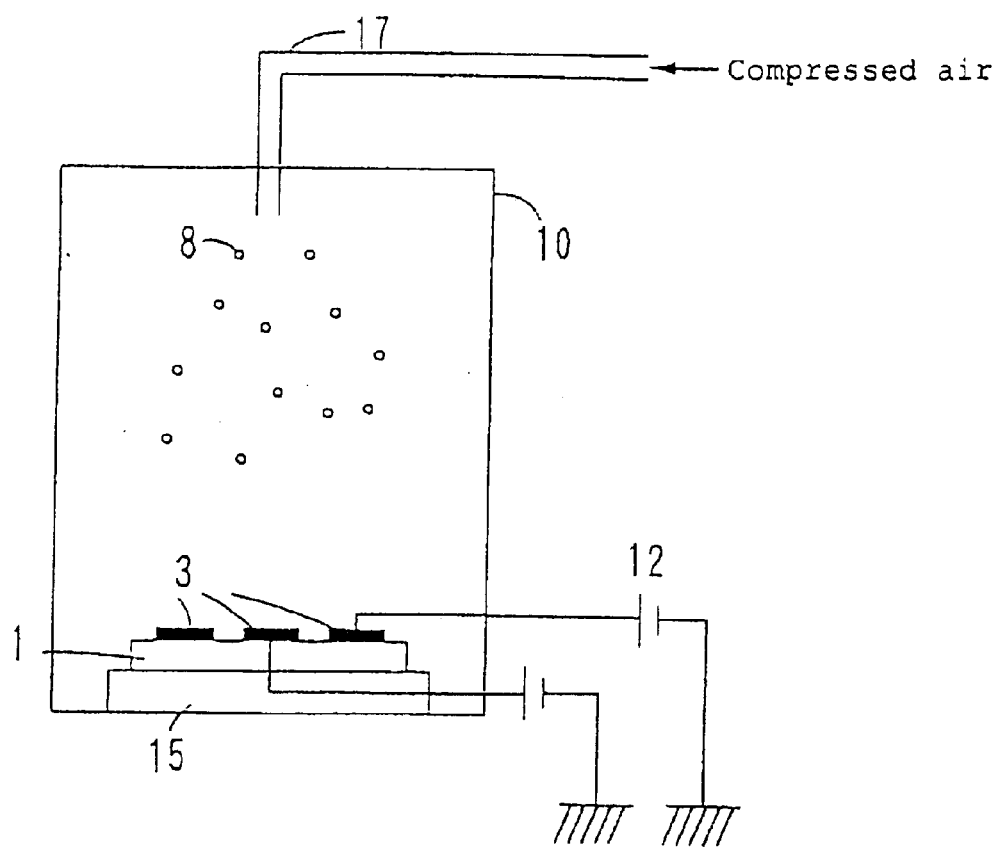

FIG. 71 is a schematic view illustrating the method for producing a liquid crystal display device according to the present invention.

Figure 72:
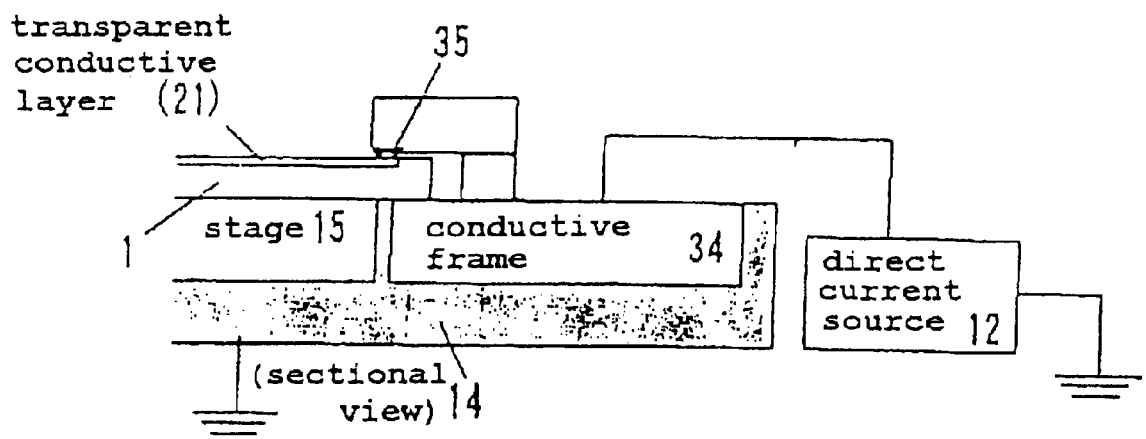

FIG. 72 is a schematic sectional view illustrating a method of voltage application to the dummy electrode in an embodiment of the method for producing a liquid crystal display device according to the present invention.

Figure 73:
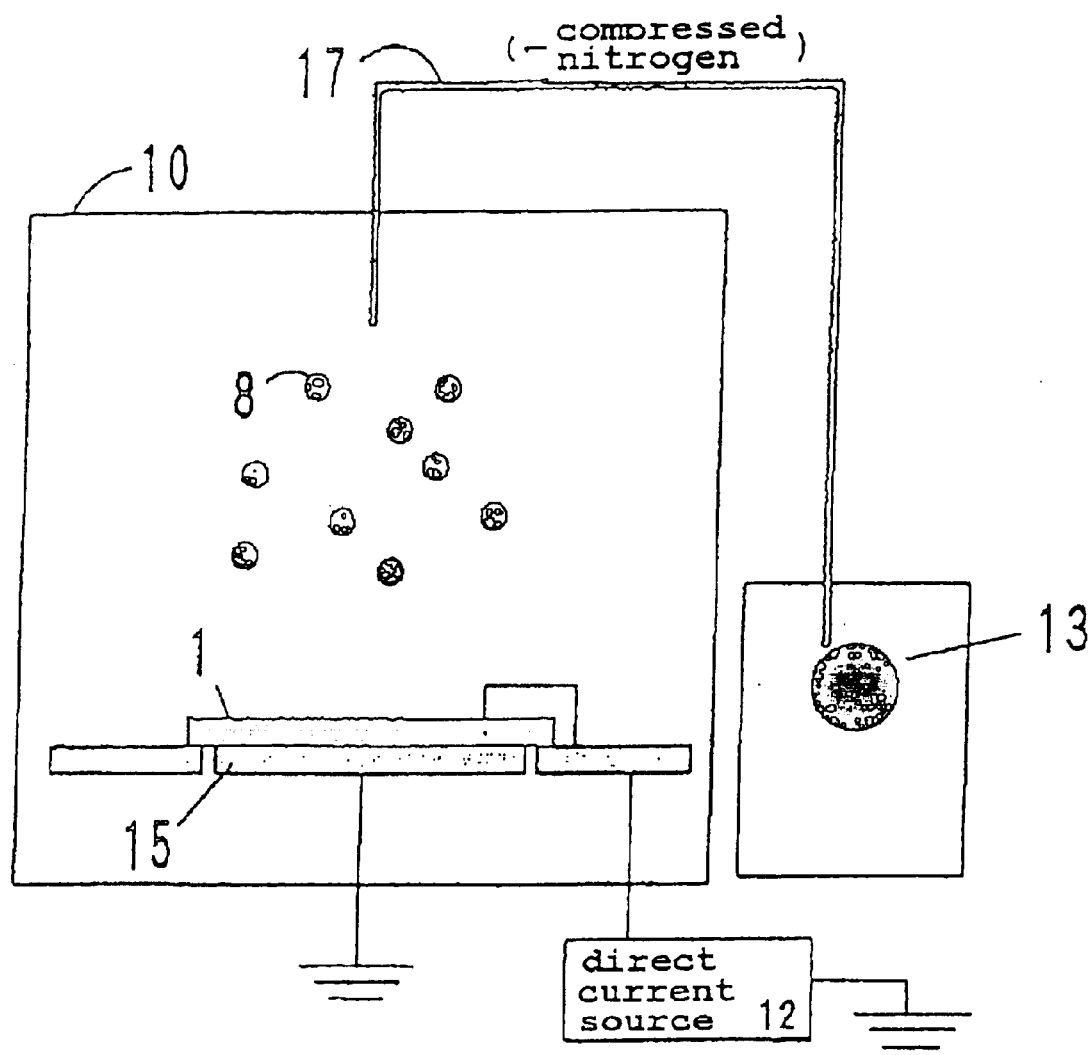

FIG. 73 is a schematic sectional view of the spacer sprayer used in an embodiment of the method for producing a liquid crystal display device according to the present invention.

Figure 74:
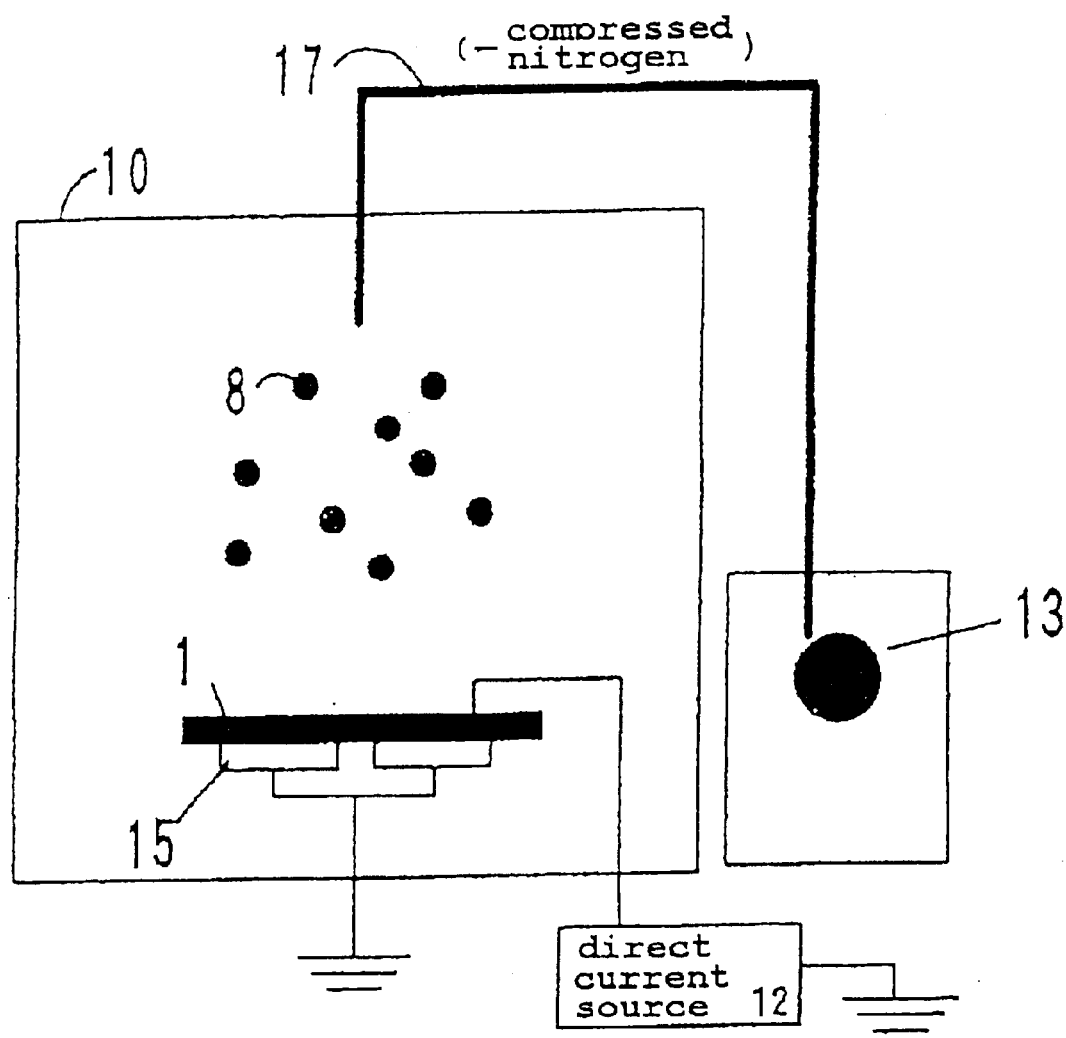

FIG. 74 is a schematic sectional view of the spacer sprayer used in another embodiment of the method for producing a liquid crystal display device according to the present invention.

Figure 75:
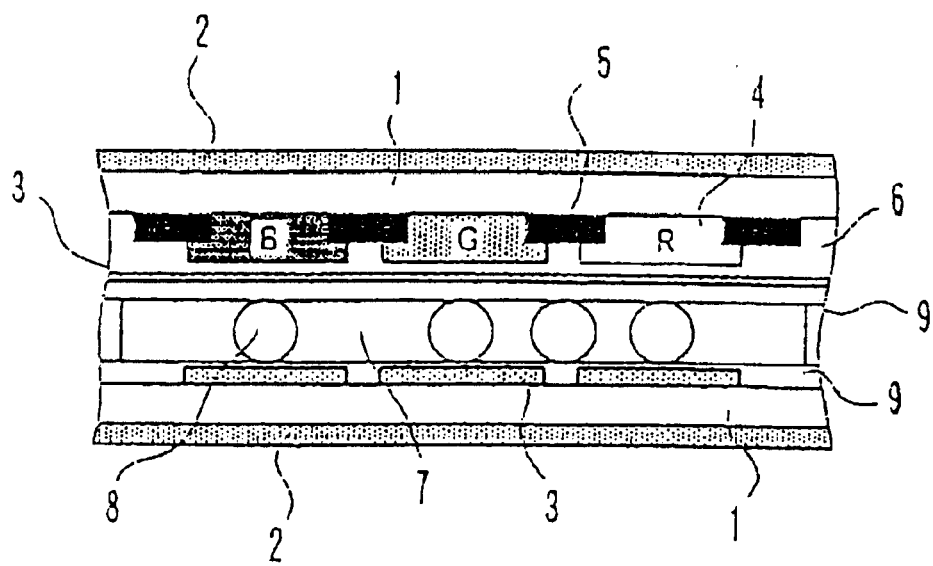

FIG. 75 is a schematic sectional view of a prior art liquid crystal display device.

Figure 76:
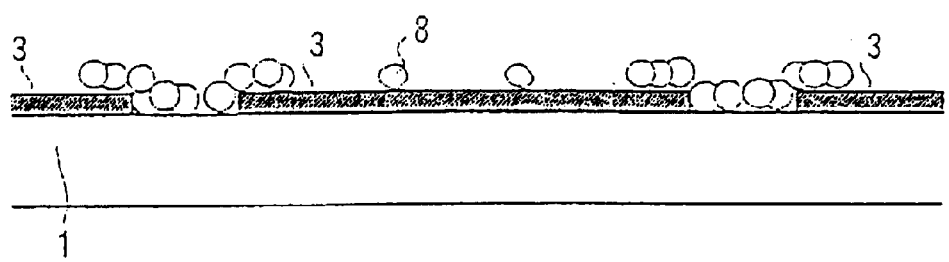

FIG. 76 is a schematic view illustrating the prior art spacer disposition characteristics.

Figure 77:
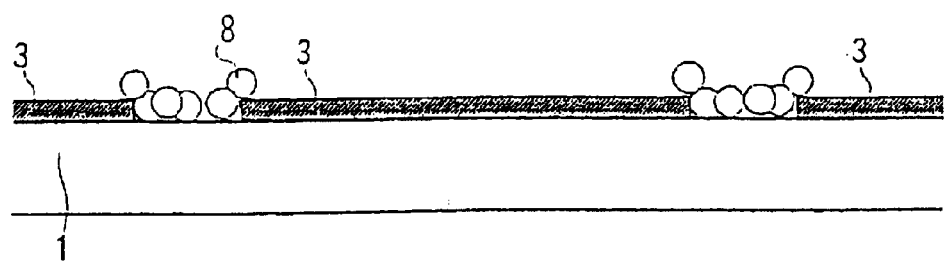

FIG. 77 is a schematic view illustrating the prior art spacer disposition characteristics.

EXPLANATION OF CODES

1—insulating substrate (glass substrate)
2—polarizer
3, 3a, 3b—display electrode (linear transparent electrode, pixel electrode)
4—color filter layer
5—conductive black matrix
6—overcoat layer
7—liquid crystal
8—spacer
9—alignment layer
10—chamber (sprayer itself)
10a—cover
11a—nozzle
11b—particle tank
12—voltage application apparatus (direct current source)
13—spacer metering (dosing) feeder
14—insulator
15—conductive stage (stage, electrode).
16—parting line
17—pipeline (spacer blowing out tube)
18, 18a, 18b—conductor
19—conducting part
19a—conducting wire (A)
19b—conducting wire (B)
20, 20a, 20b—auxiliary electrode
21—dummy electrode
22—display electrode area
23—insulation layer 24—sealing material
25—spacer within sealing
26—black matrix picture frame
27—transparent conductive layer
28—dummy electrode area
29, 29a, 29b—accessory electrode
30—display area
31—driving mechanism
32—robot mechanism
32a—arm
32b—sucking cup
33—spacer spraying range
34—conductive frame (field, repulsive force field)
34a—opening
34b—push-up shaft
35—probe (needle terminal)
36—push-up pin
37—equipotential line (equipotential surface)

DISCLOSURE OF THE INVENTION

In the following, the present invention is described in detail.

The method of spraying particles according to the first aspect of the present invention comprises applying a voltage of the same polarity as the particle charge polarity to a plurality of electrodes formed on a substrate and spraying the particles while utilizing the repulsive force operating thereon, wherein means is employed for preventing the particles from being turned out of the electrode domain comprising the plurality of electrodes.

The above substrate maybe made of glass, a resin, a metal or any other appropriate material and has a plurality of electrodes on its surface. Its shape is not particularly restricted; thus, it may be substrate-like or film-shaped, for instance. When a metal substrate is used, however, it is necessary to provide an insulating layer on the metal substrate to prevent the electrodes formed on its surface from short-circuiting.

The above electrodes include, but are not limited to, transparent electrodes, linearized transparent electrodes (linear transparent electrodes) and so on. As the substrate on which the above plurality of electrodes are formed, there may be mentioned substrates comprising pattern-forming transparent electrodes, among others. The above substrate comprising pattern-forming transparent electrodes is, for example, a substrate having stripe electrodes constituted from linear transparent electrodes disposed in parallel. The stripe electrodes are used as the so-called display electrodes in liquid crystal display devices. The electrode region comprising the above plurality of electrodes is the region where the plurality of electrodes form a electrodes group and, when the plurality of electrodes are used as display electrodes, the region is the display electrode area. In liquid crystal display devices, the region for performing displaying out of the above display electrode-forming region is called display area.

In cases where the above method of spraying particles is used in the production of liquid crystal display devices, the above substrate includes, among others, color filter substrates having a black matrix, color filters, an overcoat layer, pattern-forming transparent electrodes and an alignment layer, and substrates having a black matrix, an overcoat layer, pattern-forming transparent electrodes and an alignment layer. The substrate onto which spacers are to be sprayed may be a substrate having a color filter or a substrate to face such substrate as mentioned above.

Therefore, when the above method of spraying particles is applied to the production of STN type liquid crystal display devices, the method is applicable to any substrate, whether it is a common electrode (scanning electrode) substrate or a segment electrode (display electrode) substrate, on condition that it has pattern-forming transparent electrodes at the least.

The particles are not particularly restricted but include, for example, metal particles; synthetic resin particles; inorganic particles; light-shielding particles of a synthetic resin containing a pigment dispersed therein; particles colored with a dye; particles exhibiting adhesiveness upon application of heat or light, for instance; and particles derived from metal particles, synthetic resin particles, inorganic particles or the like by plating the surface thereof with a metal. They are generally used as spacers in liquid crystal display devices. The spacers serve to adjust the cell thickness in liquid crystal display devices.

The above method of spraying particles may be dry method or wet method. In the wet spraying method, particles are sprayed in the form of a dispersion in a mixed solvent composed of water and an alcohol, for instance. Even in this case, the particles can be charged and, therefore, the effects of the first aspect of the invention will not be reduced. The dry method of spraying is proffered, however, since the amount of charge can be stabilized in the dry spraying.

In the above dry method of spraying, the particles can be charged, for example, by repetitions of their contacting with a pipeline or by application a voltage thereto. Among these, the method comprising passing particles through a pipeline by means of such a medium as compressed air or compressed nitrogen can charge the particles in a stable manner. In that case, the moisture content in the medium gas should preferably be as low as possible from the viewpoint of particle charging and preventing moisture adhesion to the substrate.

The material of the pipeline may be a metal or a resin and can adequately be selected in connection with the particle charge polarity and the amount of charge.

The metallic pipeline includes, but is not particularly limited to, pipelines made of a single material such as nickel, copper, aluminum or titanium; and pipelines made of an alloy such as stainless steel, among others. It may be a pipeline having a metallic coating, such as a gold or chromium coating, formed by plating, for instance, on the pipeline inside wall.

The resin-made pipeline includes, but is not particularly limited to, pipelines made of Teflon, a vinyl chloride resin, nylon or the like. For attaining stable charging, however, it is necessary to coat such a resin pipeline with a metal and thereby earth the pipeline. This is because if the pipeline is not earthed, the resin pipeline will have an accumulated charge, which makes it impossible to attain stable charging, since electric charge exchanging occurs as a result of contacting of the particles with the pipeline.

For adjusting the amount of charge on the particles, a plurality of such pipelines differing in material may be connected in series.

When, in spraying particles, the particle charge polarity is the same as that of the voltage applied to the plurality of electrodes on the substrate, for example when the particle charge polarity is positive (+) and the voltage applied to the plurality of electrodes is also positive (+), then the total number of particles sprayed onto the substrate becomes smaller and more stable than the case of omitting the voltage application to the plurality of electrodes.

In the peripheral portions of the substrate where the plurality of electrodes are absent, however, no repulsive force operates and those particles in the vicinity of the periphery of the substrate are expelled out of the substrate. As a result, the number of particles in portions around the region comprising the plurality of electrodes becomes insufficient. If such technique is applied in the production of liquid crystal display devices using spacers as the particles, the cell thickness will become reduced in such portions of the device as mentioned above and this may possibly lead to occurrence of display unevenness.

In that case, a step of imposing a certain load on liquid crystal display devices is included in the process of liquid crystal display device production. If some or other portions of the substrate show an irregular or fluctuating number of spacers, the load per spacer varies and the spacer distortion varies accordingly, hence the cell thickness varies, in those portions, possibly leading to uneven display on the liquid crystal display devices.

Figure 1:
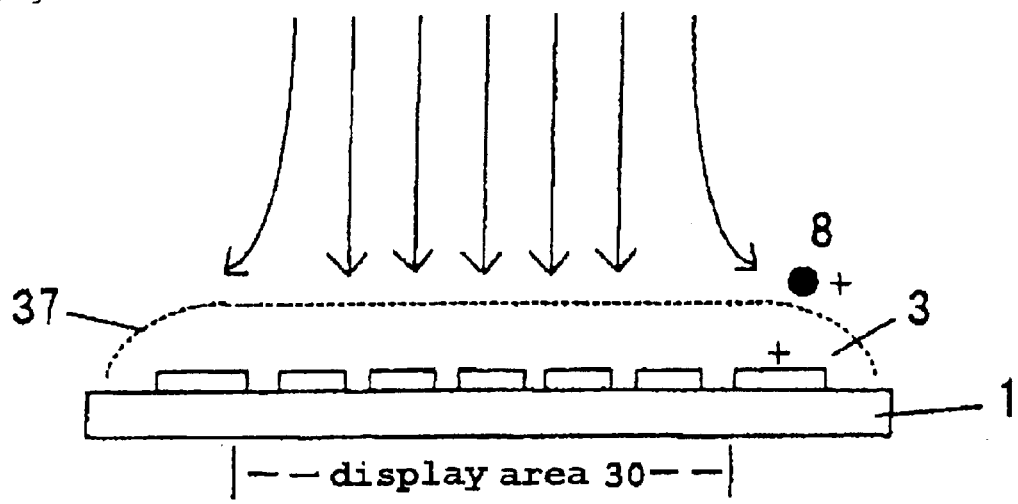
FIG. 1 is a schematic sectional view illustrating an equipotential surface above the substrate in the prior art method for producing a liquid crystal display device.

The cause of such increase or decrease in the number of particles in the vicinity of the periphery of the region comprising a plurality of electrodes may be explained for the case of liquid crystal display device production, as follows. As shown in FIG. 1, when spacers are intended to be disposed in transparent electrode gaps by applying a voltage of the same polarity as the spacer charge polarity to the pattern-forming transparent electrodes, a force (repulsive force) repelling falling spacers out of the display area from within the display area operates and, in particular in the vicinity of the periphery of the display area, there is no repulsive force above the substrate region outside the region comprising the plurality of transparent electrodes and therefore particles to be disposed in the peripheral portions of the display area escape to the outside or, when the region outside the display area is wide and large, those particles are sprayed concentratedly onto the region outside the display area.

Accordingly, the method of spraying particles according to the first aspect of the invention comprises applying a voltage of the same polarity as the particle charge polarity to a plurality of electrodes formed on a substrate and spraying the particles while utilizing the repulsive force operating on the particles, wherein means is employed for preventing the particles from being turned out of the electrode domain comprising the plurality of electrodes.

In particular, even when the amount of particle charge and/or the value of the voltage to be applied to the plurality of electrodes is increased for improving the selectivity of disposition in interelectrode gaps, an action is produced to prevent particles from being forced out of the electrode domain comprising the plurality of electrodes, so that particles are sprayed and disposed in those interelectrode spaces as well which occur in the edge portions of the electrode domain comprising the plurality of electrodes.

In carrying out the above method of spraying particles, it is preferred that a dummy electrode be provided outside the electrode domain comprising a plurality of electrodes and a voltage of the same polarity as the particle charge polarity be applied also to the dummy electrode to thereby control the electric field above the periphery of the electrode domain comprising the plurality of electrodes.

Thus, by applying a voltage of the same polarity as the particle charge polarity to the dummy electrode and adjusting the voltage to thereby control the electric field, it becomes possible to cause a repulsive force to operate on particles and thus push back those particles otherwise expelled out of the electrode domain comprising a plurality of electrodes to the inside of the electrode domain, with the result that particles are sprayed and disposed also in those interelectrode spaces which occur in the edge portions of the electrode domain comprising the plurality of electrodes.

Further, if the voltage applied to the dummy electrode is adjusted properly, it is also possible to control the density of disposed particles. In other words, it becomes possible to correct macroscopic deviations in the electric field in the edge portions of the electrode domain comprising a plurality of electrodes by applying a voltage to the dummy electrode as well.

Furthermore, by adjusting the voltage applied to the dummy electrode, it also becomes possible to intentionally control the number of particles to be disposed in the edge portions of the electrode domain comprising a plurality of electrodes and, by applying the first aspect of the present invention to the production of liquid crystal display devices, it becomes possible to adjust the cell thickness in the edge portions (in the vicinity of sealed portions) of the electrode domain comprising a plurality of electrodes.

The dummy electrode includes within the scope thereof, but is not limited to, conductive electrodes formed and disposed outside the electrode domain (electrode group) comprising a plurality of electrodes, such as those mentioned below. Any other known appropriate dummy electrodes may also be used effectively.

In Japanese Kokai Publication Sho-63-266427, there are disclosed dummy electrodes which have the same state as in the display electrode-forming parts and are provided for the purpose of improving the quality of the display part having the same color as the background color by eliminating color unevenness resulting from gap irregularity between the substrates and to which no display voltage is applied.

The dummy electrodes are provided between the stripe-shaped display electrodes made of a transparent conductive material such as ITO as provided on the upper substrate and the sealed portions formed on the periphery of the upper substrate. The dummy electrodes make the gaps between the display part and sealed portions identical in state with the display part.

When they are formed simultaneously with the display electrodes, the dummy electrodes can be made of the same material and can have the same thickness as the display electrodes. However, no display voltage (signal voltage) is applied to the dummy electrodes. On the lower substrate, like on the upper substrate, dummy electrodes are formed between the display electrodes and sealed portions.

In Japanese Kokai Publication Hei-02-301724, there are disclosed transparent electrodes (dummy electrodes) provided for the purpose of enabling the production of liquid crystal panels having a uniform liquid crystal layer thickness.

Among the dummy electrodes provided on the upper and lower substrates, the dummy electrode provided on the upper substrate faces the dummy electrode on the lower substrate on the left side and base side of the nondisplay area and, on the upper side, a transparent electrode forming the display area. Among the nondisplay area, on the right side, a dummy electrode on the lower substrate faces a transparent electrode on the upper substrate.

Therefore, transparent electrodes face to each other in all parts of the nondisplay area. As a result, a liquid crystal panel having a uniform liquid crystal layer thickness, which is determined by the gap material diameter, can be obtained.

In Japanese Kokai Publication Hei-03-260624, there are disclosed dummy electrodes provided around segment electrodes at a distance of 1 to 5 $\mu$m from the segment electrodes for the purpose of preventing the generation of static electricity during rubbing treatment in the step of rubbing treatment, which is to be followed by cutting off the dummy electrodes.

The dummy electrodes are intended to provide liquid crystal devices having high display quality by preventing the alignment layer from being disturbed by static electricity in dot matrix type liquid crystal devices produced by providing segment electrodes and common electrodes derived respectively from transparent electrode layers on a pair of substrates, further providing an alignment layer on each electrode layer and causing a liquid crystal to be sandwiched between the substrates.

Thus, by providing dummy electrodes at sites surrounding the segment electrodes on the substrate with a segment electrode-to-dummy electrode distance of 1 to 5 μm, it is possible to eliminate static electricity emanation between segment electrodes in the step of rubbing. A liquid crystal display device showing no color irregularity can be obtained by cutting off the dummy electrodes after rubbing treatment.

In Japanese Kokai Publication Hei-06-51332, there is disclosed a dummy electrode provided in a matrix type liquid crystal display device for the purpose of eliminating color irregularity at extraction electrode sites outside the pixel region.

The dummy electrode is provided for rendering the thickness of the outside of the pixel region identical with the liquid crystal layer thickness in the pixel region.

Figure 2:
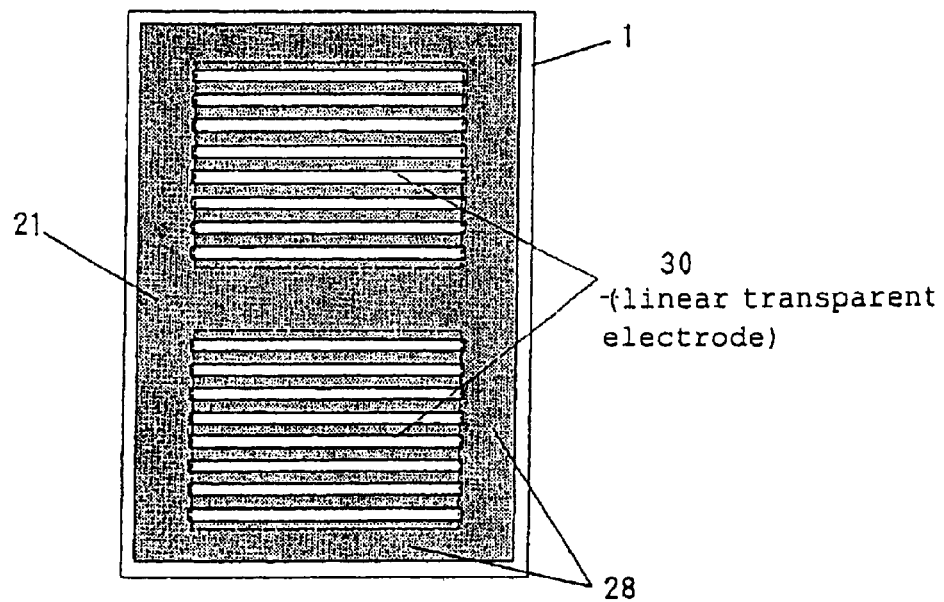
FIG. 2 is a schematic plan view illustrating the relation between the transparent electrodes and dummy electrode formed on the substrate, as seen from above, in the method for producing a liquid crystal display device according to the present invention, wherein the dummy electrode is connected with the transparent electrodes.
Figure 3:
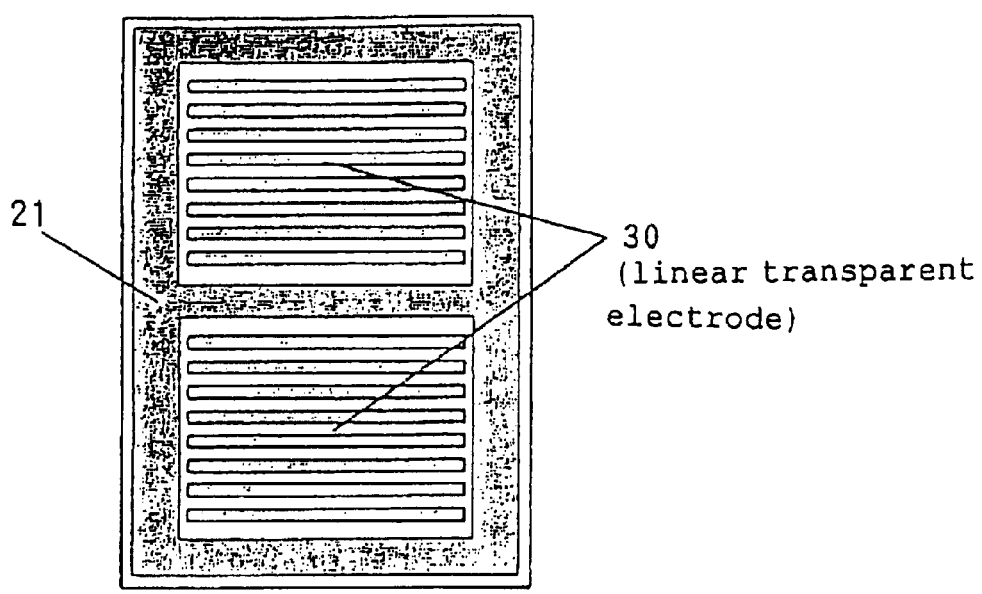
FIG. 3 is a schematic plan view illustrating the relation between the transparent electrodes and dummy electrode, as seen from above, in the method for producing a liquid crystal display device according to the present invention, wherein the dummy electrode is not connected with the transparent electrodes.
Figure 4:
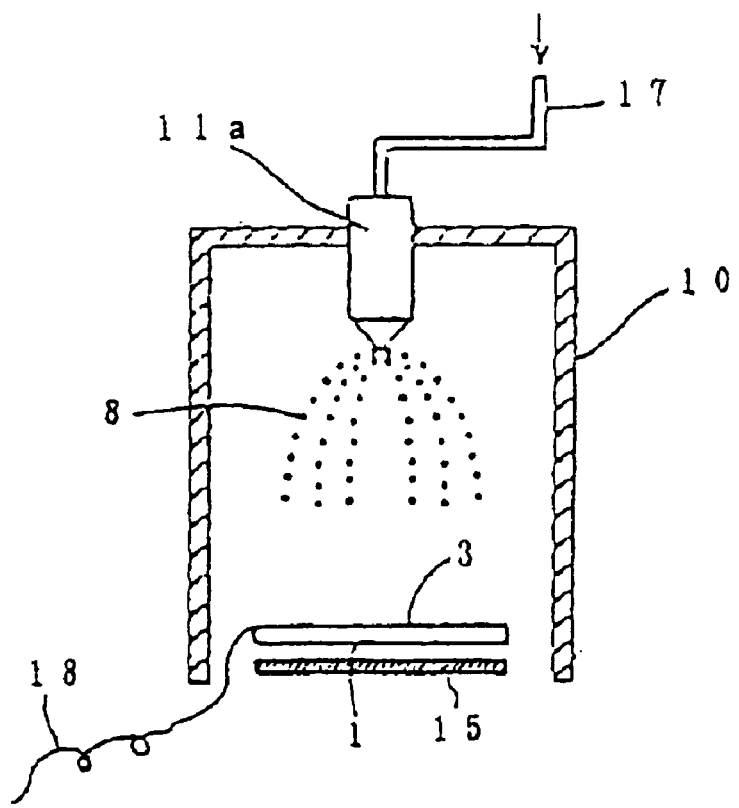
FIG. 4 is a schematic sectional view illustrating a spacer sprayer to be used in the practice of the present invention.

The above dummy electrode may be formed outside the display area on the substrate for preventing the alignment layer from being damaged by sparking caused by static electricity in the process for producing STN type liquid crystal display devices. For example, when two display substrates having stripe-shaped transparent electrodes are to be manufactured from one substrate, it is provided around each display area, as shown in FIG. 2 or FIG. 3. FIG. 2 is for the case of the dummy electrode being connected with the transparent electrodes and, FIG. 3 is for the case of the dummy electrode being not connected with them.

The above method of spraying particles is preferably carried out by applying a voltage of 500 to 8,000 V to the plurality of electrodes.

As a result of the voltage applied being controlled, the repulsive force operating between the particles and electrodes increases, the selectivity in particle disposition in electrode gaps is improved accordingly, and the particles are sprayed onto the edge portions of the electrode domain comprising the plurality of electrodes as well with good disposition characteristics without the particles being expelled out of the electrode domain comprising the plurality of electrodes.

In carrying out the method of spraying particles according to the first aspect of the invention, a voltage of the same polarity as the particle charge polarity is preferably applied to an electrode other than the plurality of electrodes which occurs on the substrate and at least partly surrounding the electrode domain comprising the plurality of electrodes.

The electrode other than the plurality of electrodes, which is the dummy electrode, is formed on the substrate having the plurality of electrodes formed thereon, and always serves to correct the unbalanced electric field formed above the substrate by the plurality of electrodes, irrespective of the position of setting of the substrate in the particle sprayer. Since the plurality of electrodes and the dummy electrode are formed on the substrate, it is not necessary to modify the setting of the particle sprayer according to the substrate size and/or the difference in the voltage applied to the electrodes. This is an advantage from the industrial viewpoint.

In carrying out the method of spraying particles according to the first aspect of the invention, it is preferred that the electrode other than the plurality of electrodes be provided in the peripheral region exclusive of an auxiliary electrode site for applying a voltage to the plurality of electrodes.

For example, when the plurality of electrodes are stripe-shaped electrodes, an auxiliary electrode (solid electrode) for applying a voltage to said electrodes is provided at one end or both ends of the stripe-shaped electrodes, and the electric field irregularity is corrected by the auxiliary electrode (solid electrode). Therefore, the means for preventing particles from being forced out of the electrode domain comprising a plurality of electrodes is preferably provided particularly at a site where there is no auxiliary electrode.

In the method of spraying particles according to the first aspect of the invention, the electrode other than the plurality of electrodes preferably has an area larger than the area of each of the plurality of electrodes.

Thus, when the electrode area is increased, the repulsive force operating on particles increases. By selecting a larger dummy electrode area than that of each of the plurality of electrodes, a greater action is produced to turn back particles to the electrode domain comprising the plurality of electrodes; as a result, particles are more efficiently disposed also in interelectrode gaps at the edge portions of the electrode domain comprising the plurality of electrodes.

In carrying out the method of spraying particles according to the first aspect of the invention, the one and same voltage is preferably applied to the plurality of electrodes and to the electrode other than the plurality of electrodes.

If, for example, patterning is carried out so as to cause electric short-circuiting in forming the plurality of electrodes and the dummy electrode, it is unnecessary to newly provide an electric wire or the like for applying a voltage to the dummy electrode, and it is unnecessary, too, to newly and separately prepare a means for voltage application to the dummy electrode; this is advantageous from the industrial viewpoint.

In the method of spraying particles according to the first aspect of the invention, it is preferred that the electrode other than the plurality of electrodes be a solid electrode provided in the peripheral region of the substrate.

Thus, by applying a voltage to the solid electrode (mesh electrode) provided in the peripheral region of the substrate for eliminating the height difference, it becomes possible to produce the effects of the first aspect of the present invention using the conventional designing standard without increasing the number of steps.

In that case, any electrode, for example a solid, mesh or block electrode, may be employed as the electrode for applying a voltage to the region outside the electrode domain comprising a plurality of electrodes.

Referring to FIGS. 4 to 8, typical embodiments of the first aspect of the invention are now described.

FIG. 4 is a schematic view showing a spacer sprayer to be used in an embodiment of the first aspect of the present invention. On the top of a tightly closed or substantially closed clean vessel 10, there is provided a nozzle 11*a* for spraying charged spacers 8. A feeder (not shown) for feeding spacers 8 and nitrogen gas is connected with the nozzle 11*a* via a pipeline 17. Under the vessel 10, there is disposed an insulating substrate 1 made of glass or the like and having display electrodes 3 formed thereon, and there is also provided an electric wire 18 for applying a voltage to the display electrodes 3 for electric field formation. It is also possible to form an electric field by means of a stage (electrode) 15 provided within the spacer sprayer in lieu of electric field formation by voltage application to the display electrodes 3.

In the production of liquid crystal display devices, the spraying of spacers 8 is generally carried out by charging an appropriate quantity of spacers by the charging method mentioned above, in this case charging spacers negatively, and causing them to be sprayed onto the substrate by means of compressed air, compressed nitrogen or the like.

Figure 5:
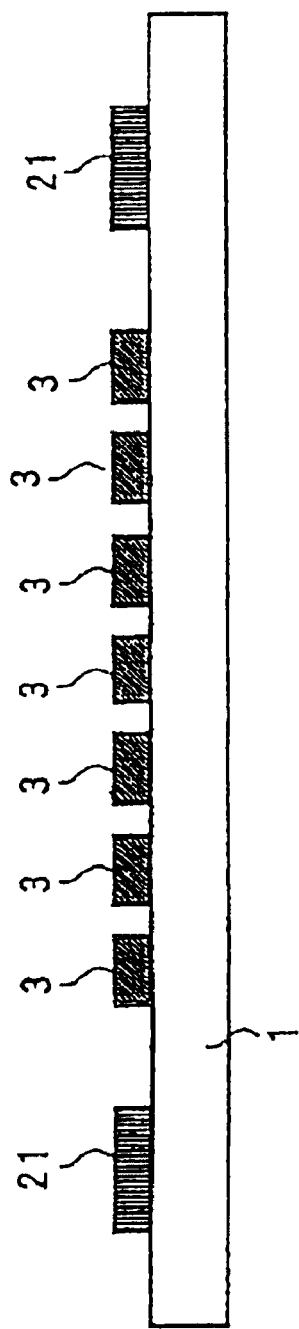
FIG. 5 is a sectional view illustrating an electrode pattern relevant to the present invention.
Figure 6:
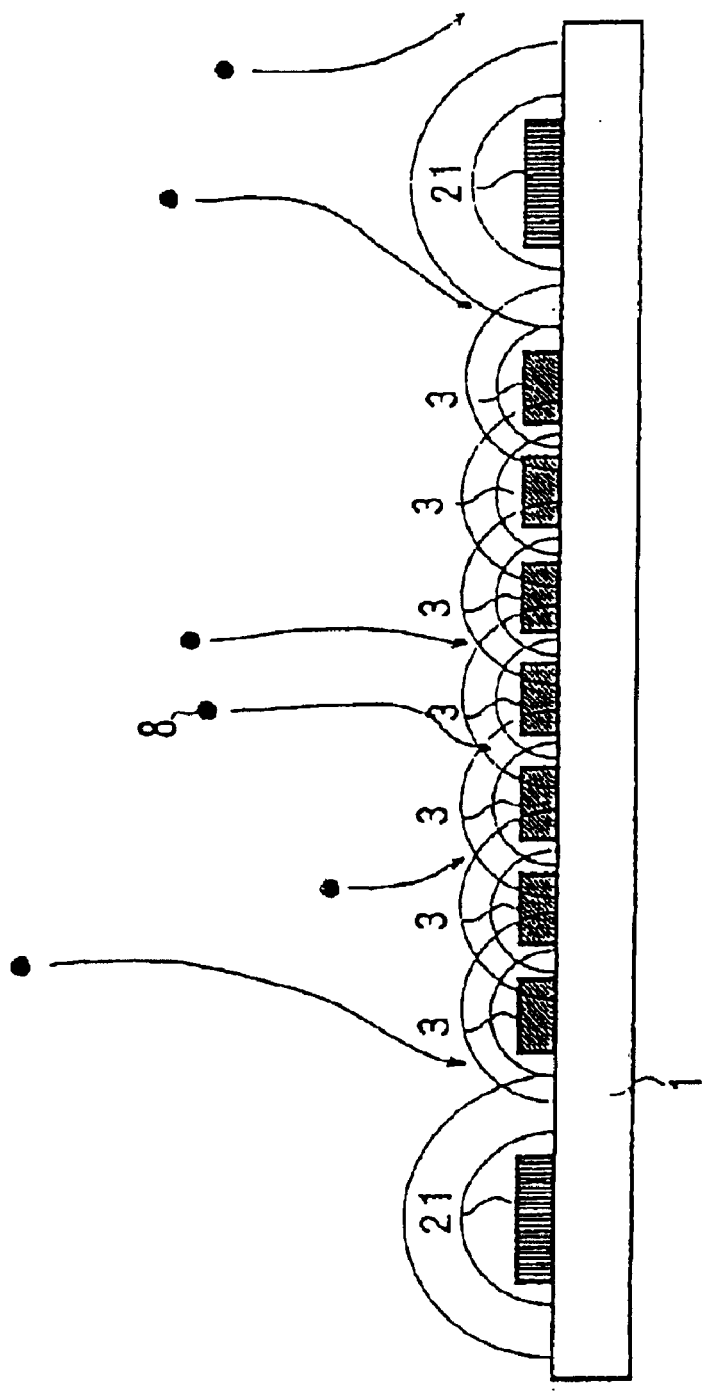
FIG. 6 is a schematic view illustrating the manner of spacer disposition as attainable according to the present invention.

FIG. 5 and FIG. 6 each is a schematic view showing an electrode pattern relevant in the first aspect of the invention. As shown in FIG. 5, stripe-shaped display electrodes 3 and dummy electrodes 21, which are positioned outside the display area and to which a voltage is to be applied, are formed on an insulating substrate 1. Means (not shown) for voltage application to the respective electrodes are also provided. The means for voltage application may be auxiliary electrodes formed for voltage application to the display electrodes 3, or voltage application to the display electrodes 3 may be directly performed by applying probe pins to the respective electrodes.

Since the electrode domain comprising a plurality of electrodes (display electrode area) is charged in general (macroscopically) negatively, a repulsive force (solid line) operates against spacers and the spacers tend to move (escape) out of the display electrode area to the outside region where there is no electric field. Nevertheless, by applying a negative voltage to the dummy electrodes 21, it is possible, as shown in FIG. 6, to dispose spacers with certainty also in display electrode gaps in the display electrode end portions otherwise causing a tendency toward spacer escaping.

The solid lines in FIG. 6 schematically show the magnitudes of the repulsive force exerted on spacers in terms of "upwardly convex" semicircles. FIG. 6 shows the manner of shifting and disposition of charged spacers to and in repulsive force valleys.

Figure 7:
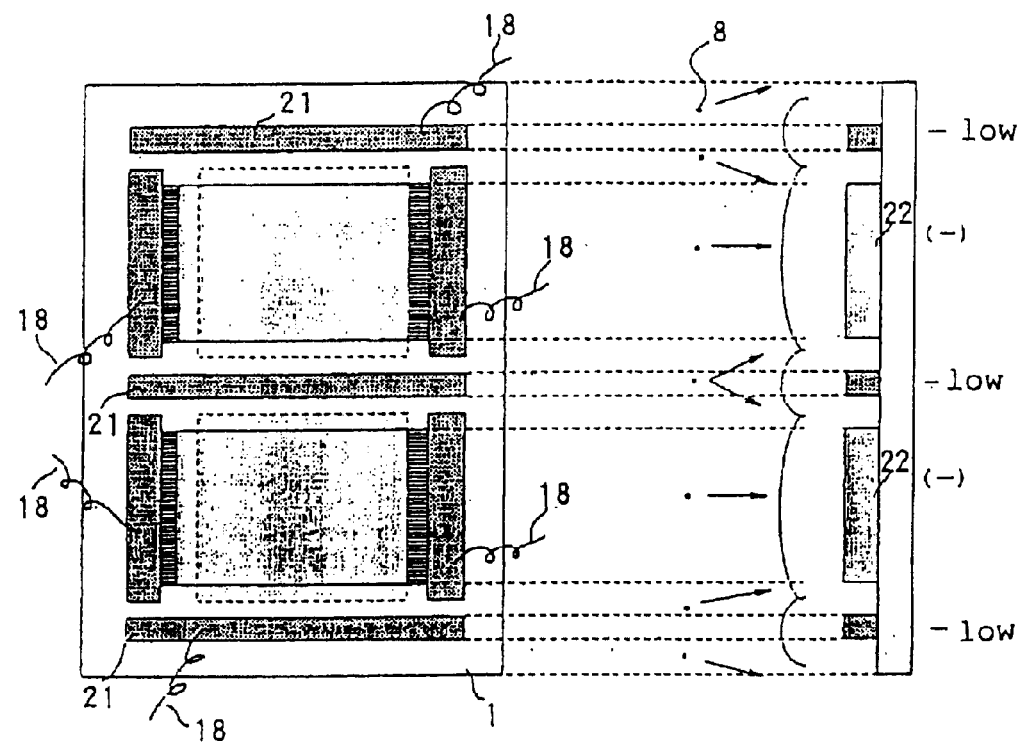
FIG. 7 is a schematic view illustrating the method of disposing spacers by means of a macroscopic electric field according to the present invention.
Figure 8:
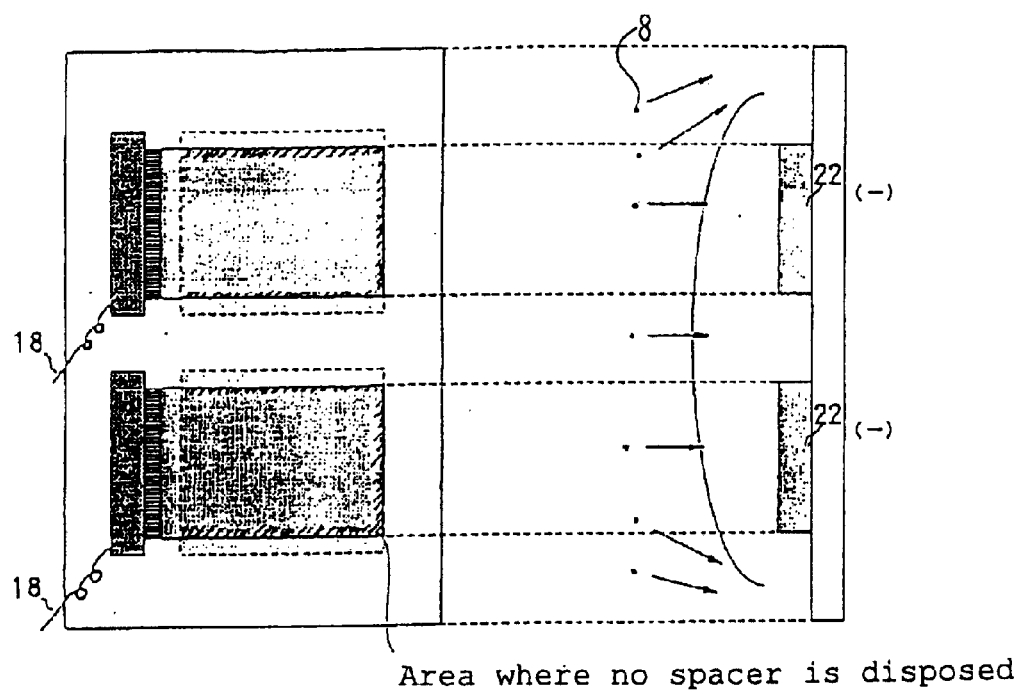
FIG. 8 is a schematic view illustrating the conventional method of disposing spacers by means of a macroscopic electric field.

FIG. 7 and FIG. 8 each is a schematic view illustrating how spacers move under the influence of a macroscopic electric field formed on the electrode substrate. The display electrode area is as a whole (macroscopically) charged negatively and therefore, in the case of FIG. 8, a repulsive force is exerted on spacers and the spacers tend to be turned out of the display electrode area to the region where no electric field is formed. Here, by applying a negative voltage to the dummy electrodes 21, it becomes possible to turn back the spacers and dispose the spacers also in predetermined display electrode gaps in the display electrode end portions to thereby maintain the predetermined spacer density in the display electrode end portions and in the middle portions of the display electrodes.

While the method of electric field control mentioned above referring to the above embodiment is based on the provision of dummy electrodes 21 on the substrate having display electrodes formed thereon, another method is also available which comprises applying a voltage to the stage on which the substrate having display electrodes formed thereon is fixed or to the wall of the spacer sprayer to thereby produce the same effects. However, when dummy electrodes for controlling the electric field are disposed on the stage on which the insulating substrate is set, or on the wall of the particle sprayer, it becomes necessary to position the insulating substrate at a location equivalent in relation to the dummy electrodes provided outside the insulating substrate. This is unfavorable from the industrial viewpoint.

When dummy electrodes are provided on the wall of the particle sprayer and when the insulating substrate is a dual panel one from which two liquid crystal display devices are to be excised, the intended effect is not produced along the neighboring sides of the two panels.

Furthermore, when dummy electrodes are provided outside the insulating substrate, the distance from the display electrode area increases, hence it becomes necessary to apply, to the dummy electrodes, a voltage much higher than the voltage conventionally applied to the electrodes. This is unfavorable from the industrial viewpoint.

On the other hand, by controlling the voltage applied to the dummy electrode according to the first aspect of the invention, it becomes possible to control also the density of spacers disposed in the peripheral portions of the display area and to exactly control the substrate cell thickness, which depends on the spacer disposition density.

While the above embodiment is concerned with a simple matrix type liquid crystal display device, the first aspect of the present invention is applicable not only to such simple matrix type liquid crystal display device but of course also to such liquid crystal display devices as ferroelectric liquid crystal display devices or TFT type liquid crystal display devices.

In producing liquid crystal display devices by applying the method of spraying particles according to the first aspect of the invention, it is possible, by applying a voltage to an electrode (dummy electrodes) outside the display area so that a repulsive force may operate on spacers (particles), to form an electric field which pushes back spacers, which tend to move out of the display electrode area, by the macroscopic potential gradient (gradient of magnitude of repulsive force) above the periphery of the display electrode area; it is now possible to dispose spacers even in interelectrode gaps in the display electrode end portions, where spacer disposition is difficult to attain, with a high probability, hence it is possible to provide higher quality liquid crystal display devices. It is also possible to control the density of spacers disposed in the peripheral portions of the display area and thus provide liquid crystal display devices still more higher in display quality.

The method for producing a liquid crystal display device according to the second aspect of the invention comprises spraying spacers onto at least one of a first substrate comprising at least pattern-forming transparent electrodes and having a display area and a second substrate to be disposed oppositely above the first substrate and filling a liquid crystal into the space between both the substrates, wherein accessory electrodes are provided outside the display area and, in spraying positively or negatively charged spacers onto the above substrate, two or more voltages of different levels are applied to respective transparent electrodes, and a voltage is applied to the accessory electrodes as well to thereby control the electric field generated above the transparent electrodes, and above the accessory electrodes so as to cause selective spacer disposition only in predetermined transparent electrode gaps among the gaps between respective neighboring transparent electrodes.

The above-mentioned pattern-forming transparent electrodes, substrate, spacers and spacer charging method are the same as explained above in relation to the first aspect of the invention.

In applying the method for producing a liquid crystal display device according to the second aspect of the invention to the production of TFT type liquid crystal display devices, transparent electrode-free areas are formed on the color filter substrate, which is a common electrode substrate, by etching or the like at sites just below the black matrix portions and then spacers are disposed on the substrate by the method for producing a liquid crystal display device according to the second aspect of the invention. Although the common electrode substrate in an ordinary TFT type liquid crystal display device has a solid electrode, even etched area-carrying transparent electrodes can be driven in the same manner as in ordinary TFT type liquid crystal display devices by applying the same voltage to the respective electrodes.

In accordance with the second aspect of the invention, accessory electrodes are provided outside the display area and, in spraying charged spacers, two or more voltages differing in value are applied the respective transparent electrodes and a voltage is applied to the accessory electrodes as well to control the electric field generated above the transparent electrodes and above the accessory electrodes and thereby control the repulsive force or attractive force exerted on charged spacers or the repulsive and attractive forces exerted on such spacers so as to create the trough of a synthetic repulsive force, the crest of a synthetic attractive force, or the crest of an attractive force synthesized from a repulsive force and an attractive force in each of predetermined transparent electrode gaps among the gaps between respective neighboring transparent electrodes for selective spacer disposition only in the predetermined transparent electrode gaps.

The voltage to be applied to the electrodes is not particularly restricted in kind but, for example, a direct current voltage, a pulse voltage may properly be used.

The manner of applying the two or more voltages differing in value to the respective transparent electrodes is based on a certain application pattern, such that the places, at which the electric field formed on the basis of two or more voltages differing in value as applied to the respective transparent electrodes exerts the strongest attractive force and/or the weakest repulsive force on spacers, correspond to the positions of the transparent electrode gaps.

The places at which the strongest attractive force is exerted are those places among the crests of a synthetic attractive force or the crests of an attractive force synthesized from a repulsive force and an attractive force as formed in the predetermined transparent electrode gaps among the gaps between respective neighboring transparent electrodes at which the attractive force acts most strongly, while the places at which the weakest repulsive force is exterted are those places among the troughs of a synthetic repulsive force or the troughs of a repulsive force synthesized from a repulsive force and an attractive force as formed in the predetermined transparent electrode gaps among the gaps between respective neighboring transparent electrodes at which the repulsive force acts most weakly.

Here, when spacers are intended to be disposed in transparent electrode gaps by merely applying a voltage of the same polarity as the spacer charge polarity to the pattern-forming transparent electrodes in spraying spacers, a force (repulsive force) repelling falling spacers from the display area to the outside of the display area acts, as shown in FIG. 1, in the substrate end portions where no transparent electrode exists, as explained in detail hereinabove referring to the first aspect of the invention; in particular, in the vicinity of the periphery of the display area, there is no repulsive force above the substrate outside the display area, so that spacers to be disposed in the peripheral portions of the display area escape outside or, when the region outside the display area is wide, spacers are sprayed concentratedly in the region outside the display area, with the result that only an insufficient number of spacers are present in the peripheral portions of the display area, hence the cell thickness of the liquid crystal display device produced becomes reduced in those portions, which may possibly lead to display unevenness or irregular display on the liquid crystal display device.

Figure 10:
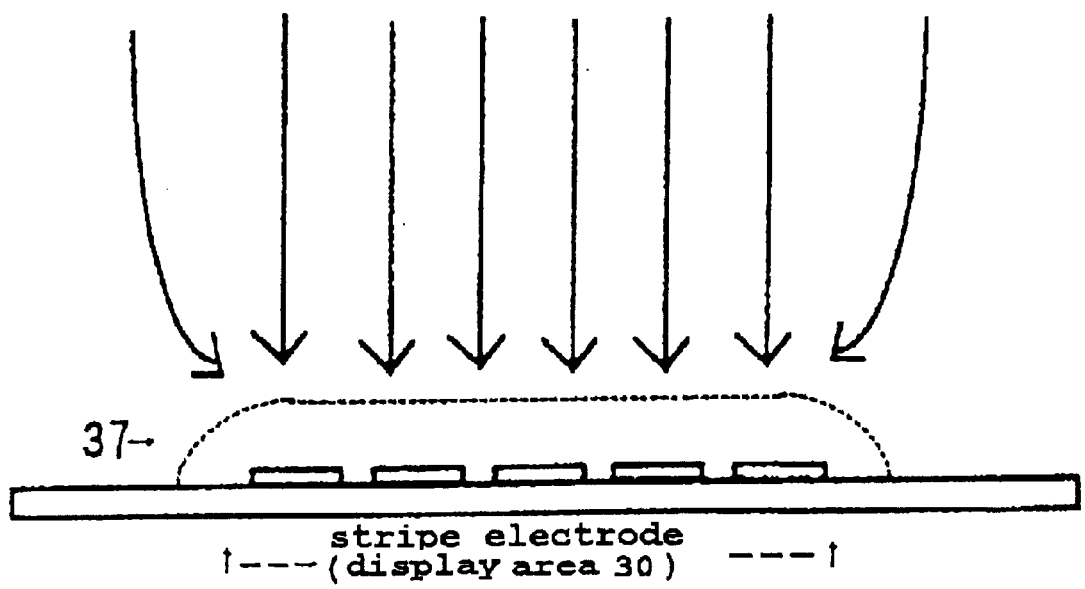
FIG. 10 is a schematic view illustrating a trouble encountered when the polarity of the voltage applied to the transparent electrodes is reverse to the spacer charge polarity.

On the other hand, when an electric field exerting an attractive force above the transparent electrodes is utilized, a phenomenon of the electric field extending to the portions where no electrode exists occurs, as shown in FIG. 10, since there is an extended electric field on the periphery of the substrate. Therefore, when a voltage reverse in polarity to the spacer charge is applied to the transparent electrodes, an attractive force acts, thus a force drawing sprayed and falling spacers inwardly from the outside of the display area acts and a phenomenon occurs that the number of spacers increases in the outermost region larger than the number in the display area.

To prevent the above two phenomena illustrated by FIG. 1 and FIG. 10, a voltage is applied to the accessory electrodes provided outside the display area in accordance with the second aspect of the invention, so that a repulsive or attractive force can be exerted on spacers from outside the display area, whereby spacers can be prevented from going out of the display area or coming in from outside the display area.

As a result, spacers can be disposed selectively in predetermined transparent electrode gaps and the spacer disposition density can be controlled even in the vicinity of the periphery of the display area as in the central region. Thus, it is possible, in liquid crystal display devices, to attain a uniform spacer disposition density within the display area and improve the contrast by preventing light leakage from spacers without sacrificing the aperture ratio.

Further, when the predetermined transparent electrode gaps in which spacers are to be selectively disposed are provided between respective neighboring transparent electrodes to which the same voltage is applied, the repulsive forces or attractive forces become equalized, said repulsive forces or attractive forces being exerted from predetermined two neighboring transparent electrodes upon application of two or more voltages differing in value to the respective transparent electrodes, on charged spacers which have moved to the trough of a synthetic repulsive force, the crest of a synthetic attractive force or the crest of an attractive force synthesized from a repulsive force and an attractive force as exerted on the spacers.

Thus, in cases where repulsive forces act on spacers, the spacers can be selectively disposed in each predetermined transparent electrode gap alone with a good probability in a manner such that they are pushed by equal repulsive forces exerted by the corresponding predetermined two neighboring transparent electrodes and, in cases where attractive forces act on spacers, in a manner such that they are attracted by equal attractive forces exerted by the corresponding predetermined two neighboring transparent electrodes.

Further, when, in cases where spacers are charged positively, the predetermined transparent electrode gaps in which spacers are to be disposed selectively are provided between the respective neighboring transparent electrodes to which the lowest voltage of the two or more voltages differing in value to be applied to the transparent electrodes is applied and, in cases where spacers are charged negatively, they are provided between the respective neighboring transparent electrodes to which the highest voltage of the two or more voltages differing in value to be applied to the transparent electrodes is applied, the trough of a synthetic repulsive force, the crest of a synthetic attractive force, or the crest of an attractive force synthesized from a repulsive force and an attractive force can be formed in each predetermined transparent electrode gap.

Thus, in the case of positively charged spacers, a repulsive force acts on them most weakly when the lowest voltage applied to the predetermined neighboring transparent electrodes is positive and, when the lowest voltage applied to the predetermined neighboring transparent electrodes is negative, an attractive force acts on them most strongly, so that they move to the gaps between those transparent electrodes to which the lowest voltage is applied.

In the case of negatively charged spacers, an attractive force acts on them most strongly when the highest voltage applied to the predetermined neighboring transparent electrodes is positive and, when the highest voltage applied to the predetermined neighboring transparent electrodes is negative, a repulsive force acts on them most weakly, so that they move to the gaps between those transparent electrodes to which the highest voltage is applied.

Therefore, spacers can be disposed selectively in the predetermined transparent electrode gaps alone with a better probability.

Further, when, in cases where spacers are charged positively, the lowest voltage is of negative polarity or when, in cases these spacers are charged negatively, the highest voltage is of positive polarity, spacers move to the crest of a synthetic attractive force or the crest of an attractive force synthesized from a repulsive force and an attractive force generated between the electrodes constituting the predetermined transparent electrode gaps, and spacers are further attracted by equalized attractive forces exerted by the two neighboring transparent electrodes.

Therefore, spacers can be disposed selectively in the predetermined transparent electrode gaps alone with a higher probability.

Further, when the voltage or voltages other than the lowest or highest one which are applied to transparent electrodes are of the same polarity as the spacer charge polarity, an attractive force generated between the electrodes constituting the predetermined transparent electrode gaps and spacers, and a repulsive force generated between other electrodes and spacers act on spacers and the spacers are pushed by the repulsive force generated between other electrodes and spacers, and attracted by the attractive force generated between the predetermined neighboring transparent electrodes, and thus move toward the crest of an attractive force synthesized from the repulsive force and attractive force as formed in each predetermined transparent electrode gap and are further attracted by equalized attractive forces exerted from the predetermined two neighboring transparent electrodes.

Therefore, spacers can be disposed selectively in the predetermined transparent electrode gaps alone with a higher probability.

When the voltage for charging spacers and the two or more voltages applied to the transparent electrodes are of the same polarity, a strong repulsive force is generated between the other electrode(s) and spacers, and a weak repulsive force is generated between the predetermined neighboring electrodes and spacers, and the spacers are pushed by the strong repulsive force generated between them and the other electrode(s), and move to the trough of a synthetic repulsive force exerting between each predetermined transparent gap, and are further pushed toward the predetermined transparent electrode gap by the repulsive force, so that the spacers can be disposed selectively in the predetermined transparent electrode gaps alone with a higher probability.

In particular, this constitution makes it possible to dispose spacers concentratedly in the middle of each predetermined transparent electrode gap, since spacers are disposed in the predetermined transparent electrode gaps in a manner such that they are pushed by a repulsive force.

Therefore, the probability of spacers being disposed in edge portions of the predetermined neighboring transparent electrodes can be minimized.

In cases where the electric field above the display area as a whole exerts a repulsive force on spacers, the polarity of the voltage applied to accessory electrodes is selected so that a repulsive force may be exerted on spacers and, in cases where the electric field above the display area as a whole exerts an attractive force on spacers, the polarity of the voltage applied to accessory electrodes is selected so that an attractive force may be exerted on spacers, whereby spacers can be inhibited from migrating out of the display area by exerting a repulsive force, from outside the display area, on spacers in the vicinity of the edge portions of the display area even when the display area as a whole exerts a repulsive force on the spacers and, even when the display area as a whole exerts an attractive force on spacers, the spacers occurring outside the display area can be inhibited from coming into the display area from the outside thereof by exerting an attractive force thereon from outside the display area.

Therefore, it is possible to attain a uniform spacer disposition density even in the vicinity of the periphery of the display area.

Furthermore, by selecting, as the voltage applied to accessory electrodes, the same voltage as that voltage among the two or more voltages differing in voltage value as applied to the transparent electrodes, which causes the strongest repulsive force or attractive force to exert on spacers, it is possible to exert a sufficient repulsive or attractive force on spacers to inhibit spacers from migrating out of and from outside the display area.

Therefore, it is possible to attain a uniform spacer disposition density even in the vicinity of the periphery of the display area.

When the above transparent electrodes are stripe-shaped ones, and the accessory electrodes are disposed along and parallel to the longer side of the transparent electrodes, the migration of spacers can be effectively suppressed on both longer sides of the stripe-shaped transparent electrodes, where, among the four sides forming the display area, spacers tend to readily migrate out of the display area or come into the display area from the outside.

Therefore, it is possible to attain a uniform spacer disposition density even in the vicinity of the periphery of the display area.

Further, by providing the accessory electrodes according to an electrode pattern nearly identical with that of transparent electrodes, it becomes possible not only to form the accessory electrode and transparent electrodes simultaneously using the same material and thereby simplify the production process but also to produce the same electric field above the outside of the display area as that above the inside of the display area and thereby attain a uniform spacer disposition density within the display area.

By utilizing, as the accessory electrodes, those dummy electrodes provided for reducing the level difference caused by the transparent electrodes, it is possible to realize the second aspect of the invention while applying the conventional electrode patterns.

Therefore, it is possible to attain a uniform spacer disposition density even in the vicinity of the periphery of the display area.

Further, by utilizing, as the accessory electrodes, those dummy electrodes provided for some other purpose and not applying display voltage thereto, it is possible to realize the second aspect of the invention while utilizing the conventional electrode patterns.

As the above dummy electrodes, there may be mentioned those explained hereinabove referring to the first aspect of the invention.

Now, referring to FIGS. 11 to 39, typical embodiments of the second aspect of the invention are described.

In the production of liquid crystal display devices, spacer spraying is generally carried out by charging an appropriate quantity of spacers by the charging method mentioned above, and spraying and disposing them onto the substrate by means of compressed air, compressed nitrogen or the like, as described referring to the first aspect of the invention.

Figure 11:
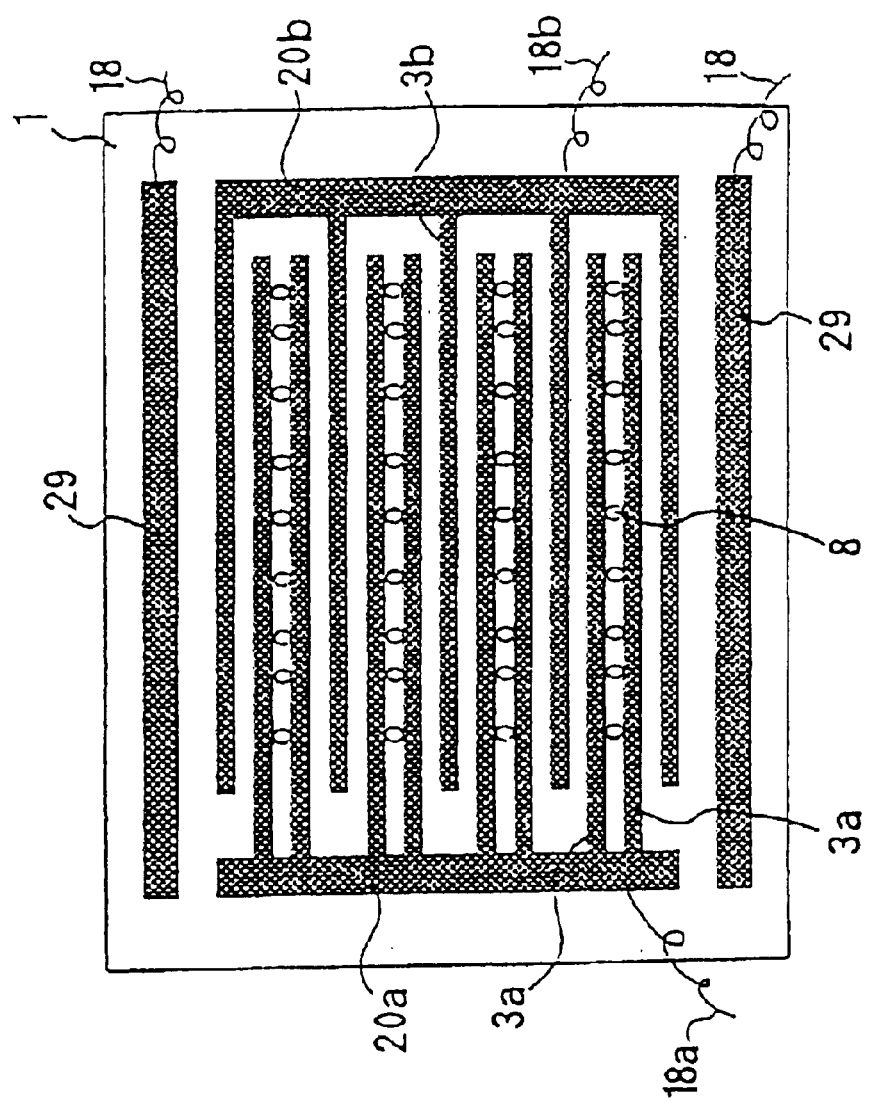
FIG. 11 is a plan view illustrating the electrode pattern in an embodiment of the present invention.
Figure 12:
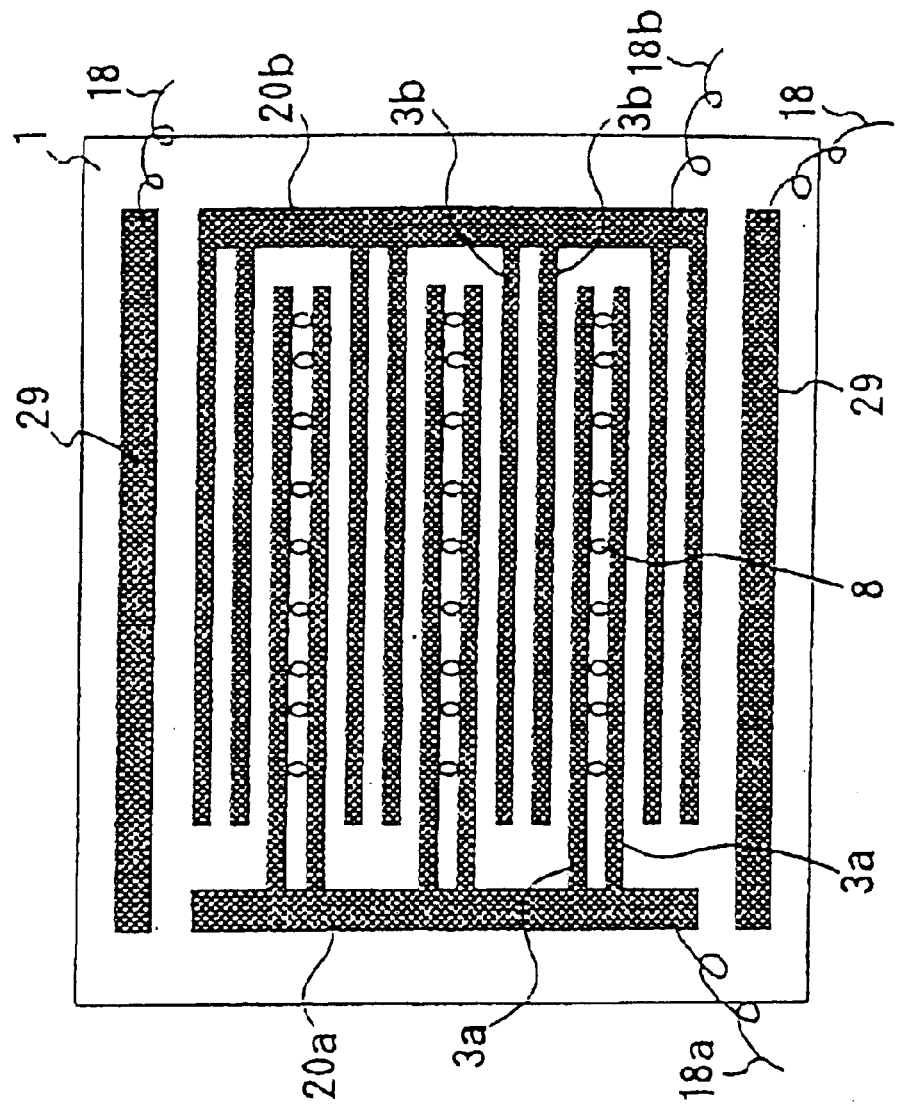
FIG. 12 is a plan view illustrating the electrode pattern in another embodiment of the present invention.

FIG. 11 and FIG. 12 each is a schematic view showing an electric pattern to be applicable in the practice of the second aspect of the invention. As shown in FIG. 11 and FIG. 12, stripe-shaped display electrodes 3a and 3b, auxiliary electrodes 20a and 20b for applying a voltage to the display electrodes 3a and 3b, respectively, and accessory electrodes 29 provided outside the display area are formed on an insulating substrate 1.

Conductor wires 18, 18a and 18b are connected with the auxiliary electrodes 20a and 20b and accessory electrodes 29 for forming an electric field by applying voltages to the auxiliary electrodes 20a and 20b and accessory electrodes 29. Voltages may be applied directly to the auxiliary electrodes 20a and 20b and accessory electrodes 29 by means of probe pins or the like without providing the conductor wires 18, 18a and 18b, or voltages may be applied directly to the display electrodes 3a and 3b by means of probe pins or the like without providing the auxiliary electrodes 20a and 20b.

The display electrodes 3a occur in pairs of two neighboring display electrodes. The display electrodes 3b occur between a pair of display electrodes 3a and another pair of display electrodes 3a. In FIG. 11, one display electrode 3b occurs and, in FIG. 12, two display electrodes 3b occur.

As for the accessory electrodes 29, those dummy electrodes which are formed also in the conventional electrode patterns for reducing the level difference caused by the display electrodes and controlling the liquid crystal layer thickness to maintain its uniformity may be utilized as the accessory electrodes 29.

Those dummy electrodes which are formed in the conventional electrode patterns and to which no display voltage is applied may also serve as the accessory electrodes 29.

Figure 13:
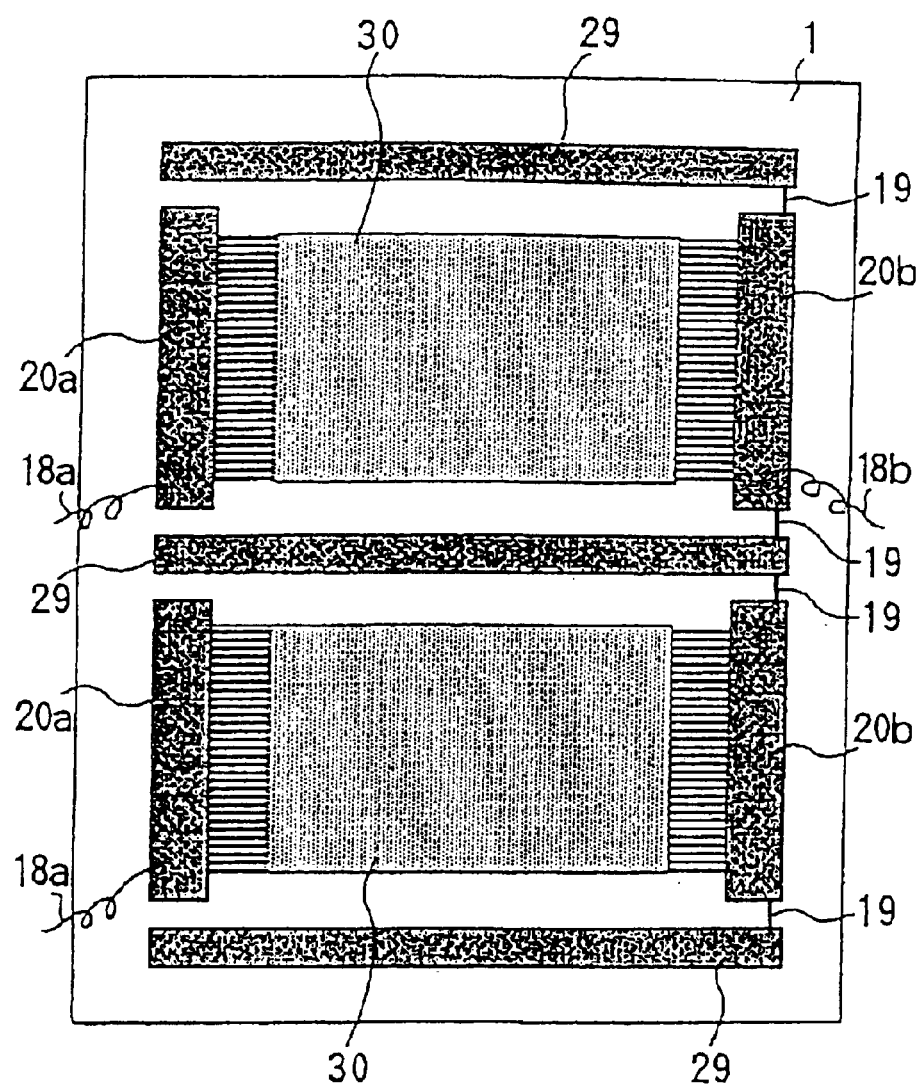
FIG. 13 is a plan view illustrating the electrode pattern on one of a pair of insulating substrates in producing two liquid crystal display devices from the pair of insulating substrates in an embodiment of the present invention.

FIG. 13 is a schematic view showing an electrode pattern for one insulating substrate in the production of two liquid crystal display devices from a pair of insulating substrates in an embodiment of the second aspect of the invention. As shown in FIG. 13, the accessory electrodes 29 are disposed only in those areas outside each display area 30 as seen in the vertical direction of FIG. 13. This is because the auxiliary electrodes 20a and 20b are formed in those areas outside each display area 30 as seen in the horizontal direction of FIG. 13, and the auxiliary electrodes 20a and 20b produce the same effect as the accessory electrodes 29. The auxiliary electrodes 20b and the accessory electrodes 29 are connected with each other by conductors, so that the same voltage is applied to them.

Figure 14:
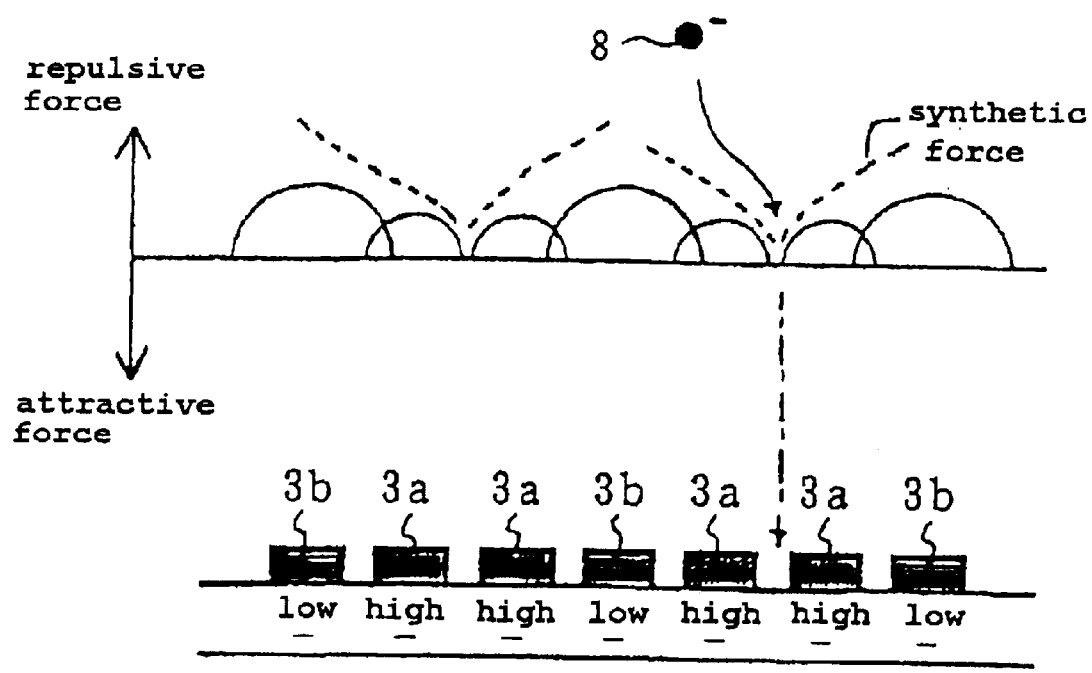
FIG. 14 is a schematic view illustrating the method of disposing spacers by means of an electric field in the middle of the display area in an embodiment of the present invention.
Figure 15:
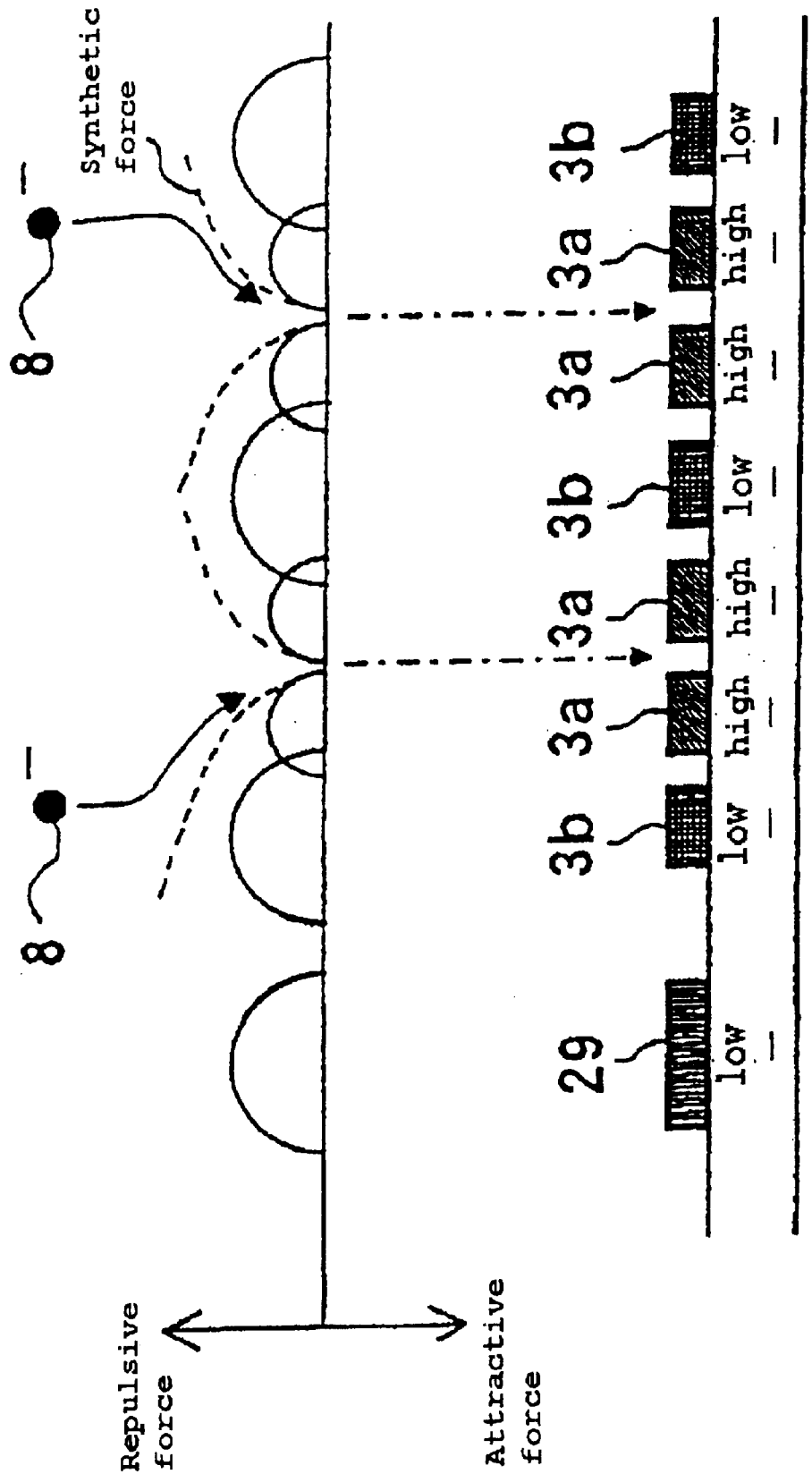
FIG. 15 is a schematic view illustrating the method of disposing spacers by means of an electric field in the vicinity of the periphery of the display area in an embodiment of the present invention.
Figure 16:
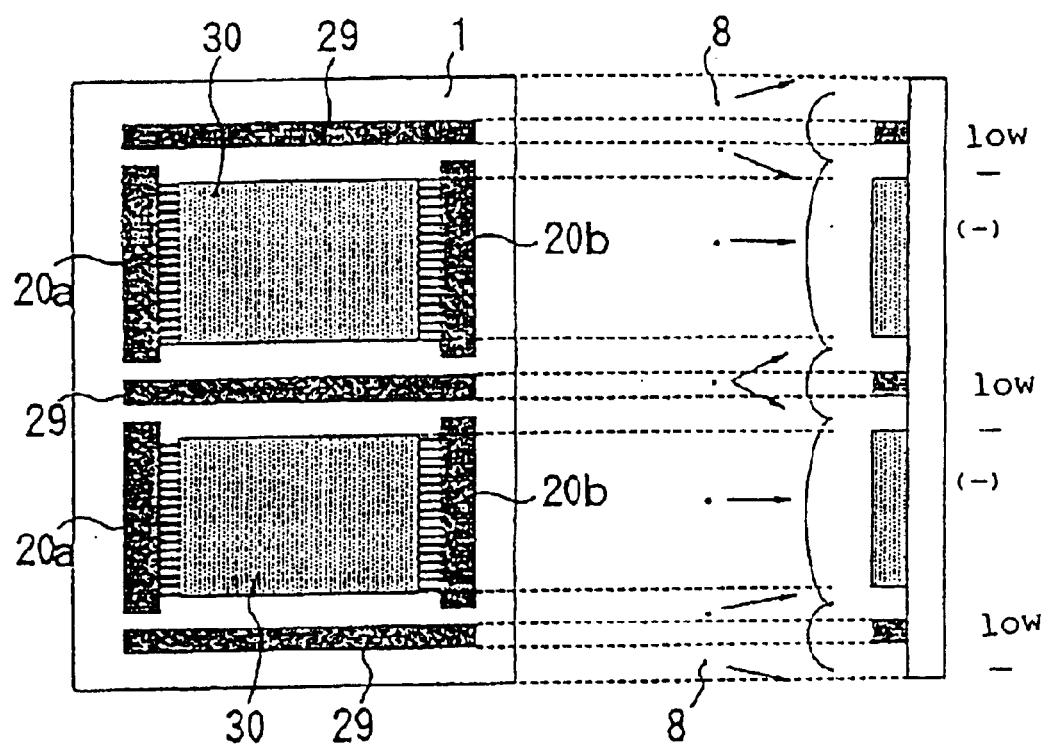
FIG. 16 is a schematic view illustrating how spacers move under the influence of an electric field all over the whole display area in an embodiment of the present invention.

By using such an electrode pattern as shown in FIG. 11 and applying voltages differing in voltage value to the auxiliary electrodes 20a and 20b and the accessory electrodes 29, negative (−) voltages are applied to the display electrodes 3a and 3b and the accessory electrodes 29, wherein the voltage applied to the display electrodes 3a is relatively higher than that applied to the display electrodes 3b and the accessory electrodes 29, as shown in FIGS. 14 to 16. Further, spacers 8 are charged negatively and then sprayed.

In this way, it is possible to dispose spacers 8 only in each space between the paired display electrodes 3a in a manner such that spacers 8 can be disposed uniformly in spaces between respective paired display electrodes 3a throughout the display area including those spaces between respective paired display electrodes 3a in the vicinity of the edge portions of the display area 30.

Thus, as shown in FIG. 14 and FIG. 15, as the sprayed and falling spacers 8 approach the display electrodes 3a and 3b, repulsive forces based on the electric fields generated above the display electrodes 3a and 3b and the accessory electrodes 29 act on the spacers 8, and each spacer goes away from the display electrode 3b or accessory electrode 29 each exerting a strong repulsive force on it, and moves toward the nearest pair of display electrodes 3a generating a weak repulsive force. The spacer 8 that has moved to the display electrodes 3a is pushed by equal repulsive forces respectively exerted by the two neighboring display electrodes 3a, and falls between the display electrodes 3a.

Since the display area 30 as a whole is negatively charged, a repulsive force acts on spacers 8 in the vicinity of each edge portion of the display area 30 and tends to move them outside the display area 30, as shown in FIG. 16. This movement of spacers 8 to the outside of the display area 30, however, can be prevented since a voltage capable of generating a strong repulsive force is applied to the accessory electrodes 29.

The semicircles in FIG. 14 and FIG. 15 schematically indicate repulsive forces acting on spacers 8 and the magnitude of each repulsive force acting on spacers 8 is represented by the size of the semicircle. The broken line schematically indicates the synthetic repulsive force acting on spacers 8.

The semiellipses shown in FIG. 16 schematically indicate repulsive forces acting on spacers 8.

In the above embodiment, spacers 8 fall into each space between two neighboring display electrodes 3a while they are pushed by equal repulsive forces respectively exerted by the display electrodes 3a, so that the spacers 8 can be disposed concentratedly in the middle of each space between display electrodes 3a and thus the probability that spacers 8 may be disposed on edge areas of the display electrodes 3a can be minimized.

Figure 17:
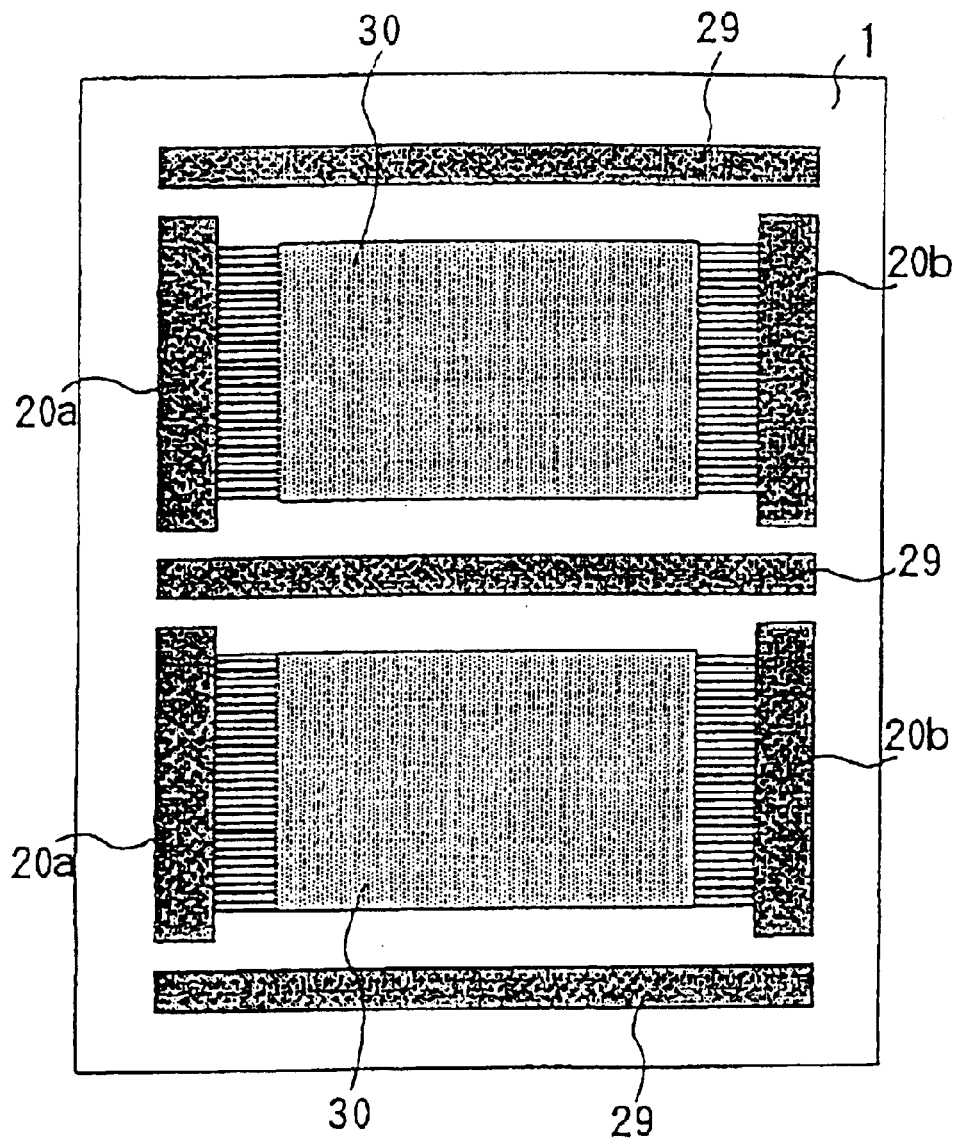
FIG. 17 is a plan view illustrating the electrode pattern on one of a pair of insulating substrates in producing two liquid crystal display devices from the pair of insulating substrates in an embodiment of the present invention.

FIG. 17 is a schematic view showing an electrode pattern for one insulating substrate in the production of two liquid crystal display devices from a pair of insulating substrates in an embodiment of the second aspect of the invention. As shown in FIG. 17, the accessory electrodes 29 are disposed only in those areas which are outside each display area 30 as seen in the vertical direction of FIG. 17. This is because the auxiliary electrodes 20a and 20b are formed in those areas which are outside each display area 30 as seen in the horizontal direction of FIG. 17 and the auxiliary electrodes 20a and 20b produce the same effect as the accessory electrodes 29.

Figure 18:
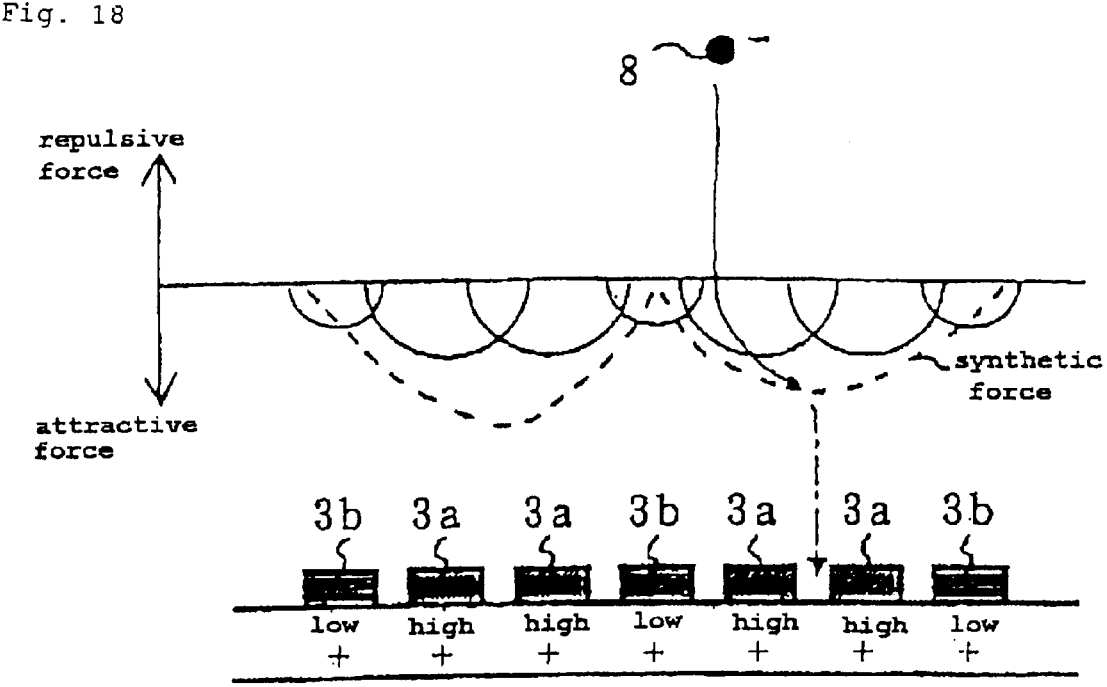
FIG. 18 is a schematic view illustrating the method of disposing spacers by means of an electric field in the central portion of the display area in an embodiment of the present invention.
Figure 19:
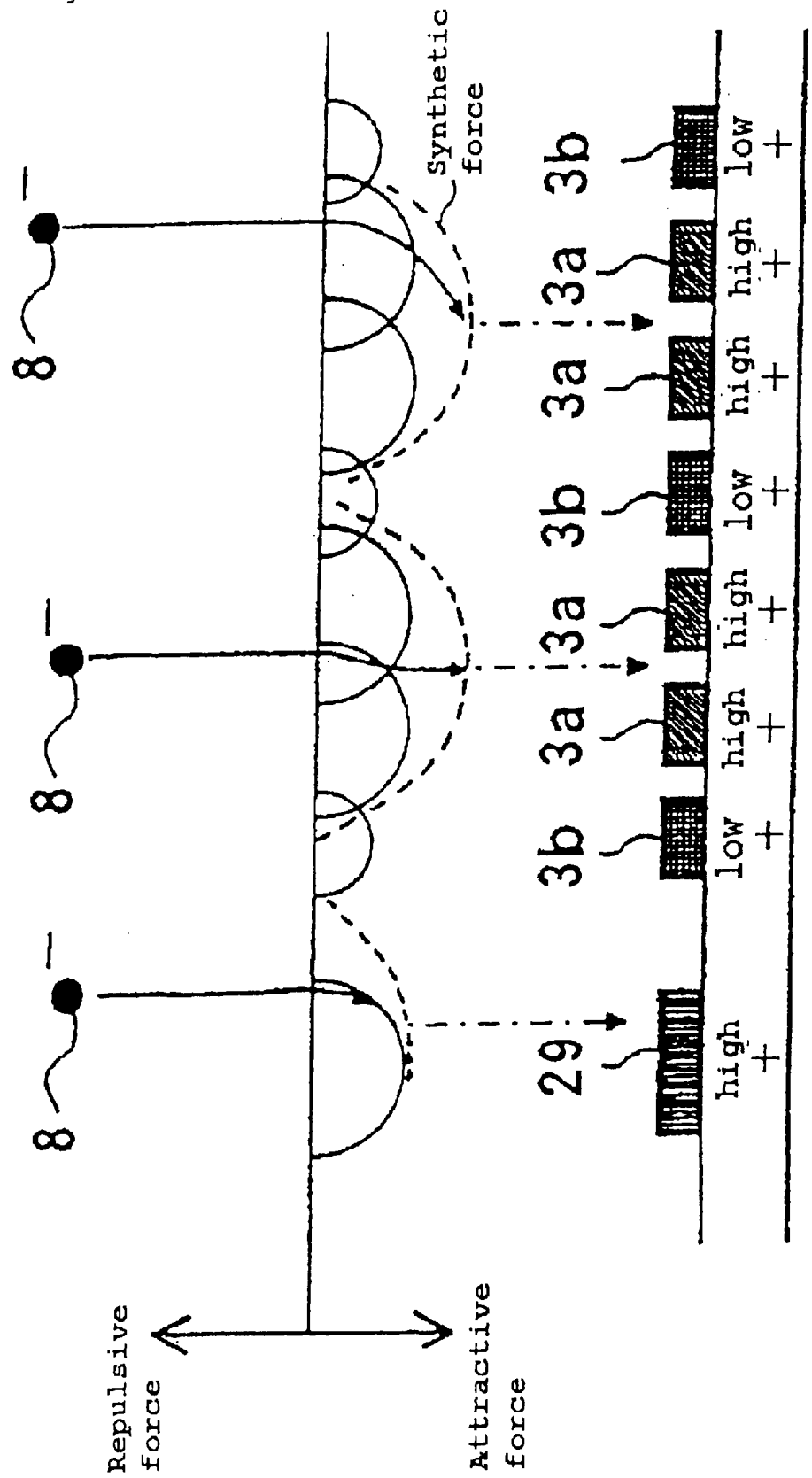
FIG. 19 is a schematic view illustrating the method of disposing spacers by means of an electric field in the vicinity of the periphery of the display area in an embodiment of the present invention.
Figure 20:
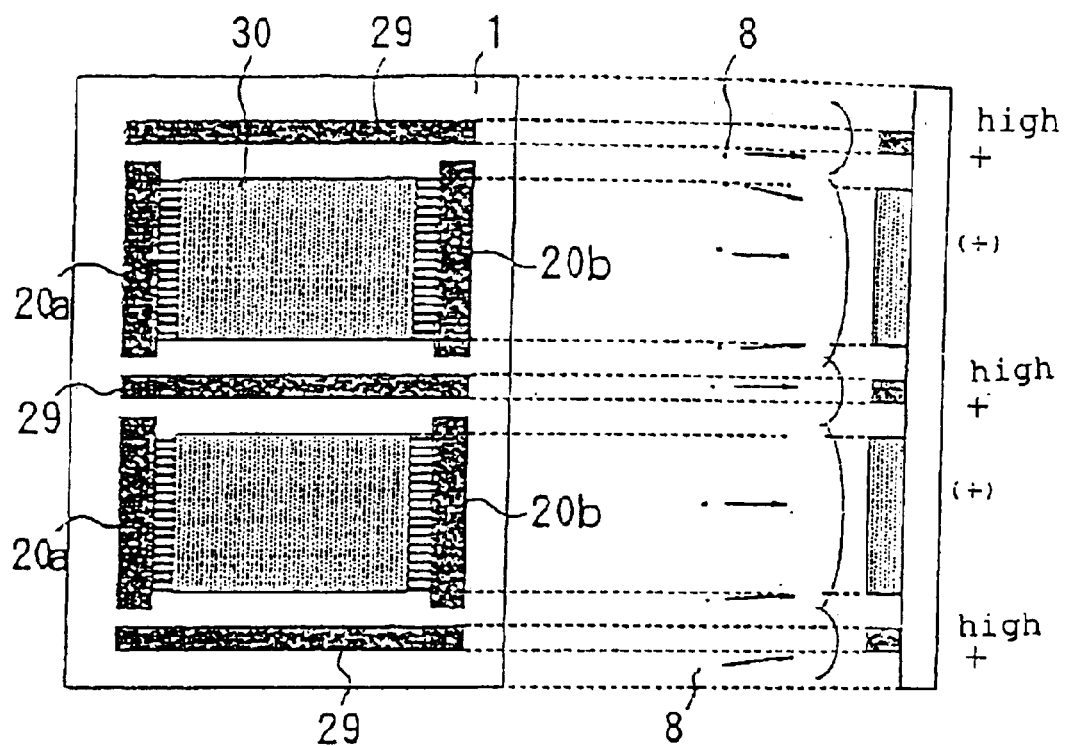
FIG. 20 is a schematic view illustrating how spacers move under the influence of an electric field all over the whole display area in an embodiment of the present invention.

By using such an electrode pattern as shown in FIG. 11 and applying voltages differing in voltage value to the auxiliary electrodes 20a and 20b and the accessory electrodes 29, positive (+) voltages are applied to the display electrodes 3a and 3b and the accessory electrodes 29, wherein the voltage applied to the display electrodes 3a and the accessory electrodes 29 is relatively higher than that applied to the display electrodes 3b, as shown in FIGS. 18 to 20. Further, spacers 8 are charged negatively and then sprayed.

In this way, it is possible to dispose spacers 8 only in each space between the paired display electrodes 3a in a manner such that spacers 8 can be disposed uniformly in spaces between respective paired display electrodes 3a throughout the display area 30 including those spaces between respective paired display electrodes 3a in the vicinity of the edge portions of the display area 30.

Thus, as shown in FIG. 18 and FIG. 19, as the sprayed and falling spacers 8 approach the display electrodes 3a and 3b, attractive forces act on the spacers 8, where said attractive forces are exerted by the electric fields generated above the display electrodes 3a and 3b and the accessory electrodes 29, and each spacer goes away from the display electrode 3b exerting a weak attractive force on it and moves toward the display electrode 3a and accessory electrode 29 generating a strong attractive force. The spacer 8 that has moved to the display electrode 3a is attracted by equal attractive forces respectively exerted by the two neighboring display electrodes 3a and falls between the display electrodes 3a.

Since the display area 30 as a whole is positively charged, an attractive force acts on spacers 8 in the vicinity of each edge portion of the display area 30 and tends to move them into the display area 30 from outside the display area 30, as shown in FIG. 20. This movement of spacers 8 from the outside of the display area 30 into the display area 30, however, can be prevented, and the density of spacers 8 disposed in respective spaces between paired display electrodes 3a can be maintained at a predetermined level since a voltage capable of generating a strong attractive force is applied to the accessory electrodes 29.

The semicircles in FIG. 18 and FIG. 19 schematically indicate attractive forces acting on spacers 8 and the magnitude of each attractive force acting on spacers 8 is represented by the size of the semicircle. The broken line schematically indicates the synthetic attractive force acting on spacers 8.

The semiellipses shown in FIG. 20 schematically indicate attractive forces acting on spacers 8.

Figure 21:
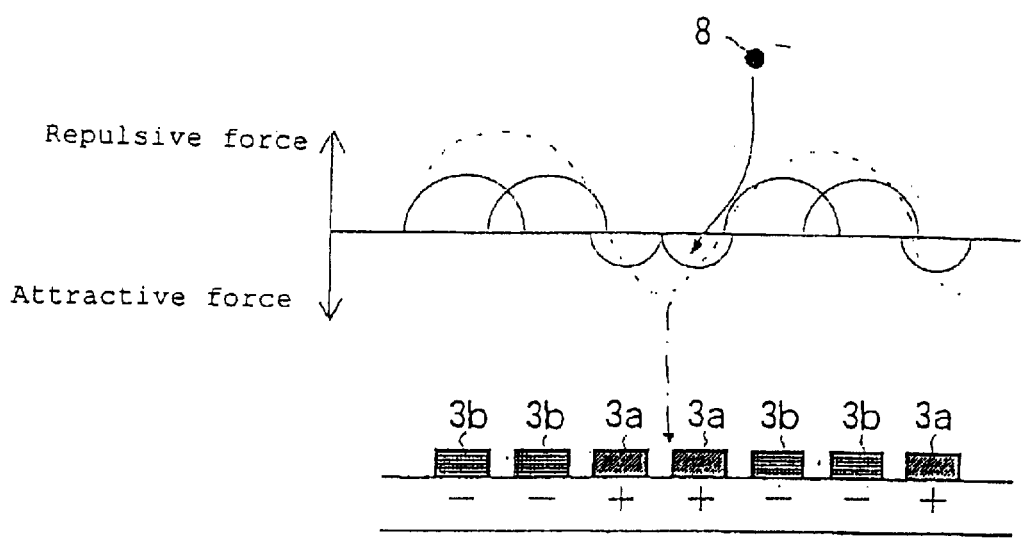
FIG. 21 is a schematic view illustrating the method of disposing spacers by means of an electric field in the central portion of the display area in an embodiment of the present invention.
Figure 22:
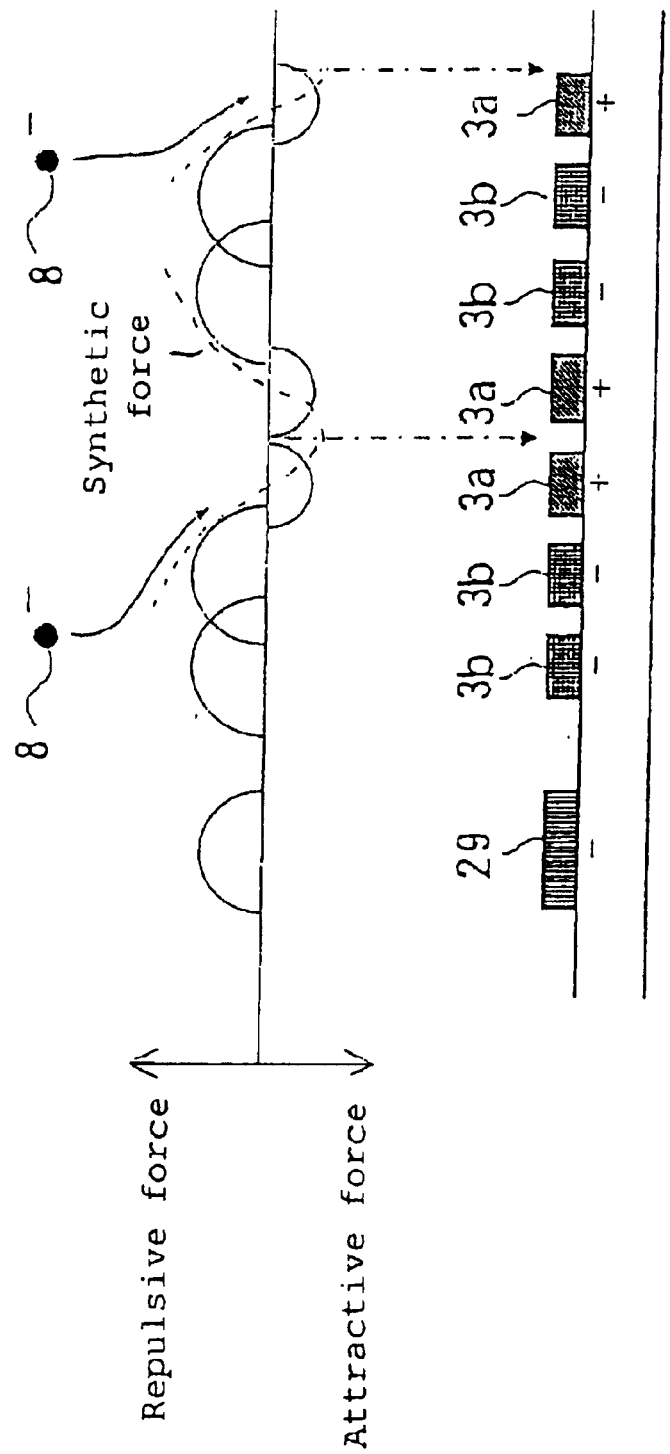
FIG. 22 is a schematic view illustrating the method of disposing spacers by means of an electric field in the vicinity of the periphery of the display area in an embodiment of the present invention.
Figure 23:
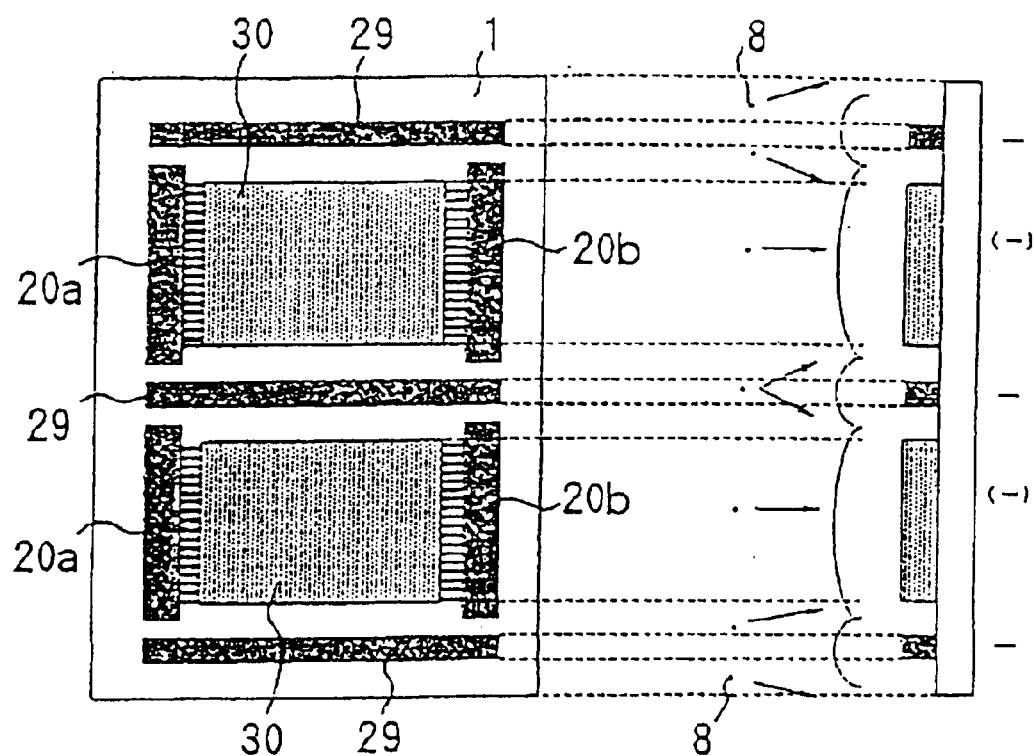
FIG. 23 is a schematic view illustrating how spacers move under the influence of an electric field all over the whole display area in an embodiment of the present invention.

By using such an insulating substrate electrode pattern as shown in FIG. 17 and applying, according to such an electrode pattern as shown in FIG. 12, voltages differing in voltage value to the auxiliary electrodes 20a and 20b and the accessory electrodes 29, a positive (+) voltage is applied to the display electrodes 3a and a negative (−) voltage to the display electrodes 3b and the accessory electrodes 29, so that the display area 30 as a whole is charged negatively, as shown in FIGS. 21 to 23. Further, spacers 8 are charged negatively and then sprayed.

In this way, it is possible to dispose spacers 8 only in each space between the paired display electrodes 3a in a manner such that spacers 8 can be disposed uniformly in spaces between respective paired display electrodes 3a throughout the display area 30 including those spaces between respective paired display electrodes 3a in the vicinity of the edge portions of the display area 30.

Thus, as shown in FIG. 21 and FIG. 22, as the sprayed and falling spacers 8 approach the display electrodes 3a and 3b, a repulsive force and an attractive force act on the spacers 8, where both the forces are exerted by the electric fields generated above the display electrodes 3a and 3b and the accessory electrodes 29 and each spacer goes away from the display electrode 3b or accessory electrode 29 each exerting a repulsive force on it, and moves toward the display electrode 3a generating an attractive force. The spacer 8 that has moved to the display electrode 3a is attracted by equal attractive forces respectively exerted by the two neighboring display electrodes 3a and falls between the display electrodes 3a.

Since the display area 30 as a whole is negatively charged, a repulsive force acts on spacers 8 in the vicinity of each edge portion of the display area 30, and tends to move them outside the display area 30, as shown in FIG. 23. This movement of spacers 8 to the outside of the display area 30 can be prevented, however, since a voltage capable of generating a repulsive force is applied to the accessory electrodes 29.

The semicircles in FIG. 21 and FIG. 22 schematically indicate repulsive forces and attractive forces acting on spacers 8 and the magnitude of each repulsive force acting on spacers 8 is represented by the size of the semicircle convex as seen from a above and the magnitude of each attractive force acting on spacers 8 by the size of the semicircle convex as seen from below. The broken line schematically indicates the synthetic repulsive or attractive force acting on spacers 8.

Figure 24:
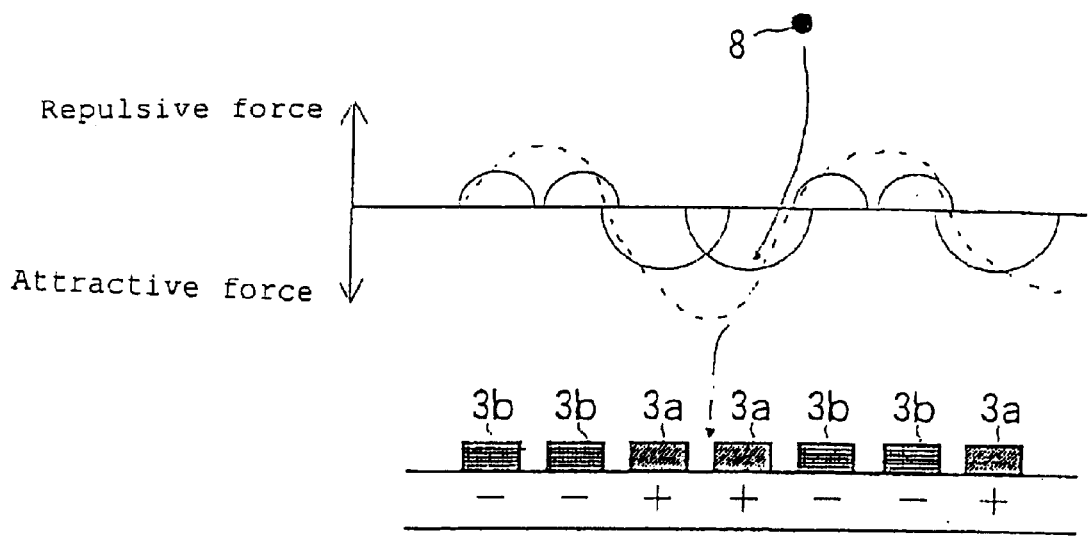
FIG. 24 is a schematic view illustrating the method of disposing spacers by means of an electric field in the central portion of the display area in an embodiment of the present invention.
Figure 25:
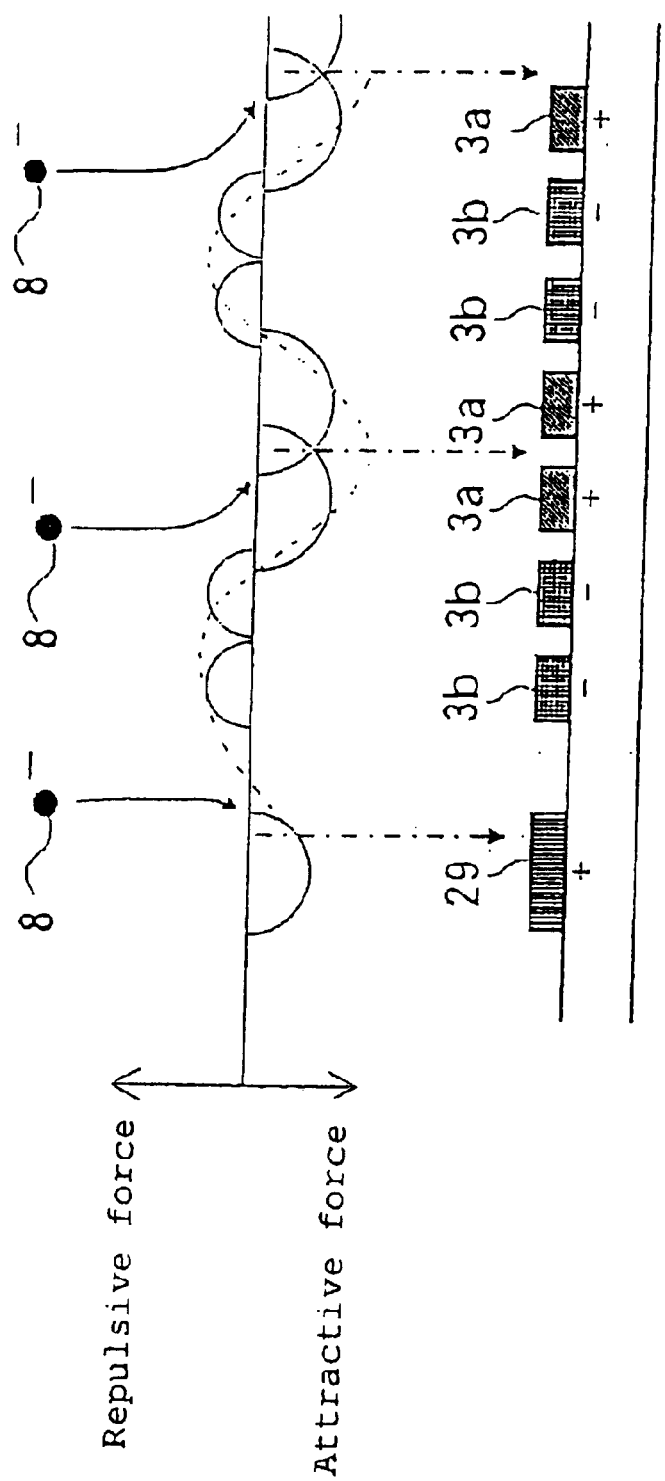
FIG. 25 is a schematic view illustrating the method of disposing spacers by means of an electric field in the vicinity of the periphery of the display area in an embodiment of the present invention.
Figure 26:
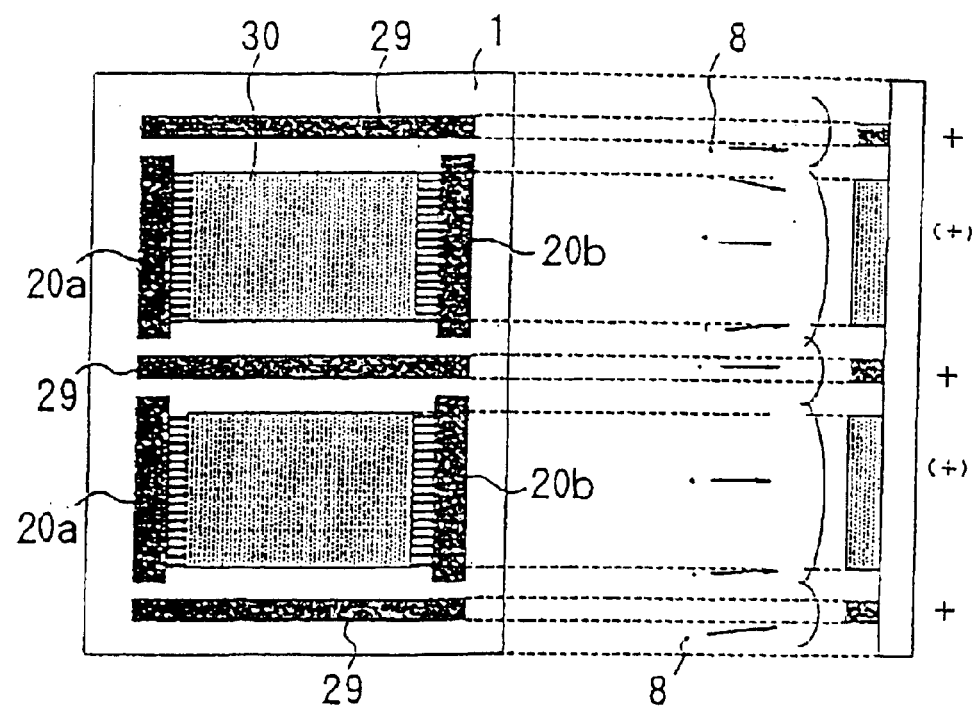
FIG. 26 is a schematic view illustrating how spacers move under the influence of an electric field all over the whole display area in an embodiment of the present invention.

By using such an insulating substrate electrode pattern as shown in FIG. 17 and applying, according to such an electrode pattern as shown in FIG. 12, voltages differing in voltage value to the auxiliary electrodes 20a and 20b and the accessory electrodes 29, a positive (+) voltage is applied to the display electrodes 3a and the accessory electrodes 20, and a negative (−) voltage to the display electrodes 3b, so that the display area 30 as a whole is charged positively, as shown in FIGS. 24 to 26. Further, spacers 8 are charged negatively and then sprayed.

In this way, it is possible to dispose spacers 8 only in each space between the paired display electrodes 3a in a manner such that spacers 8 can be disposed uniformly in spaces between respective paired display electrodes 3a throughout the display area 30 including those spaces between respective paired display electrodes 3a in the vicinity of the edge portions of the display area 30.

Thus, as shown in FIG. 24 and FIG. 25, as the sprayed and falling spacers 8 approach the display electrodes 3a and 3b, a repulsive force and an attractive force act on the spacers 8, where both the forces are exerted by the electric fields generated above the display electrodes 3a and 3b and the accessory electrodes 29, and each spacer goes away from the display electrode 3b exerting a repulsive force on it, and moves toward the display electrode 3a and accessory electrode 29 generating an attractive force. The spacer 8 that has moved to the display electrode 3a is attracted by equal attractive forces respectively exerted by the two neighboring display electrodes 3a and falls between the display electrodes 3a.

Since the display area 30 as a whole is positively charged, an attractive force acts on spacers 8 in the vicinity of each edge portion of the display area 30 and tends to move them into the display area 30 from outside the display area 30, as shown in FIG. 26. This movement of spacers 8 from the outside of the display area 30 into the display area 30, however, can be prevented, and the density of spacers 8 disposed in respective spaces between paired display electrodes 3a can be maintained at a predetermined level since a voltage capable of generating an attractive force is applied to the accessory electrodes 29.

Figure 27:
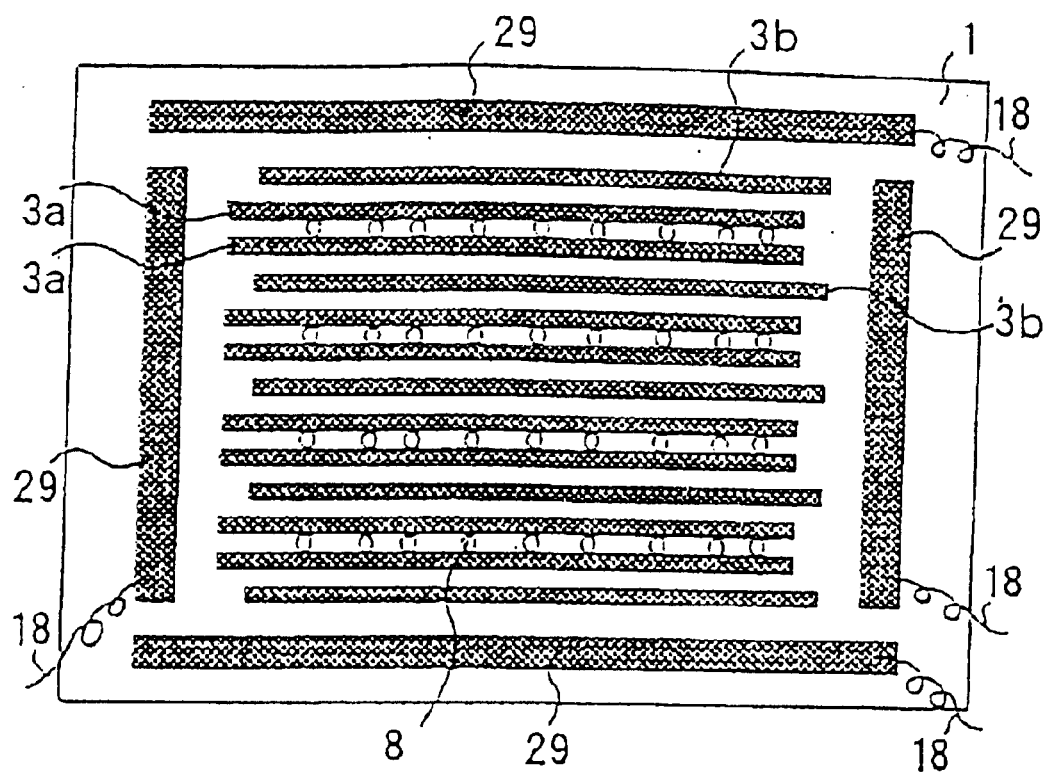
FIG. 27 is a plan view illustrating the electrode pattern in an embodiment of the present invention.

FIG. 27 is a schematic view showing an electrode pattern to be used in the practice of the second aspect of the invention.

Figure 28:
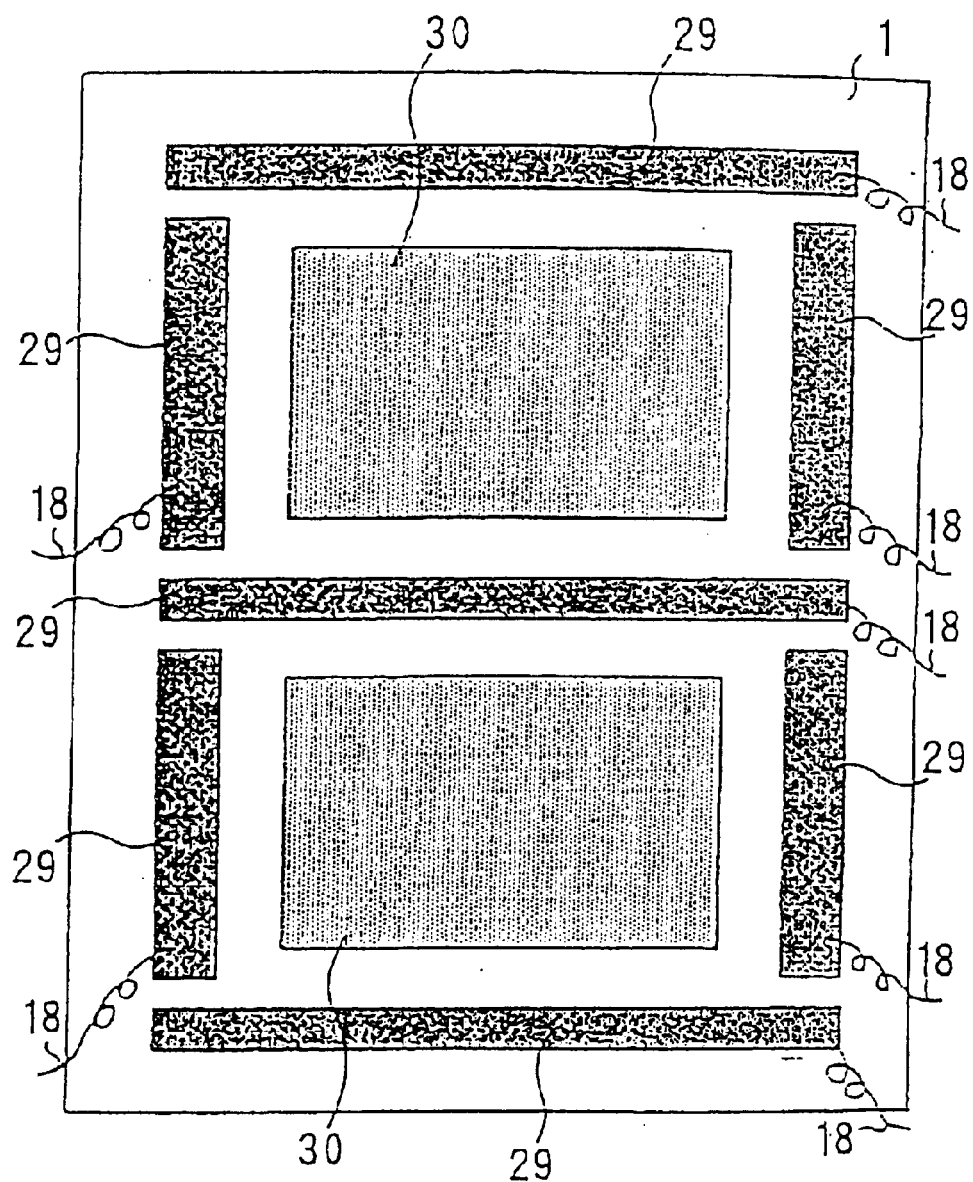
FIG. 28 is a plan view illustrating the electrode pattern on one of a pair of insulating substrates in producing two liquid crystal display devices from the pair of insulating substrates in an embodiment of the present invention.

FIG. 28 is a schematic view showing an electrode pattern for one insulating substrate in the production of two liquid crystal display devices from a pair of insulating substrates in an embodiment of the second aspect of the invention. As shown in FIG. 27 and FIG. 28, the accessory electrodes 29 are disposed outside the display area 30 so as to surround the display area 30.

The accessory electrodes 29 are each connected with a conductor wire 18 for voltage application to the accessory electrodes 29 for electric field formation. A voltage may also be applied directly to the accessory electrodes 29 by means of probe pins or the like without providing such conductor wire 18.

The display electrodes 3a occur in pairs of two neighboring display electrodes. The display electrodes 3b occur between a pair of display electrodes 3a and another pair of display electrodes 3a. In FIG. 27, one display electrode 3b occurs between two pairs of display electrodes 3a.

Figure 29:
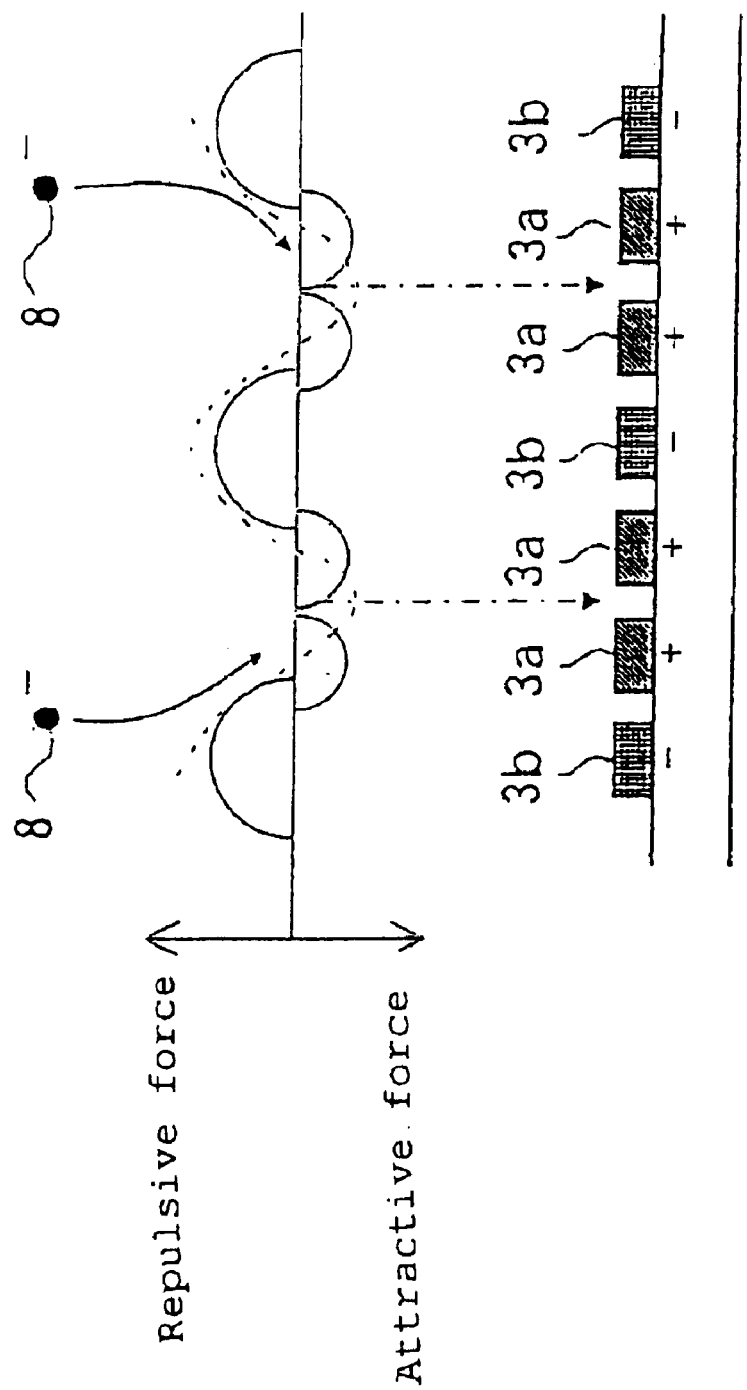
FIG. 29 is a schematic view illustrating the method of disposing spacers by means of an electric field in the central portion of the display area in an embodiment of the present invention.
Figure 30:
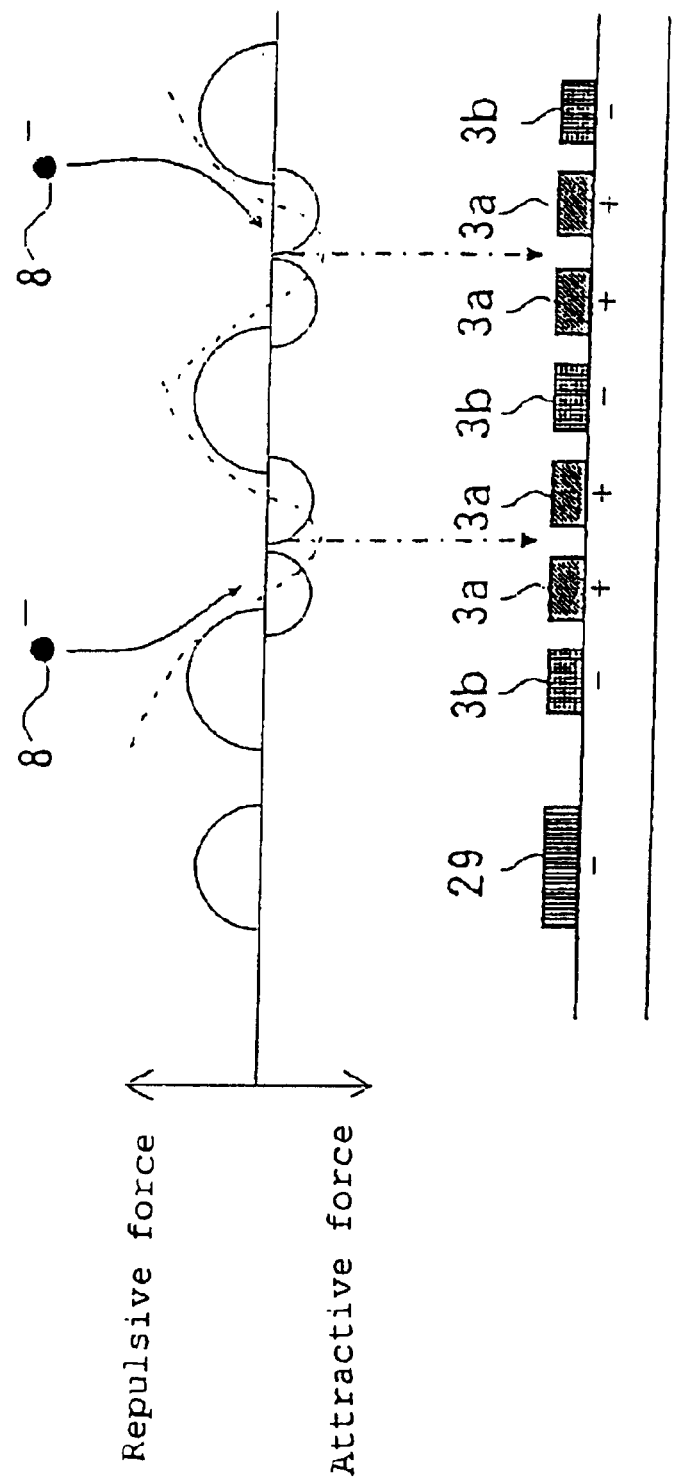
FIG. 30 is a schematic view illustrating the method of disposing spacers by means of an electric field in the vicinity of the periphery of the display area in an embodiment of the present invention.
Figure 31:
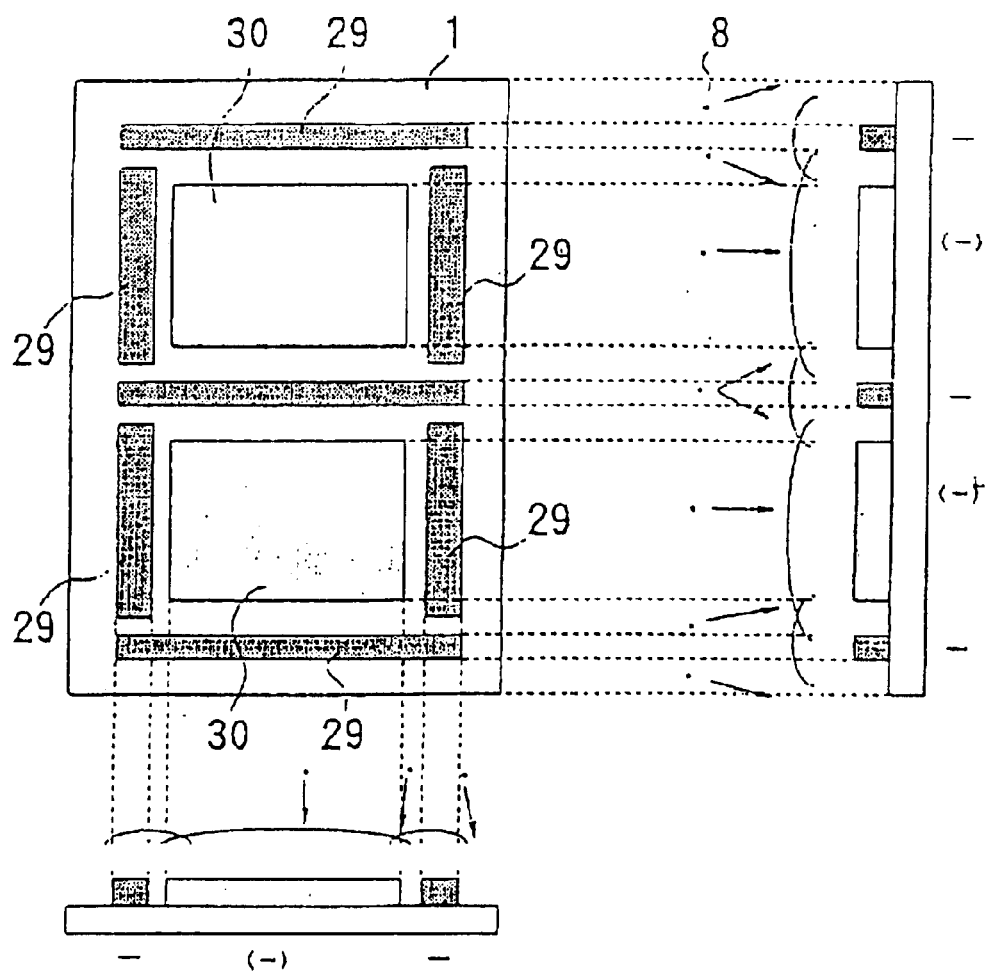
FIG. 31 is a schematic view illustrating how spacers move under the influence of an electric field all over the whole display area in an embodiment of the present invention.

By using such an insulating substrate electrode pattern as shown in FIG. 28 and applying, according to such an electrode pattern as shown in FIG. 27, voltages differing in voltage value are applied to the display electrodes 3a and 3b and the accessory electrodes 29, a positive (+) voltage is applied to the display electrodes 3a, and a negative (−) voltage is applied to the display electrodes 3b and the accessory electrodes 29, so that the display area 30 as a whole is charged negatively, as shown in FIGS. 29 to 31. Further, spacers 8 are charged negatively and then sprayed.

In this way, it is possible to dispose spacers 8 only in each space between the paired display electrodes 3a in a manner such that spacers 8 can be disposed uniformly in spaces between respective paired display electrodes 3a throughout the display area 30 including those spaces between respective paired display electrodes 3a in the vicinity of the edge portions of the display area 30.

Thus, as shown in FIG. 29 and FIG. 30, as the sprayed and falling spacers 8 approach the display electrodes 3a and 3b, a repulsive force and an attractive force act on the spacers 8, where both the forces are exerted by the electric fields generated above the display electrodes 3a and 3b and the accessory electrodes 29, and each spacer goes away from the display electrode 3b or accessory electrode 29 each exerting a repulsive force on it and moves toward the display electrode 3a generating an attractive force. The spacer 8 that has moved to the display electrode 3a is attracted by equal attractive forces respectively exerted by the two neighboring display electrodes 3a and falls between the display electrodes 3a.

Since the display area 30 as a whole is in a state equivalent to the state of being negatively charged, a repulsive force acts on spacers 8 in the vicinity of each edge portion of the display area 30, and tends to move them outside the display area 30, as shown in FIG. 31. This movement of spacers 8 to the outside of the display area 30 can be prevented, however, since a voltage capable of generating a repulsive force is applied to the accessory electrodes 29.

Figure 32:
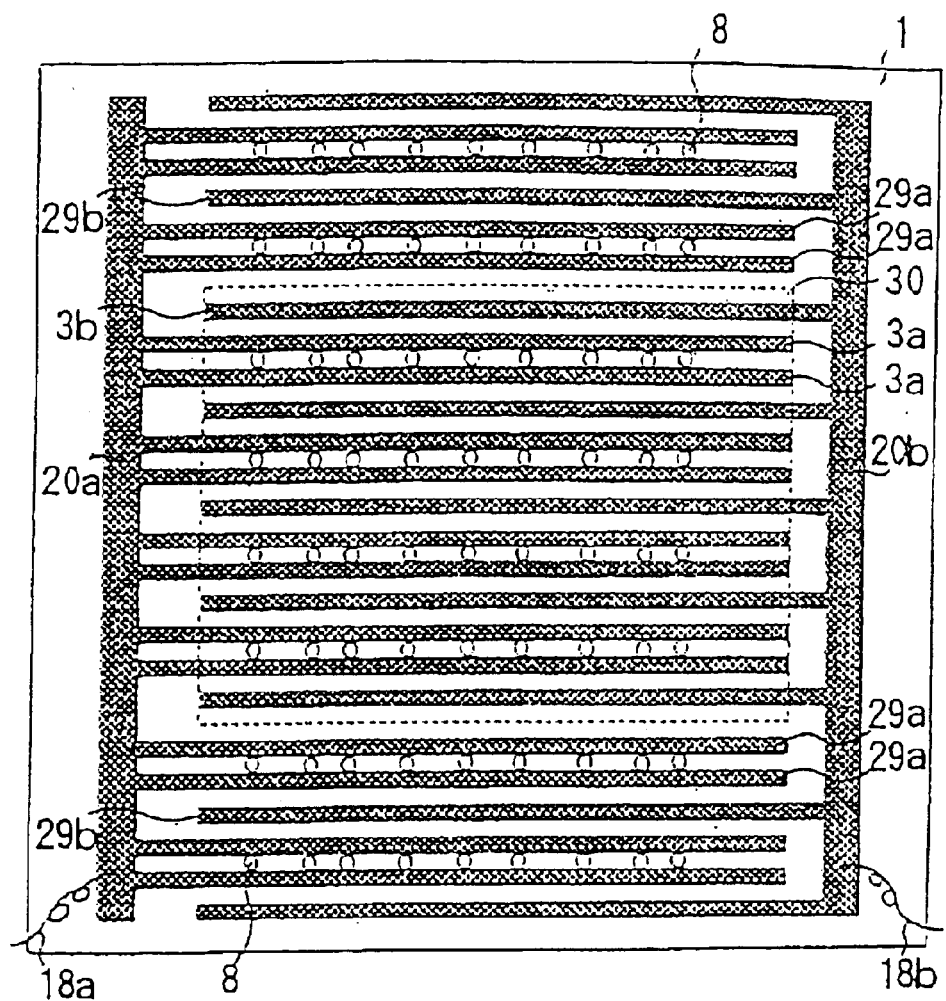
FIG. 32 is a plan view illustrating the electrode pattern in an embodiment of the present invention.

FIG. 32 is a schematic view showing an electrode pattern to be used in the practice of the second aspect of the invention. As shown in FIG. 32, auxiliary electrodes 20a and 20b are formed on an insulating substrate 1 for voltage application respectively to the display electrodes 3a and 3b and stripe-shaped display electrodes 3a and 3b. Further, additional display electrodes 3a and 3b are formed outside the display area 30 so that the display electrodes 3a formed outside the display area 30 may serve as accessory electrodes 29a and the display electrodes 3b formed outside the display area 30 may be served as accessory electrodes 29b.

Conductor wires 18a and 18b are connected with the auxiliary electrodes 20a and 20b for electric field formation by applying voltages to the auxiliary electrodes 20a and 20b. Voltages may be applied directly to the auxiliary electrodes 20a and 20b by means of probe pins or the like without providing the conductor wires 18a and 18b, or voltages may be applied directly to the display electrodes 3a and 3b and to the accessory electrodes 29a and 29b by means of probe pins or the like without providing the auxiliary electrodes 20a and 20b.

The display electrodes 3a occur in pairs of two neighboring display electrodes. The display electrodes 3b occur between a pair of display electrodes 3a and another pair of display electrodes 3a. In FIG. 32, one display electrode 3b occurs.

The accessory electrodes 29 are disposed only in those areas outside the display area 30 as seen in the vertical direction of FIG. 32. This is because the auxiliary electrodes 20a and 20b are formed in those areas outside the display area 30 as seen in the horizontal direction of FIG. 32, and the auxiliary electrodes 20a and 20b produce the same effect as the accessory electrodes 29.

Figure 33:
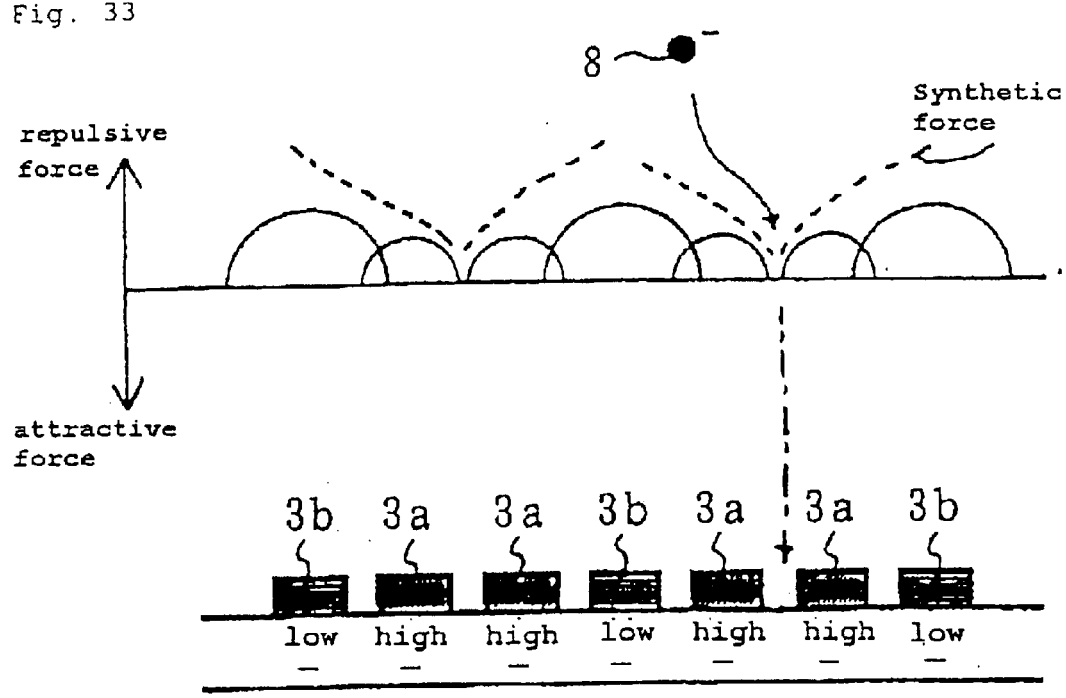
FIG. 33 is a schematic view illustrating the method of disposing spacers by means of an electric field in the central portion of the display area in an embodiment of the present invention.
Figure 34:
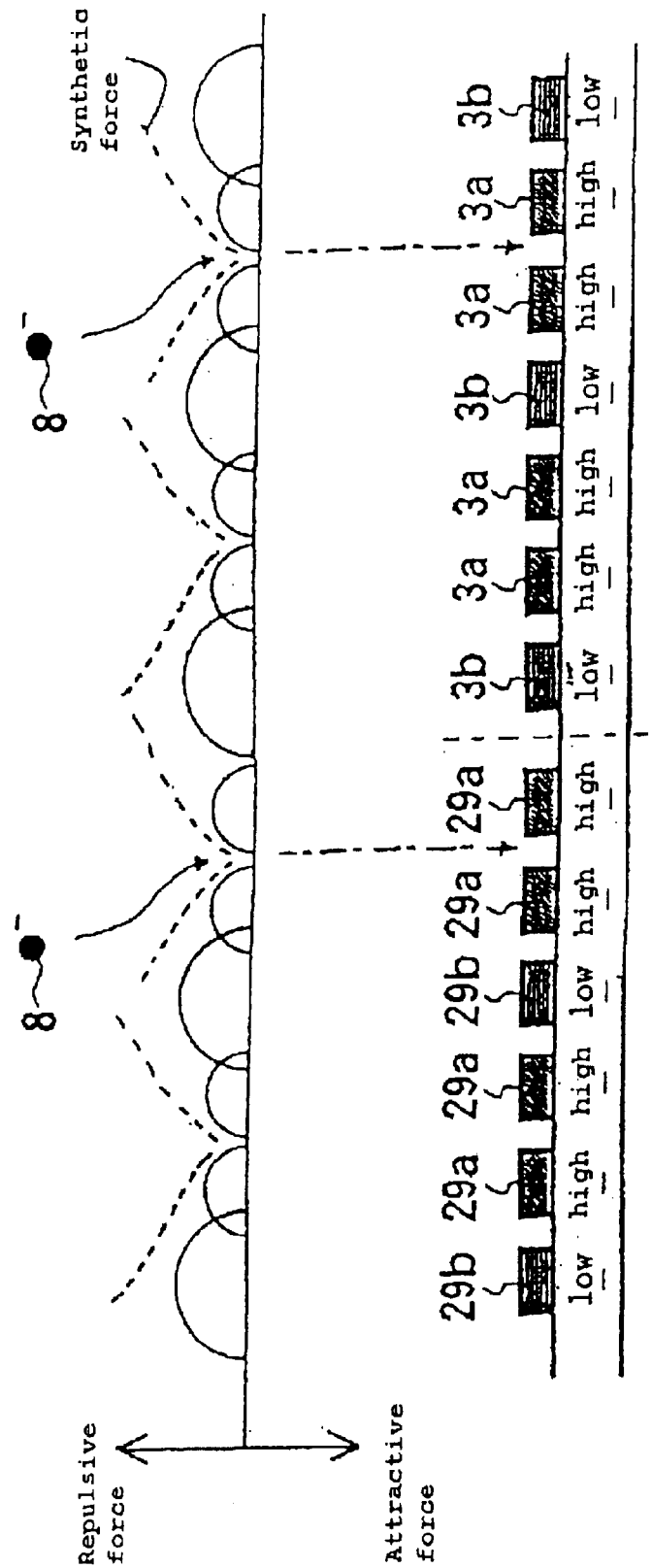
FIG. 34 is a schematic view illustrating the method of disposing spacers by means of an electric field in the vicinity of the periphery of the display area in an embodiment of the present invention.
Figure 35:
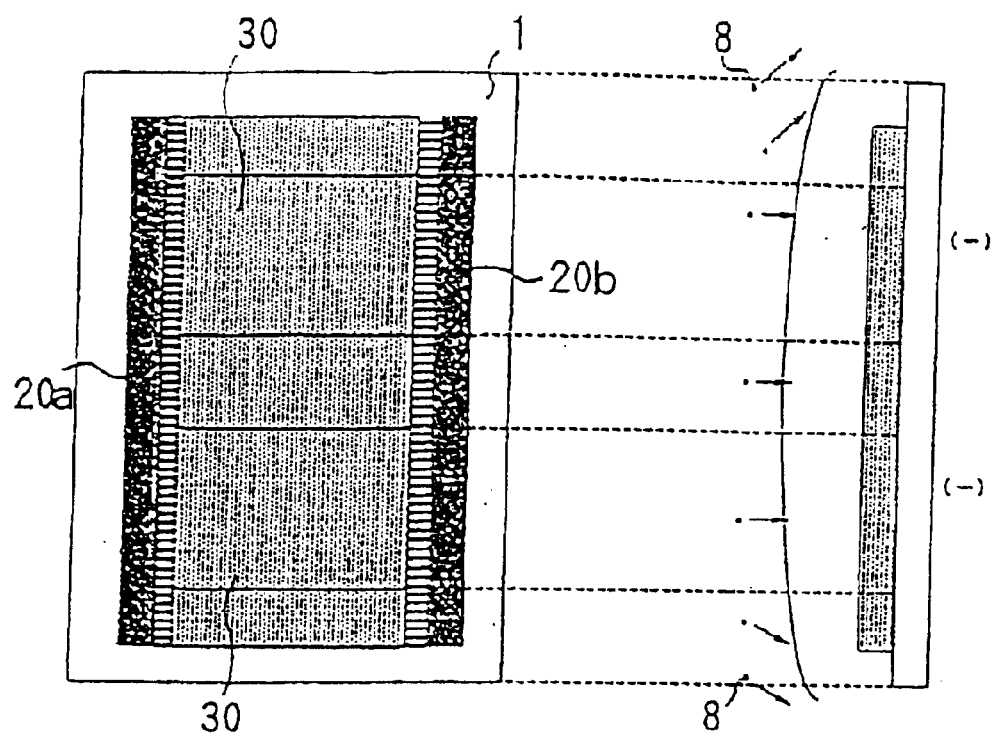
FIG. 35 is a schematic view illustrating how spacers move under the influence of an electric field all over the whole display area in an embodiment of the present invention.

By applying voltages differing in voltage value to the auxiliary electrodes 20a and 20b according to such an electrode pattern as shown in FIG. 32, negative (−) voltages are applied to the display electrodes 3a and 3b and the accessory electrodes 29a and 29b in a manner such that a relatively higher voltage is applied to the display electrodes 3a and accessory electrodes 29a as compared with the display electrodes 3b and accessory electrodes 29b, as shown in FIGS. 33 to 35. Further, spacers 8 are charged negatively and then sprayed.

In this way, it is possible to dispose spacers 8 only in each space between the paired display electrodes 3a in a manner such that spacers 8 can be disposed uniformly in spaces between respective paired display electrodes 3a throughout the display area 30 including those spaces between respective paired display electrodes 3a in the vicinity of the edge portions of the display area 30.

Thus, as shown in FIG. 33 and FIG. 34, as the sprayed and falling spacers 8 approach the display electrodes 3a and 3b, a repulsive force acts on the spacers 8, where said force is exerted by the electric field generated above the display electrodes 3a and 3b and accessory electrodes 29, and each spacer goes away from the display electrode 3b exerting a strong repulsive force on it, and moves toward the display electrode 3a generating a weak repulsive force. The spacer 8 that has moved to the display electrode 3a is pushed by equal repulsive forces respectively exerted by the two neighboring display electrodes 3a, and falls between the display electrodes 3a.

Since the electrode pattern as a whole is negatively charged, the repulsive force acting on spacers 8 in the vicinity of each edge portion of the electrode pattern tends to move them outside the display area 30, as shown in FIG. 35. Since, however, it is accessory electrodes 29a and 29b that are located in the vicinity of each edge portion of the electrode pattern as seen in the vertical direction of FIG. 35, it does not matter if no spacer 8 is disposed in the vicinity of the edge portions of the electrode pattern. In other words, the display area 30 is located in the middle of the electrode pattern, so that spacers 8 can be disposed at a predetermined density in the display area 30.

Figure 36:
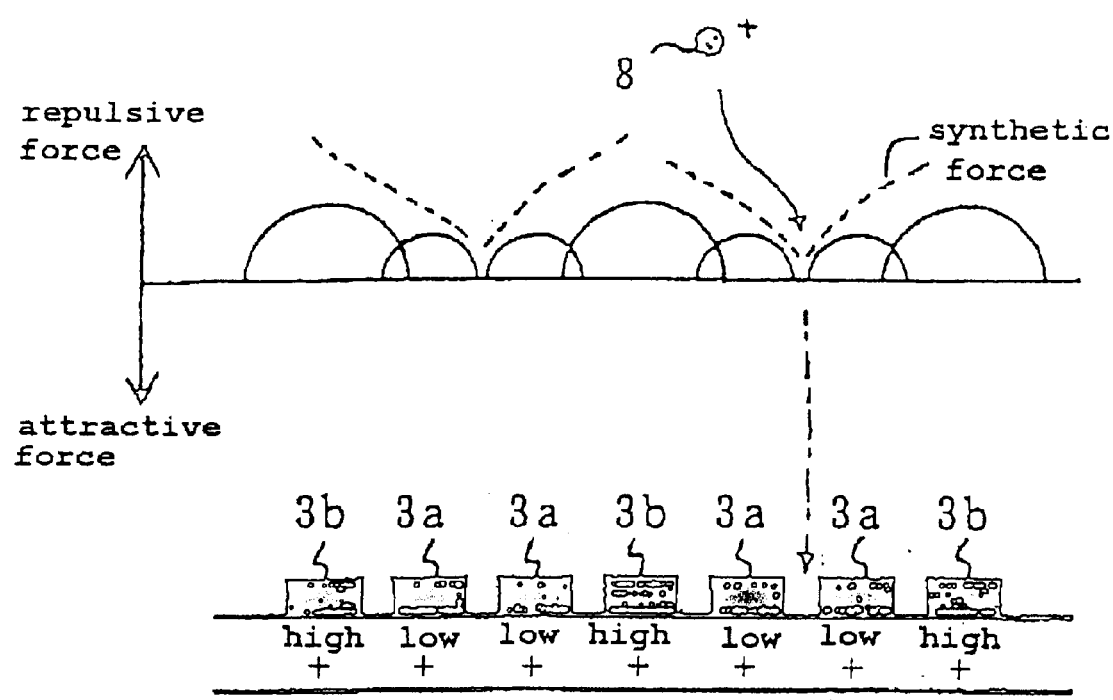
FIG. 36 is a schematic view illustrating the method of disposing spacers by means of an electric field in the central portion of the display area in an embodiment of the present invention.
Figure 37:
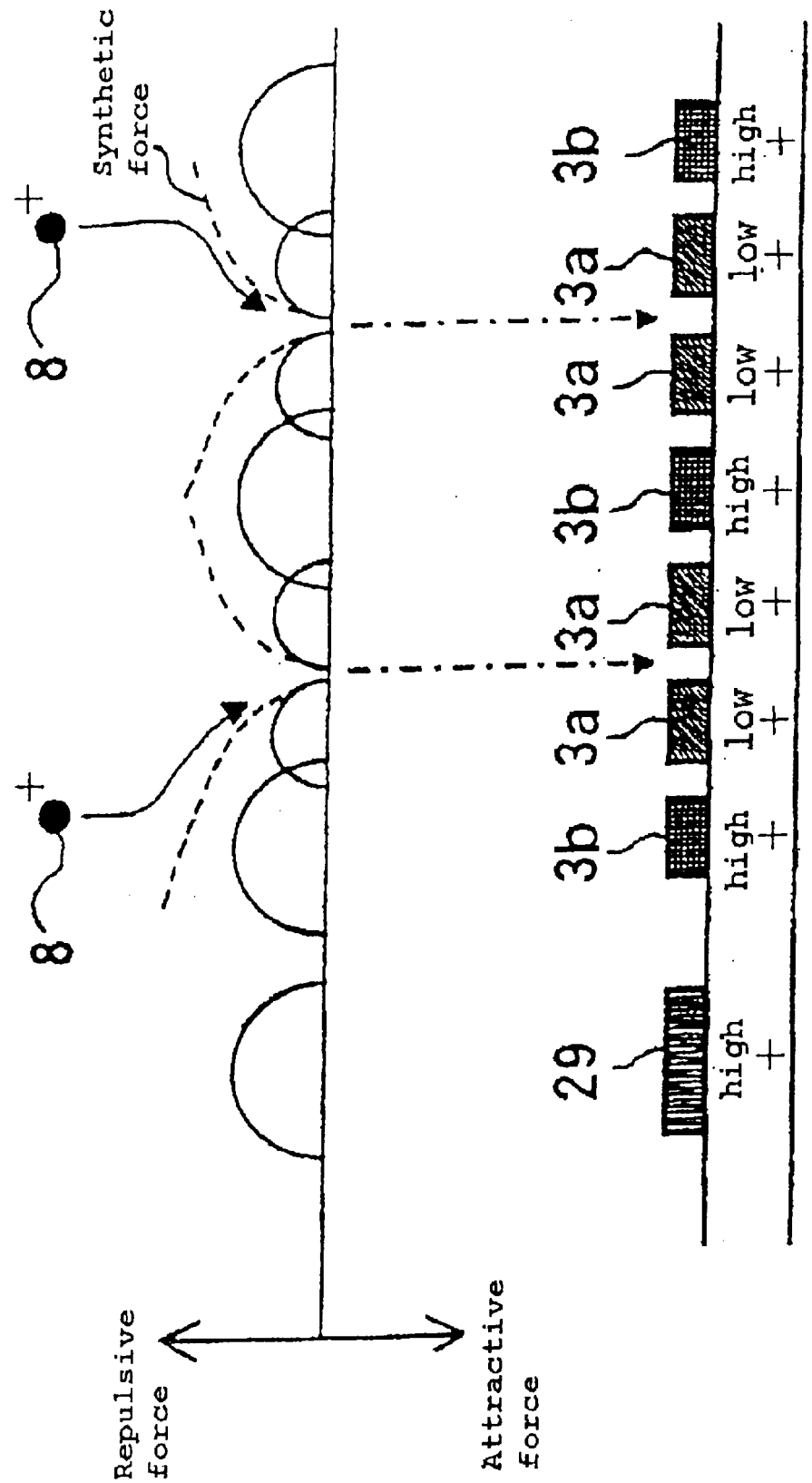
FIG. 37 is a schematic view illustrating the method of disposing spacers by means of an electric field in the vicinity of the periphery of the display area in an embodiment of the present invention.
Figure 38:
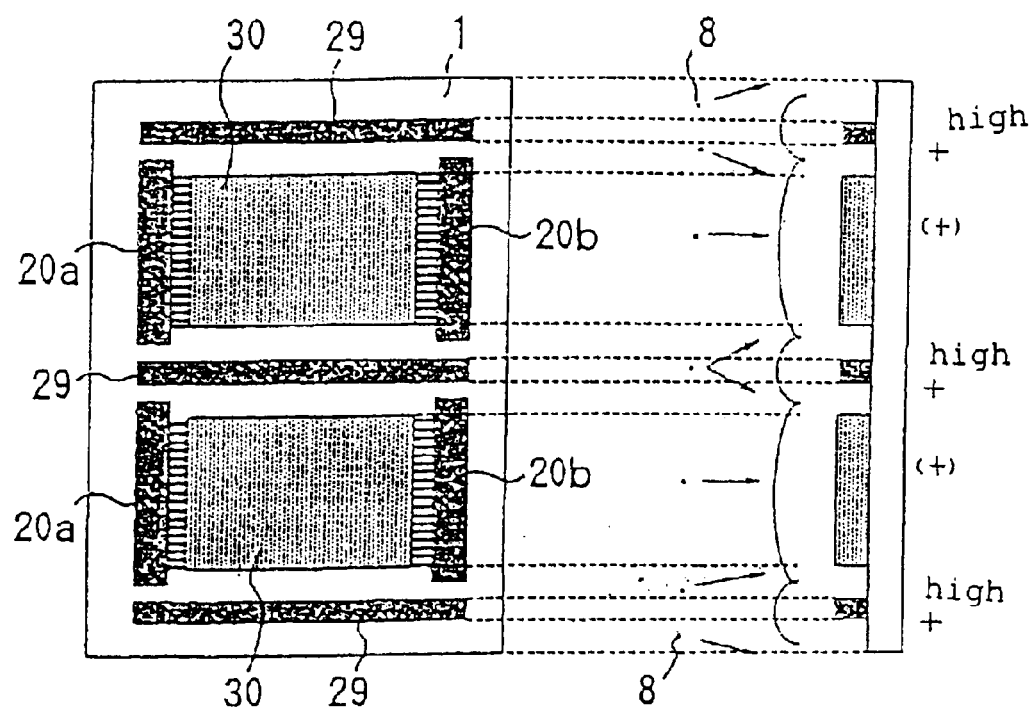
FIG. 38 is a schematic view illustrating how spacers move under the influence of an electric field all over the whole display area in an embodiment of the present invention.

By using such an insulating substrate electrode pattern as shown in FIG. 17 and applying, according to such an electrode pattern as shown in FIG. 11, voltages differing in voltage value to the auxiliary electrodes 20a and 20b and the accessory electrodes 29, a positive (+) voltage is applied to the display electrodes 3a and 3b and accessory electrodes 29 in a manner such that a relatively higher voltage is applied to the display electrodes 3b and accessory electrodes 29 as compared with the display electrodes 3a, as shown in FIGS. 36 to 38. Further, spacers 8 are charged positively and then sprayed.

In this way, it is possible to dispose spacers 8 only in each space between the paired display electrodes 3a in a manner such that spacers 8 can be disposed uniformly in spaces between respective paired display electrodes 3a throughout the display area 30 including those spaces between respective paired display electrodes 3a in the vicinity of the edge portions of the display area 30.

Thus, as shown in FIG. 36 and FIG. 37, as the sprayed and falling spacers 8 approach the display electrodes 3a and 3b, a repulsive force act on the spacers 8, where said force is exerted by the electric field generated above the display electrodes 3a and 3b and accessory electrodes 29, and each spacer goes away from the display electrode 3b and accessory electrode 29 both exerting a strong repulsive force on it and moves toward the display electrode 3a generating a weak repulsive force. The spacer 8 that has moved to the display electrode 3a is pushed by equal repulsive forces respectively exerted by the two neighboring display electrodes 3a and falls between the display electrodes 3a.

Since the display area 30 as a whole is positively charged, a repulsive force acts on spacers 8 in the vicinity of each edge portion of the display area 30, and tends to move them outside the display area 30, as shown in FIG. 38. This movement of spacers 8 to the outside of the display area 30, however, can be prevented since a voltage capable of generating a strong repulsive force is applied to the accessory electrodes 29.

In the above embodiment, spacers 8 fall into each space between two neighboring display electrodes 3a while they are pushed by equal repulsive forces respectively exerted by the display electrodes 3a, so that the spacers 8 can be disposed concentratedly in the middle of each space between display electrodes 3a and thus the probability that spacers 8 may be disposed on edge areas of the display electrodes 3a can be minimized.

Figure 39:
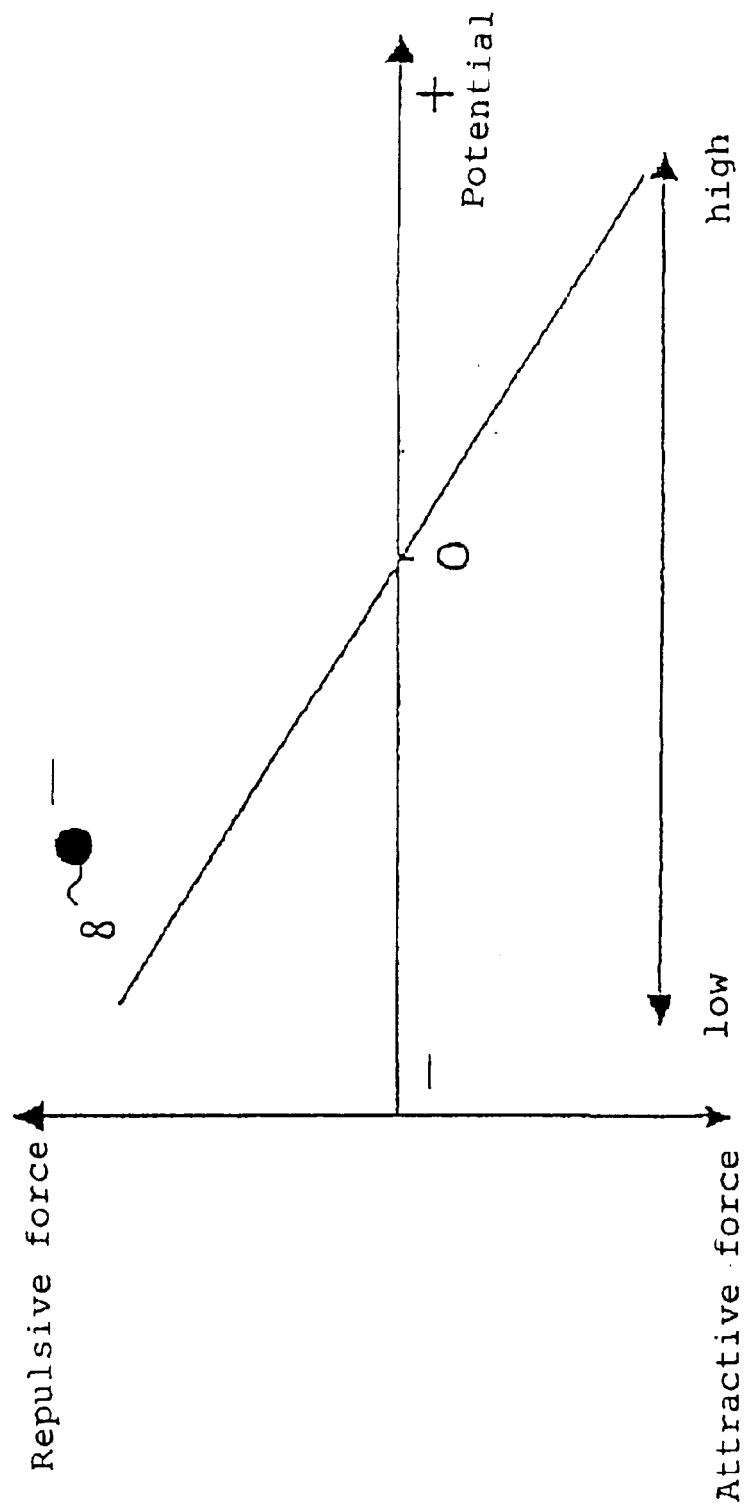
FIG. 39 is a schematic view illustrating the high and low voltage states in the practice of the present invention.

While several embodiments of the second aspect of the invention have been described hereinabove, the second aspect of the invention is not limited to the embodiments described but the same effects as mentioned above can be produced, with negatively charged spacers 8, based on the relation between relatively higher and lower voltages according to the present invention, as shown in FIG. 39.

FIG. 39 is a schematic representation of the relation between the relative level of the voltage applied to the display electrodes and the magnitude of the repulsive or attractive force exerted on spacers 8 by the voltage in the case where spacers 8 are negatively charged.

The relatively higher or lower voltage and the voltage polarity are shown in terms of + or −, with the earth voltage of 0 V at which no repulsive or attractive force acts on spacers 8 being taken as the reference voltage.

Thus, according to FIG. 39, +300 V, for instance, is a voltage relatively lower than +500 V and −300 V is a voltage relatively higher than −500 V.

Between a display electrode and a spacer 8 separated by a certain distance from each other, the electric field formed above the display electrode exerts a repulsive force or attractive force upon the spacer 8 depending on the polarity of the voltage applied to the display electrode. According to FIG. 39, where the spacer 8 has a negative polarity, a repulsive force is produced when the voltage is of negative polarity (−) while an attractive force is generated when the voltage is of positive polarity. The magnitude of this repulsive becomes greater as the voltage shifts to the more negative (−) polarity side while that of the attractive force becomes greater as the voltage shifts to the more positive (+) polarity side.

Thus, +500 V, for instance, produces a greater attractive force than +300 V while −500 V produces a greater repulsive force than −300 V.

In cases where spacers 8 are charged positively, an attractive force is exerted in lieu of a repulsive force and vice versa. Thus, a voltage of negative (−) polarity gives rise to an attractive force while a voltage of positive (+) polarity gives rise to a repulsive force. And, this attractive force becomes greater as the voltage shifts to the more negative (−) polarity side, while the repulsive force increases as the voltage shifts to the more positive (+) side.

Thus, +500 V, for instance, produces a greater repulsive force than +300 V while −500 V produces a greater attractive force than −300 V.

According to the definition of the relative level of voltage as made herein, a voltage is lower when it is on the more negative (−) polarity side, and a voltage is higher when it is on the more positive (+) polarity side, as shown in FIG. 39, irrespective of the magnitude of force acting on spacers 8.

Thus, +500 V is defined as a higher voltage than +300 V, and −500 V is defined as a lower voltage than −300 V.

This definition also applies to cases where spacers 8 are charged positively. Thus, +500 V is defined as a higher voltage than +300 V, and −500 V is defined as a lower voltage than −300 V.

Figure 40:
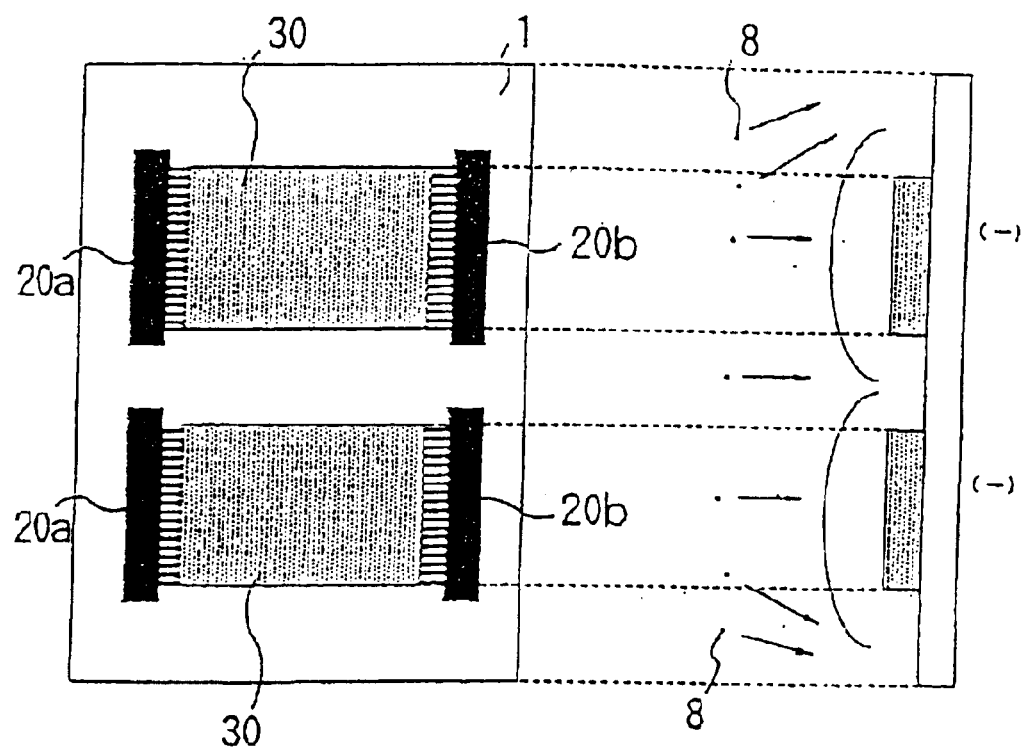
FIG. 40 is a schematic view illustrating a trouble resulting from spacer movements caused by an electric field all over the display area in the prior art.
Figure 41:
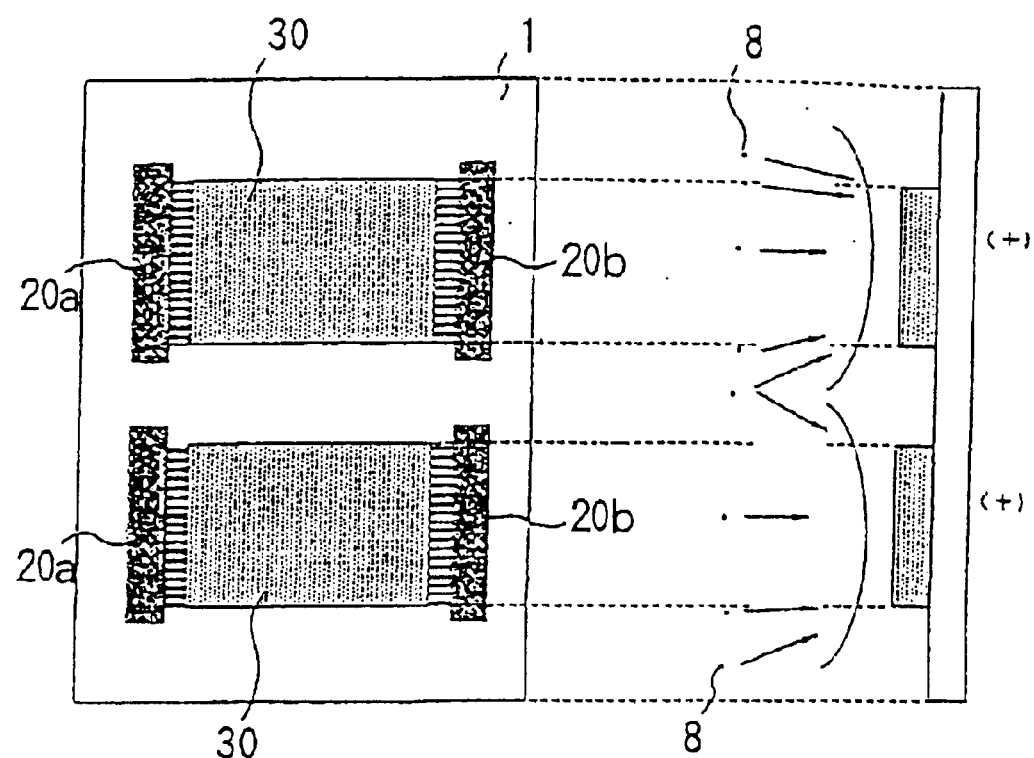
FIG. 41 is a schematic view illustrating a trouble resulting from spacer movements caused by an electric field all over the display area in the prior art.

Now, referring to FIG. 40 and FIG. 41, troubles encountered when no accessory electrodes are provided are explained.

FIG. 40 is a schematic view showing the state of the display area 30 being as a whole charged negatively when no accessory electrodes 29 are provided. As shown in FIG. 40, the display area 30 as a whole is charged negatively, so that when spacers are negatively charged and sprayed, a repulsive force acts on the spacers 8.

In the middle of the display area 30, spacers 8 are subjected to repulsive forces uniformly from around and therefore the spacers 8 undergo only the influence of a local electric field and are disposed between the paired display electrodes 3a. In the vicinity of each edge portion of the display area 30, however, they undergo a repulsive force due to the electric field above the display area 30 as a whole and migrate to the outside of the display area 30 where no electric field is formed. Thus, a trouble arises that spacers 8 are hardly disposed in a predetermined amount in those display electrode (3a) gaps in the vicinity of the edge portions of the display area 30.

On the other hand, FIG. 41 is a schematic view showing the case in which the display area 30 as a whole is charged positively but no accessory electrodes are provided. As shown in FIG. 41, an attractive force acts on spacers 8, when they are charged negatively and sprayed, since the display area 30 as a whole is positively charged.

In the middle of the display area 30, spacers 8 are subjected to attractive forces uniformly from around and therefore the spacers 8 undergo only the influence of a local electric field and are disposed between the paired display electrodes 3a. In the vicinity of each edge portion of the display area 30, however, they undergo an attractive force due to the electric field above the display area 30 as a whole and migrate from the outside of the display area 30, where no electric field is formed to the inside of the display area 30. Thus, a trouble arises that spacers 8 are more abundantly than a predetermined amount in those display electrode (3*a*) gaps in the vicinity of the edge portions of the display area 30.

In the embodiments mentioned above, the electric field is controlled by providing accessory electrodes 29 on the insulating substrate having display electrodes formed thereon. There is another method available by which it is also possible to produce the same effects, said method comprising providing accessory electrodes 29 on a stage for fixing thereon the insulating substrate with display electrodes formed thereon or on the wall of the spacer sprayer, and applying a voltage thereto.

According to the second aspect of the invention, it is also possible to adjust the density of spacers disposed in the vicinity of the edge portions of the display area 30 by adjusting the voltage applied to the accessory electrodes 29, and it is further possible to finely control the liquid crystal layer thickness of the liquid crystal display device by controlling the space disposition density.

Furthermore, while, in the above embodiments, simple matrix type liquid crystal display devices are employed, the second aspect of the invention is not limited to simple matrix type liquid crystal display devices, but can of course be applied to the production of ferroelectric liquid crystal display devices, TFT type liquid crystal display devices and like liquid crystal display devices as well.

The method for producing a liquid crystal display device according to the third aspect of the invention comprises spraying spacers onto at least one of a first substrate comprising at least pattern-forming transparent electrodes and a dummy electrode and a second substrate to be disposed oppositely above the first substrate and filling a liquid crystal into the space between both the substrates, wherein, in spraying positively or negatively charged spacers onto the substrate, two or more voltages differing in voltage value are applied to respective transparent electrodes and a voltage is applied to the dummy electrode as well, the predetermined transparent electrode gaps in which spacers are to be selectively disposed are provided between respective two neighboring transparent electrodes, the number of transparent electrodes is even, and the two or more voltages differing in value are applied in a manner such that when the spacer charge polarity is positive (+), the lowest of the two or more voltages differing in value is applied to the respective two neighboring transparent electrodes between which spacers are to be disposed in the middle, and when the spacer charge polarity is negative (−), the highest of the two or more voltages differing in value is applied to the respective two neighboring transparent electrodes between which spacers are to be disposed in the middle.

The above transparent electrodes, dummy electrodes, substrate, spacers and spacer charging method are the same as described referring to the first aspect of the invention. The method for producing a liquid crystal display device according to the third aspect of the invention can be applied to the production of TFT type liquid crystal display devices, as explained hereinabove referring to the second aspect of the invention.

The predetermined transparent electrode gaps in which spacers are to be selectively disposed are those transparent electrode gaps to the transparent electrodes of which the lowest of the two or more voltages differing in value applied to the transparent electrodes is applied when spacers are charged positively (+), and the predetermined transparent electrode gaps are those transparent electrode gaps to the transparent electrodes of which the highest of the two or more voltages differing in value applied to the transparent electrodes is applied when spacers are charged negatively (−).

Figure 9:
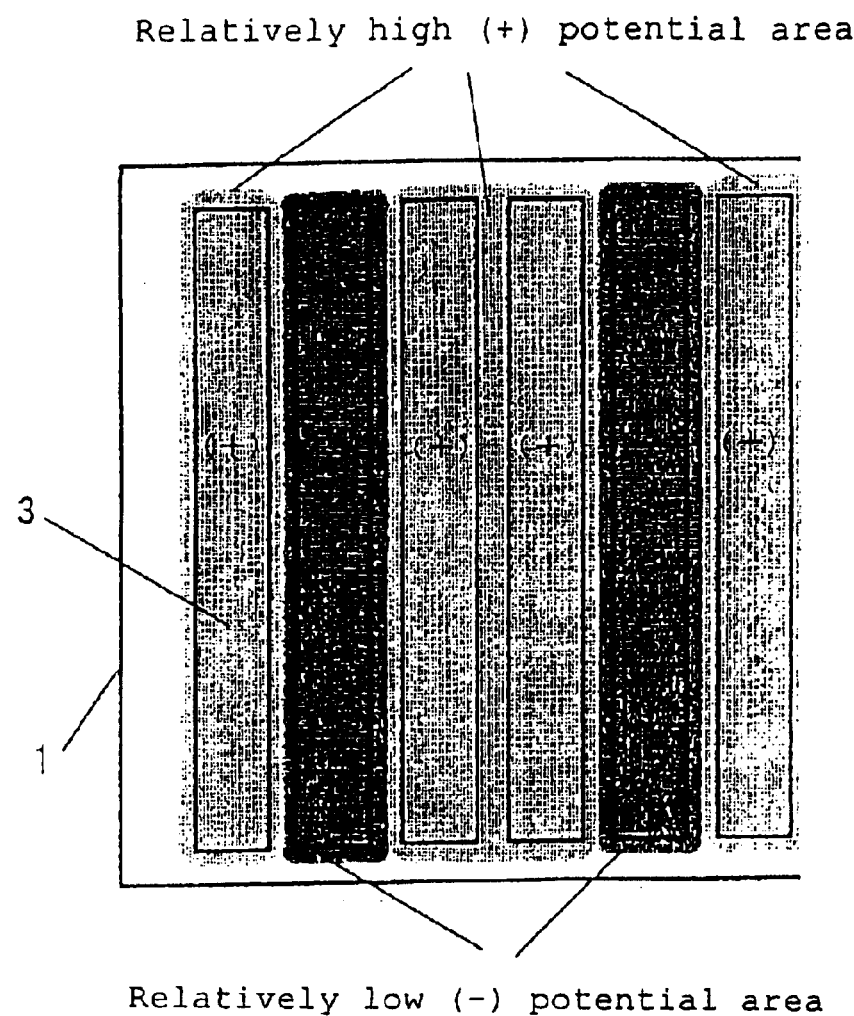
FIG. 9 is a schematic view illustrating the regions relatively high in voltage (+ (positive)) and the regions relatively low in voltage (− (negative)) formed above stripe-shaped transparent electrodes, as seen from above the stripe-shaped transparent electrodes.

When, for example, strong repulsive forces and weak repulsive forces are arranged regularly as shown in FIG. 14, each trough or crest of a synthetic repulsive force occurs in the middle of a region of transparent electrodes exerting a weak repulsive force or of a region of transparent electrodes exerting a strong repulsive force (such a region as shown in FIG. 9).

Therefore, in the case of FIG. 14, spacers are disposed in the middle of weak repulsive forces and therefore it is only necessary that the space between transparent electrodes be there. For achieving this, the number of transparent electrodes exerting a weak repulsive force should be even; in that case, the centerline of the relevant region corresponds to the space between the relevant transparent electrodes.

Further, when repulsive forces and attractive forces are arranged regularly as shown in FIG. 22, each trough or crest of the synthesis of a repulsive force and an attractive force occurs in the middle of a region of transparent electrodes exerting a repulsive force or of a region of transparent electrodes exerting an attractive force (such a region as shown in FIG. 9).

Therefore, in the case of FIG. 22, spacers are disposed in the middle of attractive forces and it is only necessary that the centerline between transparent electrodes be there. For achieving this, the number of transparent electrodes exerting an attractive force should be even; in that case, the centerline of the relevant region corresponds to the space between the relevant transparent electrodes.

If, however, the number of transparent electrodes exerting a weak repulsive force is odd in the case of FIG. 14 or the number of transparent electrodes exerting an attractive force is odd in the case of FIG. 22, each location where spacers are disposed occurs on the centerline of a transparent electrode.

In cases where the spacer charge polarity is negative (−), the voltage application to the transparent electrodes is carried out by providing a common conductor line (A) which is connected with one of the two ends of each transparent electrode, to which the highest voltage is to be applied, and applying the highest voltage by means of the conductor line (A), while providing a common conductor line (B) which is connected with one end, on the opposite side of the one end mentioned above, of the two ends of each transparent electrode, to which a lower voltage is to be applied, and applying the lower voltage by means of the conductor line (B) and, in cases where the spacer charge polarity is positive (+), the voltage application to the transparent electrodes is carried out by providing a common conductor line (A) which is connected with one of the two ends of each transparent electrode to which the lowest voltage is to be applied and applying the lowest voltage by means of the conductor line (A) while providing a common conductor line (B) which is connected with one end, on the opposite side of the one end mentioned above, of the two ends of each transparent electrode to which a higher voltage is to be applied and applying the higher voltage by means of the conductor line (B).

Figure 42:
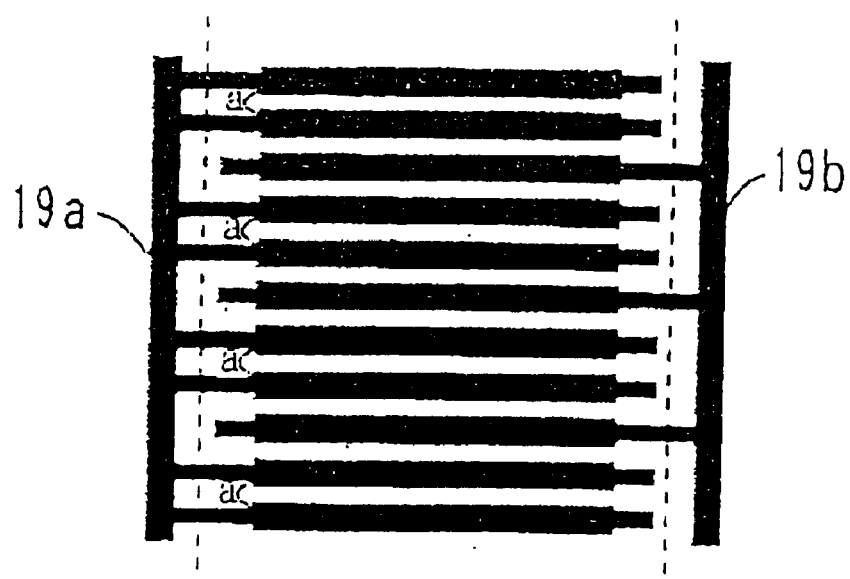
FIG. 42 is a schematic view of a comb-shaped electrode to be used in an embodiment of the method for producing a liquid crystal display device according to the present invention.

For example, by using such comb-shaped electrodes having a 2:1 structure as shown in FIG. 42 and applying the highest voltage to the conductor line (A), and a voltage lower than the above voltage to the conductor line (B) when the spacer charge polarity is negative (−), it is possible to dispose spacers in spaces or gaps (a). After spacer disposition, the conductor lines (A) and (B) are cut off along the dotted lines in the figure, to give stripe-shaped transparent electrodes.

As mentioned above, the third aspect of the present invention makes it possible to dispose spacers in interelectrode spaces where no transparent electrode exists, namely at sites of within the black matrix, by applying, in spacer spraying, two or more voltages differing in value to the pattern-forming transparent electrodes.

If, in spacer spraying, no voltage is applied to the dummy electrode and two or more voltages differing in value are simply applied to the transparent electrodes, respectively, the phenomenon of the number of spacers increasing or decreasing in the vicinity of the periphery of the display area is observed, as detailedly described hereinbefore referring to the first and second aspects of the present invention, and the spacer distortion varies, the cell thickness varies and the display on the product liquid crystal display device becomes uneven, as explained hereinabove referring to the first and second aspects of the present invention.

For preventing these phenomena, a voltage is applied to the dummy electrode as well according the third aspect of the present invention, whereby the irregularities in the number of spacers disposed as observed between the inside of the display area and the vicinity of the periphery thereof can be prevented from occurring, hence the irregularities in cell thickness caused by the above irregularities can be dissolved. As a result, liquid crystal display devices uniform in display characteristics can be obtained.

The dummy electrodes are the same as those mentioned hereinabove referring to the first aspect of the present invention.

In the following, mention is made of the voltage application to the dummy electrodes.

Figure 43:
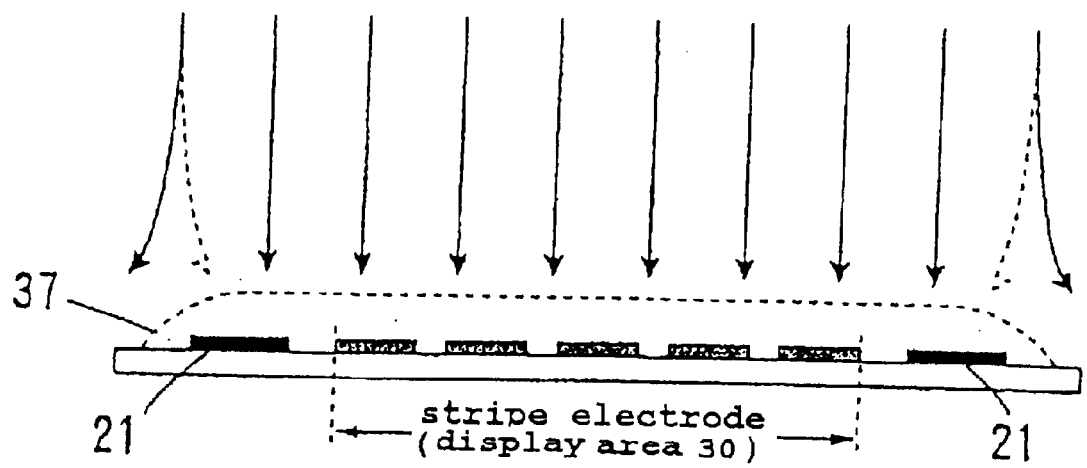
FIG. 43 is a schematic view illustrating the method for producing a liquid crystal display device according to the present invention.

The voltage to be applied to the dummy electrode is preferably within the range between the highest and the lowest of the two or more voltages differing in value which are applied to the transparent electrodes. Thus, the number of spaces disposed is caused to decrease or increase in the dummy electrode sections by extending the electric field formed above the transparent electrodes and comprising relatively high voltage (+ (positive)) and relatively low voltage (− (negative)) regions to above the dummy electrodes, as shown in FIG. 43. As a result, spacers are disposed uniformly in the display area.

The voltage application to the dummy electrodes is preferably carried out by connecting one of the conductor lines (A) and (B) with the dummy electrodes.

Figure 44:
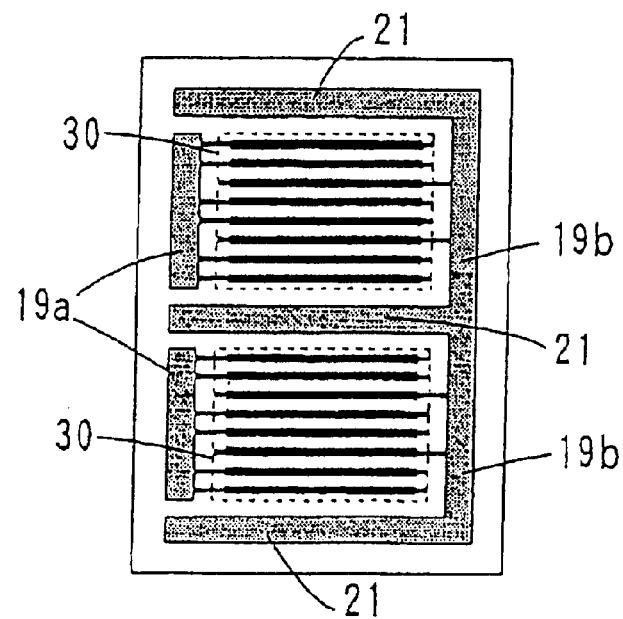
FIG. 44 is a schematic view of a substrate provided with dummy electrodes which is to be used in an embodiment of the method for producing a liquid crystal display device according to the present invention.

For example, by connecting the conductor line (B) with the dummy electrodes, as shown in FIG. 44, it becomes possible to apply the same electric potential to the conductor line (B) and the dummy electrodes. While, in the case shown in FIG. 44, the conductor line (B) is formed as an electrode integrated with the dummy electrodes, the conductor line (A) may be formed as an electrode integrated with the dummy electrodes or, further, the conductor line (A) or (B) and the dummy electrodes separately and independently provided on the substrate may be connected with each other by wiring.

The voltage application to the dummy electrodes can also be carried out by connecting all dummy electrodes formed on the substrate with one another.

Figure 45:
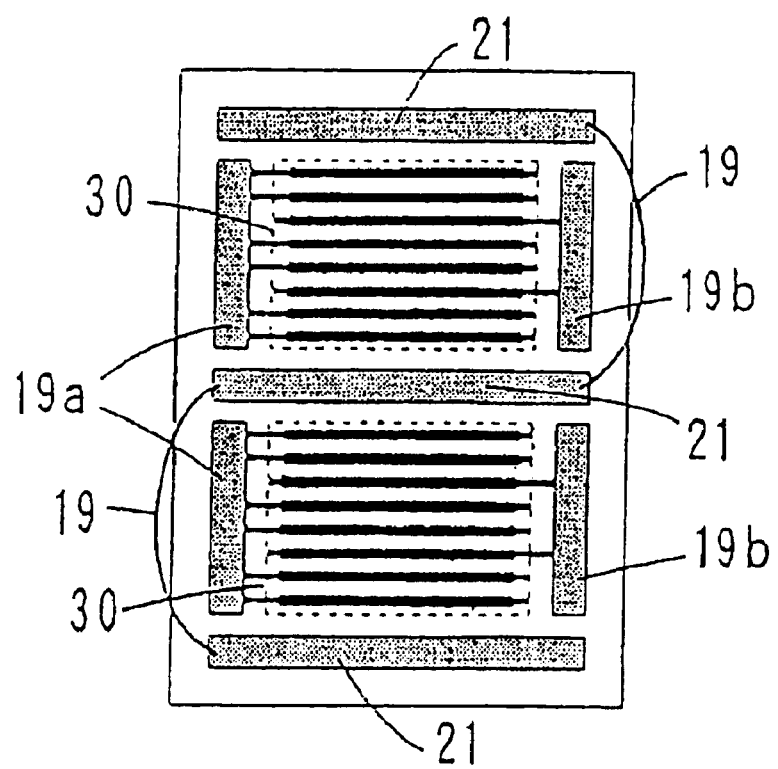
FIG. 45 is a schematic view of a substrate provided with dummy electrodes which is to be used in an embodiment of the method for producing a liquid crystal display device according to the present invention.

For example, by wiring to thereby connect all dummy electrodes formed on the substrate with one another, as shown in FIG. 45, it becomes possible to apply the same electric potential to all the dummy electrodes.

The method for producing a liquid crystal display device according to the fourth aspect of the present invention comprises spraying spacers onto at least one of a first substrate comprising at least pattern-forming transparent electrodes and a dummy electrode and a second substrate to be disposed oppositely above the first substrate and filling a liquid crystal into the space between both the substrates, wherein, in spraying positively or negatively charged spacers onto the substrate, the substrate is disposed in close contact with an earthed conductive stage, a conductor is provided in a state electrically isolated from the conductive stage, said conductor being a conductive frame having an opening and said conductive frame being disposed on the periphery of the substrate with or without partial overlapping with the substrate periphery, and wherein a voltage is applied to the transparent electrode and the conductive frame.

The above pattern-forming transparent electrodes, substrate, spacers and spacer charging method are the same as explained referring to the first aspect of the invention. As explained referring to the second aspect of the invention, the method for producing a liquid crystal display device according to the fourth aspect of the invention can be applied to the production of TFT type liquid crystal display devices.

In accordance with the fourth aspect of the invention, spacers can be disposed in electrode gaps, without any trouble in spacer disposition, even when an electric field exerting a repulsive force is formed above the pattern-forming transparent electrodes by applying a voltage of the same polarity as the spacer charge polarity to the pattern-forming transparent electrodes in a state such that the substrate with the black matrix formed thereon is in close contact with the conductive stage.

If, here, a voltage is merely applied to the transparent electrodes, the phenomenon of the number of spacers increasing or decreasing in the vicinity of the periphery of the display area is observed, as explained in detail referring to the first and second aspects of the invention, causing variations in spacer distortion and in cell thickness in the production of liquid crystal display devices and causing uneven display of the liquid crystal display devices.

It is conceivable that the distribution of spacers in the display area and the region outside the display area might be controlled by using a dummy electrode generally used for preventing the build-up of static electricity on the substrate and applying a voltage of the same polarity as the transparent electrode polarity to the dummy electrodes to thereby render the repulsive force resulting from the electric field above the substrate uniform all over the substrate. For realizing this method, however, it is necessary that the dummy electrodes be present also in the outside of the display area to thereby secure a sufficiently wide range for spacer spraying. This is unfavorable from the space viewpoint.

For preventing these phenomena, the substrate is disposed in close contact with an earthed conductive stage, and a conductor is provided in a state electrically insulated from the conductive stage in spraying positively or negatively charged spacers according to the fourth aspect of the invention. The conductor is a conductive frame having an opening and is disposed on the periphery of the substrate with or without partial overlapping with the substrate periphery, and a voltage is applied to the transparent electrode and the conductive frame as well to thereby form an electric field outside the substrate as well which is almost the same as that within the substrate. The range of the repulsive force above the substrate is thereby extended and the risk of the number of spacers increasing or decreasing is absorbed in the region outside the substrate, so that the display area can become uniform with respect to the number of spacers.

The earthed conductive stage preferably has a volume resistance value of not more than $1 \times 10^{10}$ Ωcm. When the volume resistance value is in excess of $1 \times 10^{10}$ Ωcm, the whole substrate becomes close in electric potential to the transparent electrodes, with the result that the accuracy of spacer disposition becomes poor.

Since if there is an electrically floating electrode, spacers are sprayed concentratedly thereon, the method of applying a voltage of the same polarity as the spacer charge polarity to the transparent electrodes formed on the substrate is preferably carried out by applying the voltage to all transparent electrodes to thereby eliminate the occurrence of such electrically floating electrode.

The material of the above conductor is not particularly restricted but may be, for example, a metal such as aluminum, iron, copper or stainless steel; or a resin rendered conductive by coating with a metal or the like. The conductor may be made of a laminate produced by placing a thin metal foil or sheet, such as aluminum foil or copper foil, on a resin layer.

In the case of multipanel substrates for producing a plurality of liquid crystal panels per glass substrate, the shape of the above conductor may be such that it has openings corresponding to the respective display areas.

The method of insulating the above conductive stage from the conductor is not particularly restricted but, for example, an insulator, such as a resin, may be insulated therebetween, or a space is provided therebetween for attaining insulation by air.

The method of voltage application to the substrate is not particularly restricted but, for example, may be the method comprising providing a dummy electrode around the linear transparent electrodes on the substrate, as shown in FIG. 2, connecting the dummy electrode with the linear transparent electrodes and carrying out voltage application to the dummy electrode via the conductive frame in a state electrically insulated from the conductive stage on which the substrate is disposed. The method of voltage application from the conductive frame to the dummy electrode is not particularly restricted but may be, for example, the method comprising forming a needle-like body or bodies extending from the conductive frame.

The voltage to be applied to the transparent electrodes on the substrate and to the conductive frame preferably has a value of several hundred to several thousand volts. When the voltage applied to too low, it becomes difficult to control the route of falling of spacers. If the voltage applied is too high, short-circuiting may occur between the transparent electrodes and the black matrix when the latter is a conductive one.

The conductor mentioned above may be made from a flat conductor or from a net-, bar- or wire-like conductor. When it is made from a flat sheet conductor, the sheet maybe processed by perforation or the like to produce a structure for improving the flow of air.

Now, referring to FIGS. 46 to 51, specific embodiments of the method for producing a liquid crystal display device according to the fourth aspect of the invention are described.

Figure 46:
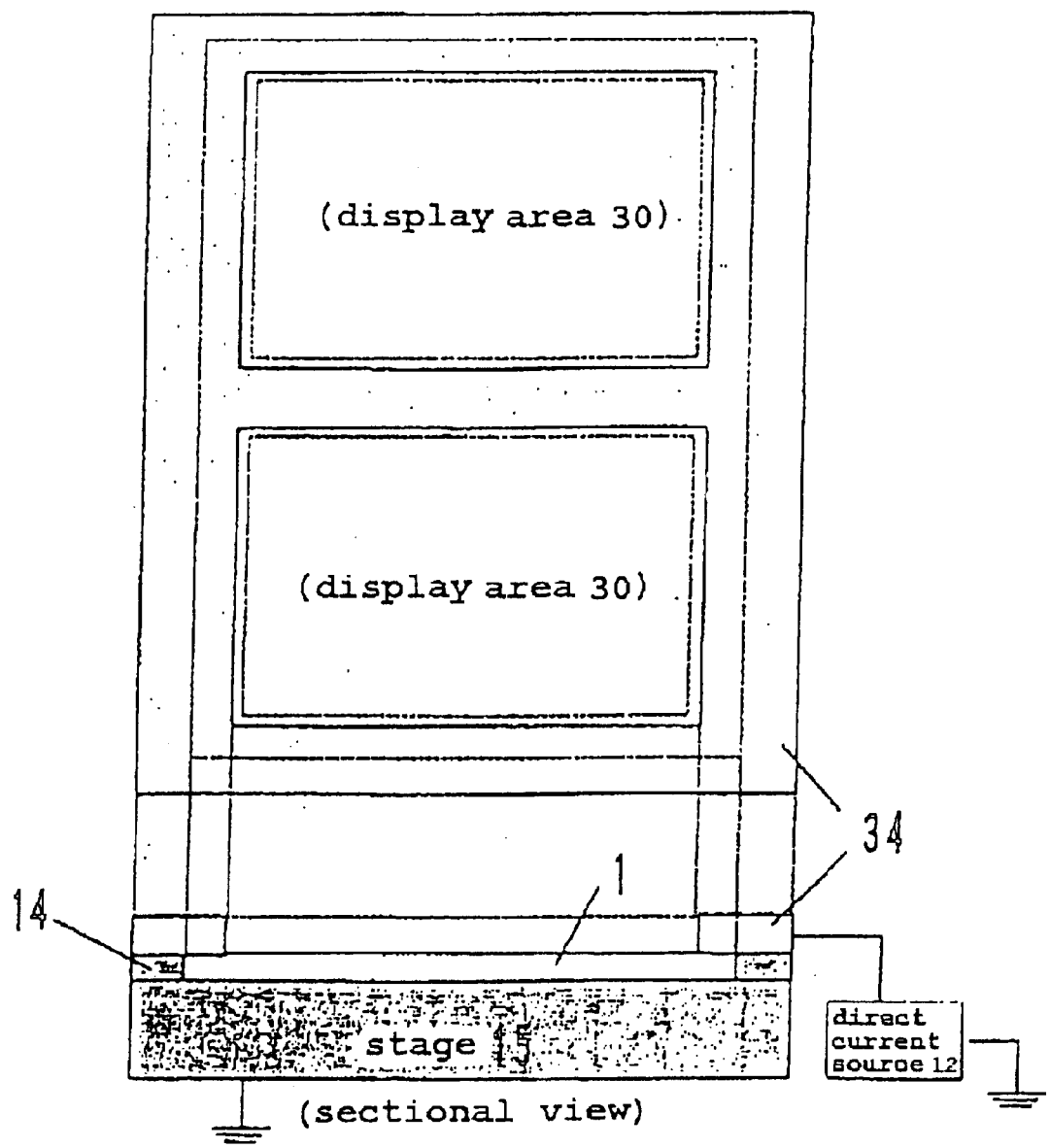
FIG. 46 is a schematic view illustrating the relation among the first substrates, stage and conductive frame in an embodiment of the method for producing a liquid crystal display device according to the present invention, the top figure being a plan view seen from above and the bottom being a sectional view.

FIG. 46 shows an embodiment of the fourth aspect of the invention for dual-panel substrates. A conductive frame is formed on the conductive stage while placing a resin or like insulator identical in thickness to the first substrate. The conductive frame is disposed in a state overlapping with the periphery of the substrate. In this way, the conductive frame overlaps with the periphery of the substrate and can be disposed without leaving any gap.

Figure 47:
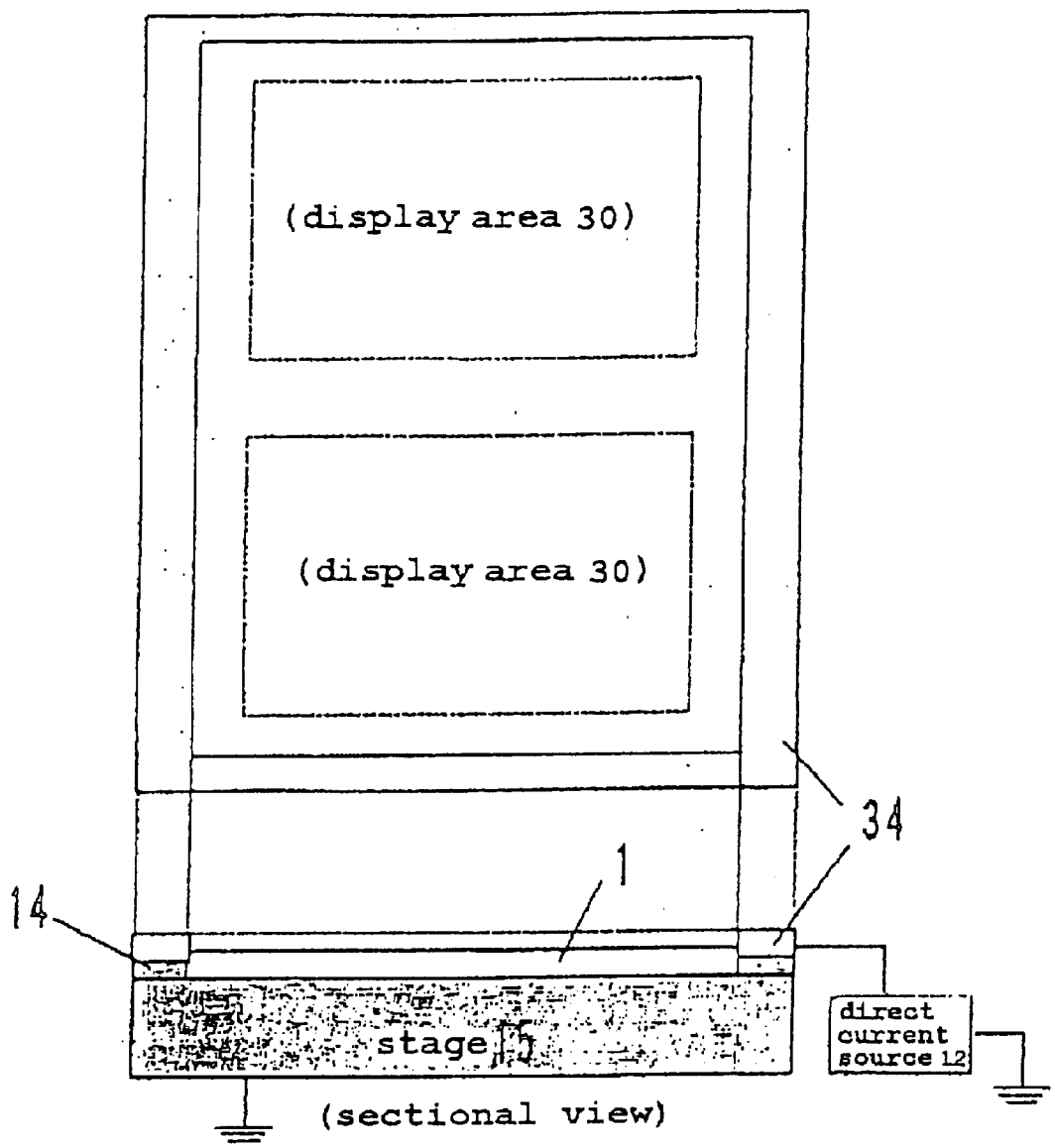
FIG. 47 is a schematic view illustrating the relation among the first substrates, stage and conductive frame in an embodiment of the method for producing a liquid crystal display device according to the present invention, the top figure being a plan view seen from above and the bottom being a sectional view.

In an embodiment of the fourth aspect of the invention, which is shown in FIG. 47, a conductive frame, which is provided with an opening identical in shape and size with the substrate, is placed on the conductive stage with an insulator sandwiched therebetween.

When a voltage of the same polarity as the transparent electrode polarity is applied to the conductive frame, the range of the repulsive electric field is enlarged and the risk of the number of spacers increasing or decreasing is absorbed in the conductor frame portion, hence the distribution of spacers within the display area becomes uniform.

The mechanism of disposition of the above conductive stage and conductive frame maybe such that the conductive frame prepared separately be put on the stage from above or they be hinged together for closing and opening.

Figure 48:
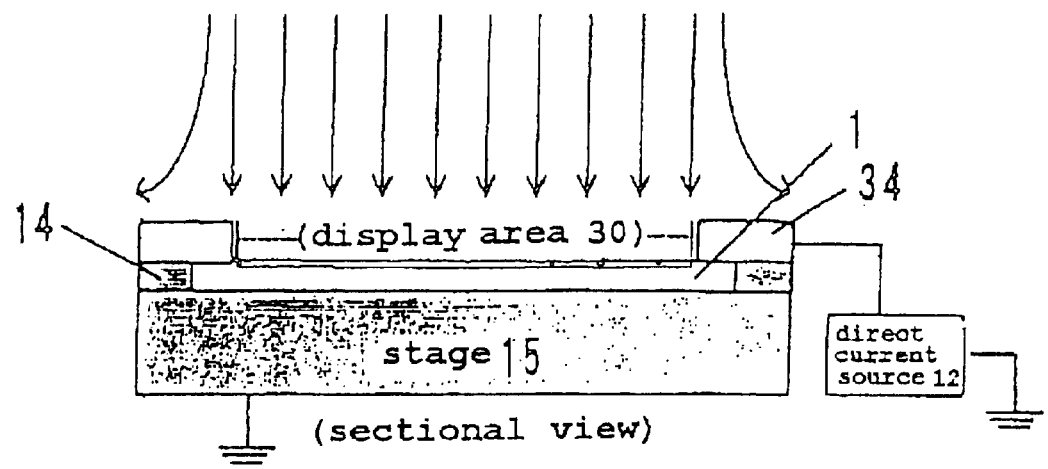
FIG. 48 is a schematic side view illustrating how spacers are sprayed onto the first substrate in an embodiment of the method for producing a liquid crystal display device according to the present invention.

FIG. 48 shows the state of sprayed spacers in the method for producing a liquid crystal display device according to the fourth aspect of the invention, wherein repulsive forces are utilized.

In the case of FIG. 47, for instance, the range of the repulsive force-exerting electric field can be enlarged by voltage application to all the stripe-shaped transparent electrodes, dummy electrode(s) and conductive frame and, therefore, the uniformity of the display area can be improved. The electrode structure to be employed in this case is as shown in FIG. 2 or FIG. 3.

When the dummy electrode is connected with the transparent electrodes, it becomes possible to carry out voltage application to the dummy electrode via the conductive frame electrically insulated from the conductive stage on which the substrate is disposed.

Figure 49:
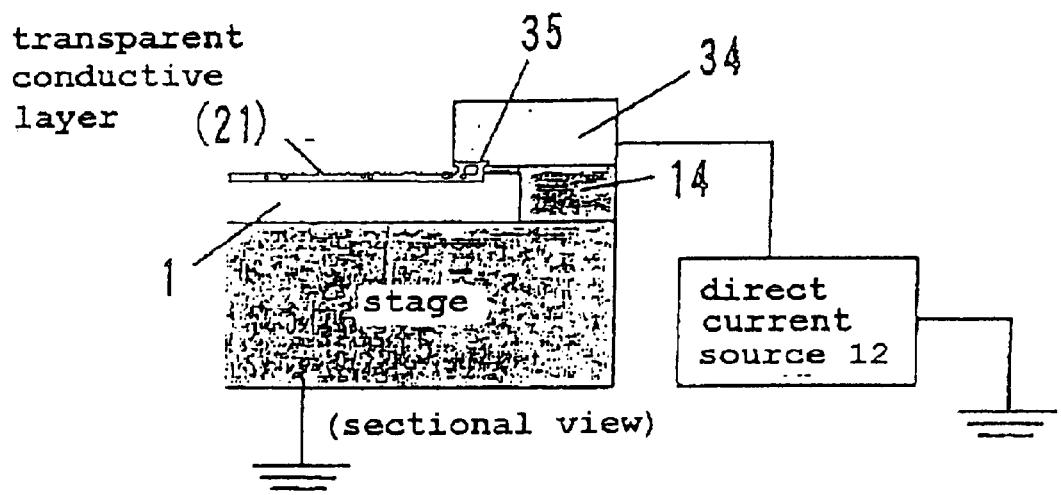
FIG. 49 is a schematic sectional view illustrating a method of applying a voltage from the conductive frame to the dummy electrode in an embodiment of the method for producing a liquid crystal display device according to the present invention, wherein a needle terminal (probe) projects out from a flat surface facing the substrate on the conductive frame to the dummy electrode for voltage application and wherein the needle terminal (probe) is provided on the connecting plane connecting the conductive frame with the dummy electrode.
Figure 50:
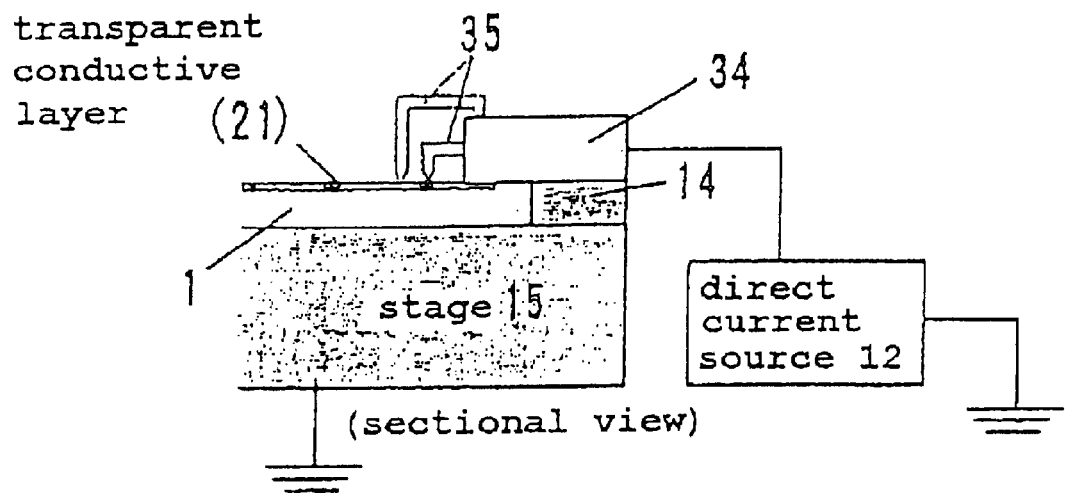
FIG. 50 is a schematic sectional view illustrating a method of applying a voltage from the conductive frame to the dummy electrode in an embodiment of the method for producing a liquid crystal display device according to the present invention, wherein a needle terminal (probe)

The voltage application to the dummy electrode from the conductive frame can be carried out, for example, by forming a needle-like body on the flat sheet surface facing the substrate on the conductive frame, on the conductive frame-forming flat sheet or on a side of the conductive frame, as shown in FIG. 49 or FIG. 50.

In some instances, depending on the distance between the conductive frame and display area, the uniformity may not be secured unless a voltage differing from the voltage applied to the transparent electrodes is applied to the conductive frame.

When, for example, repulsive forces are utilized for spacer disposition and the display area is away from the conductive frame, as shown in FIG. 51, spacers may escape into the space therebetween. In such a case, it is necessary to apply, to the conductive frame, a voltage producing a repulsive force stronger than that within the display area to thereby repel spacers oppositely toward the periphery of the display area utilizing the repulsive force.

In accordance with the method according to the fourth aspect of the invention which comprises effecting spacer charging and applying a voltage to the transparent electrodes to thereby dispose spacers in interelectrode gaps, the falling of spacers is controlled by disposing a conductive frame (conducting frame) on the periphery of the substrate and applying a voltage thereto, so that spacers can be disposed all over the substrate, to give a uniform cell gap and high quality display characteristics without display unevenness.

After completion of spacer spraying, the above conductive frame is removed and, thereafter, a liquid crystal display device can be produced by disposing a second substrate oppositely to the first substrate in the conventional manner and filling a liquid crystal into the space therebetween.

The method for producing a liquid crystal display device according to the fifth aspect of the present invention comprises spraying spacers onto at least one of a first substrate comprising at least pattern-forming transparent electrodes and an alignment layer and having a display area and a second substrate to be disposed oppositely above the first substrate and filling a liquid crystal into the space between both the substrates wherein, in spraying positively or negatively charged spacers onto the substrate, the substrate is disposed in close contact with an earthed conductive stage, a voltage having the same polarity as the spacer charge polarity is applied to the transparent electrodes on the substrate, a conductor is provided, outside the display area, in a state electrically insulated from the conductive stage, and a voltage having the same polarity as the polarity of the voltage applied to the transparent electrodes is applied to the conductor to thereby form an electric field outside the substrate as well which is almost the same as the electric field within the substrate.

The above transparent electrodes, substrate, spacers and spacer charging method are the same as those described hereinbefore referring to the first aspect of the invention. The method of liquid crystal display device according to the fifth aspect of the invention can be applied to the production of TFT type liquid crystal display devices, as explained hereinabove referring to the second aspect of the invention.

When, for example, the substrate comprising at least pattern-forming transparent electrodes and an alignment layer and having at least one display area is not earthed or is disposed in close contact with a conductive stage, which is not earthed, as shown in FIG. 52, and a voltage of the same polarity as the charge polarity of charged spacers is applied to the pattern-forming transparent electrodes on the substrate in spraying charged spacers, the resulting electric field is nearly uniform (as shown in FIG. 52 as an equipotential surface at a certain electric potential), hence no selective spacer disposition is effected.

On the other hand, when the substrate is disposed in close contact with an earthed conductive stage, as shown in FIG. 53, and a voltage of the same polarity as the charge polarity of charged spacers is applied to the pattern-forming transparent electrodes on the substrate, the electric potential lowers above each transparent electrode gap (as shown in FIG. 53 as a certain equipotential surface at a certain electric potential), hence spacers can be disposed in the transparent electrode gap under the action of a repulsive force.

However, in cases where an electric field is formed by the voltage applied to the pattern-forming transparent electrodes and a repulsive force acts on spacers, the phenomenon of the number of spacers decreasing in the vicinity of the periphery of the display area is observed and, as explained referring to the first and second aspects of the invention, the spacer distortion becomes varied and the cell thickness varies in the method for producing a liquid crystal display device and the display on the product liquid crystal display device becomes uneven.

The cause of such an increase or decrease in number of spacers in the vicinity of the periphery of the display area is as follows. When spacers are intended to be disposed in transparent electrode gaps by applying a voltage of the same polarity as the spacer charge polarity to the pattern-forming transparent electrodes, a force (repulsive force) acts on falling spacers to repel them from within the display area to the outside of the display area, as shown in FIG. 1, FIG. 52 and FIG. 53. In particular, in the vicinity of the periphery of the display area, spacers to be disposed in the peripheral portions of the display area escape to the outside since there is no repulsive force above the substrate portions outside the display area and, when the region outside the display area is large, spacers are disposed concentratedly in the region outside the display area.

For preventing these phenomena, the fifth aspect of the invention comprises disposing, in spraying positively or negatively charged spacers onto the substrate, the substrate in close contact with an earthed conductive stage, applying a voltage of the same polarity as the spacer charge polarity to the transparent electrode on the substrate, providing, outside the display area, a conductor in a state electrically insulated from the conductive stage, and applying a voltage of the same polarity as that of the voltage applied to the transparent electrodes to thereby form an electric field on the outside of the substrate almost same as the electric field within the substrate. The result is that the range of the effective repulsive force above the substrate is enlarged, the increase or decrease in number of spacers is absorbed in the region outside the substrate, and the number of spacers becomes uniform within the display area.

The earthed conductive stage, the method of applying a voltage of the same polarity as the spacer charge polarity to the transparent electrodes formed on the substrate, the material of the conductor, the shape and size of the conductor, the method of insulating the conductor from the conductive stage, the method of voltage application to the substrate, the voltage values to be applied to the transparent electrodes on the substrate and to conductive frame, and the method of forming the conductive frame are the same as those mentioned hereinabove referring to the fourth aspect of the invention.

The voltage to be applied to the conductive frame is preferably approximately the same as or higher than the voltage applied to the transparent electrodes. If the voltage applied to the conductive frame is lower than that applied to the transparent electrodes, the decrease in number of spacers on the periphery of the substrate cannot be prevented.

In cases where different voltages are applied to the conductive frame and the transparent electrodes, terminals from different voltage supply apparatus are connected with them, respectively.

Referring to FIGS. 55 to 60, specific examples of the method for producing a liquid crystal display device according to the fifth aspect of the invention are now described.

FIG. 55 is a schematic view illustrating the relation between the substrate and conductive frame, in the method for producing a liquid crystal display device according to the fifth aspect of the invention. In accordance with the fifth aspect of the invention, the conductor is a conductive frame having greater outer dimensions as compared with the substrate, as shown in FIG. 55, and has an opening greater in size than the display area but smaller in size than the substrate. The conductive frame is disposed with or without overlapping with the peripheral portions of the substrate, and a voltage of the same polarity as that of the voltage applied to the transparent electrodes is preferably applied to the conductive frame.

The above conductive stage and conductive frame may be formed either individually or partitionedly on one and the same insulating flat sheet, as shown in FIG. 56.

The position where the above conductive frame is to be formed is not particularly restricted but may be, for example, above the substrate plane, on the same level as the substrate or conductive stage, or below the conductive stage.

In cases where the opening of the conductive frame is smaller in size than the substrate and the conductive frame is placed on the substrate, as shown in FIG. 55 (1), or in cases where the opening of the conductive frame is identical with the substrate and the upper surface of the conductive frame is on the same level as the substrate surface, as shown in FIG. 55 (2), for instance, no particular problem arises if the conductive frame is greater than the substrate and conductive stage; it is only necessary that the insulation of the conductive stage from the conductive frame be secured.

In cases where the opening of the conductive frame is smaller in size than the substrate and the conductive frame is placed on the substrate, the conductive frame itself serves as a mask and, therefore, spacers will not be disposed concentratedly in the peripheral region of the substrate where there is no transparent electrode.

In cases where the opening of the conductive frame is identical in size with the substrate and the upper surface of the conductive frame is on the same level as the substrate surface, however, no repulsive force acts above the peripheral region of the substrate where no transparent electrode exists, so that spacers may be disposed on the peripheral region of the substrate in a locally concentrated manner. When the conductive frame is smaller than the conductive stage, spacers may be disposed in a locally concentrated manner on the protruding portions of the conductive stage.

The above local concentration of spacers means the escape of spacers from the periphery of the display area to the sites of concentration. This causes a decrease in number of spacers on the periphery of the display area and, as a result, the cell thickness may possibly become irregular in the product liquid crystal display device.

In cases where the conductive frame is located on the substrate, the substrate can come into full contact with the conductive stage. The size of the conductive stage is not particularly restricted but, for example, may be greater or smaller than the substrate size.

As regards the spacer disposition, the electric potential above each transparent electrode gap is lowered and an electric field suited for the disposition is formed by disposing the substrate into close contact with the conductive stage. Therefore, in cases where the conductive frame is disposed on the lower (reverse) side of the substrate, the conductive frame is in contact with the under (reverse) surface of the substrate, so that the electric potential of the substrate in the contact region rises and the spacer disposition quality may become poor as the case may be.

It is preferred that the above conductive stage be not greater in size than the substrate but large enough to cover the region outside the parting lines and the conductive frame upper surface be on almost the same level as the conductive stage surface, as shown in FIG. 55 (3), or the conductive frame be disposed at a position lower than the conductive stage, as shown in FIG. 55 (4).

The parting lines are those lines based on which the first and second substrates, after panel alignment, are cut.

In cases where the dummy electrodes are provided in the region outside the display area on the substrate, the region outside the parting lines is the dummy electrode region, as shown in FIG. 59.

When the conductive frame upper surface is on the almost same level as the conductive stage surface, the substrate comes into contact with the conductive frame, as shown in FIG. 55 (3). When the conductive frame is disposed at a position lower than the conductive stage, a state arises such that the end portions of the substrate are apart from the frame, as shown in FIG. 55 (4).

By disposing the conductive frame in such a position, it becomes possible to dispose spacers uniformly in a desired manner all over the substrate and prevent spacers from being disposed in a locally concentrated manner even in the peripheral portions of the substrate where no transparent electrode exists, owing to the influence, from below, of an electric field formed by the conductive frame.

It is preferred that the above conductive stage be not greater in size than the substrate but large enough to cover the region outside the parting lines, and the conductive frame be formed outside so as to extend from the region outside the parting lines, to the outside of the substrate, as shown in FIG. 57, with the area occupied by the conductive stage and that by the conductive frame in the region outside the parting lines being [area occupied by conductive stage]>[area occupied by conductive frame].

In the above case, the conductive frame may be disposed in contact with the substrate or out of contact with the substrate.

FIG. 59 is a schematic view illustrating the picture frame state of the black matrix, in the method for producing a liquid crystal display device according to the fifth aspect of the invention. At least one of the first substrate and the second substrate to be disposed oppositely above the first substrate is a color filter substrate for liquid crystal display device production and has a black matrix formed thereon, as shown in FIG. 59. The black matrix is partitioned within the display area to give lattice-forming pixels.

The above black matrix defines the display area in the manner of a picture frame. That picture frame state is formed by a region where no black matrix portion exists. In some instances, the black matrix may remain as a solid mask or masks also in the dummy electrode portion or portions outside the picture frame. In such cases, the black matrix site is almost identical with the region comprising transparent electrodes.

Chromium is most often used as the material for forming the black matrix (such black matrix is also called "conductive black matrix). With a color filter substrate for liquid crystal display device production having such a constitution, even when a conductive stage smaller than the region where a black matrix made of chromium is formed, the effect of the earthed conductive stage is obtained in the whole region of the black matrix and the electric potential of the black matrix is lowered, so that the black matrix region can reflect the effect of the conductive stage.

Therefore, even when the conductive stage is smaller than the substrate, an electric field suited for spacer disposition is formed in the region occupied by the black matrix.

When, for forming the picture frame state of the black matrix on the above substrate, a black matrix-free region is formed, the black matrix portion occurring in the display area is separated from the black matrix portion or portions in the dummy electrode region or regions outside the display area, so that the effect of the earthing of the conductive stage differs between the display area inside and the dummy electrode region or regions.

It is therefore necessary that the size of the conductive stage be such that it covers the picture frame region of the black matrix, the black matrix-free region and the dummy electrode region or regions. When this requirement is satisfied, the state of spacer disposition on the whole substrate becomes uniform.

If, in forming the conductive frame almost on the same level as the conductive stage, as shown in FIG. 55 (3), the substrate is set on the conductive frame, the substrate comes into contact with both the conductive stage upper surface and the conductive frame upper surface.

In that case, the underside (back) of the peripheral region of the substrate is locally exposed to the earth potential and an electric potential from the conductive frame. In particular, in this vicinity, the black matrix within the display area is separated from the black matrix in the dummy electrode region or regions, so that the separated outside region or regions undergo a unique influence different from the effect on the display area.

Therefore, in this case, the separated dummy electrode region or regions should have an electric potential close to the earth potential. For that purpose, it is necessary that, as shown in FIG. 57, the area occupied by the conductive stage and that occupied by the conductive frame within the dummy electrode region or regions be as follows: [area occupied by conductive stage]>[area occupied by conductive frame].

If the relations between the areas occupied by the conductive stage and conductive frame within the dummy electrode region or regions becomes [area occupied by conductive stage]<[area occupied by conductive frame], the electric potential rises in each transparent electrode gap in said region or regions, making spacer disposition difficult.

It is preferred that the above conductive stage be not greater in size than the substrate but extend to the regions outside the parting lines, and that the conductive frame be formed outside the transparent electrodes without overlapping with the regions outside the parting lines, as shown in FIG. 58.

In other words, it is required that the conductive frame be formed at places not included in any dummy electrode region. At such locations, the electric potential of the conductive frame will not affect the black matrix, hence spacers will not be locally concentrated in the peripheral region of the substrate.

On the other hand, in cases where, among the above-mentioned positional relations between the conductive stage and conductive frame, the conductive frame is positioned below the conductive stage, the regions outside the parting lines do not directly contact with the conductive frame, as shown in FIG. 55 (4).

In that case, since the substrate end portions are not earthed, the electric potential rises in those portions and no local spacer concentration occurs on the substrate end portions.

In some cases, the material of the above black matrix is made of a composition comprising a pigment dispersed in a resin, other than chromium. Since such composition has a low conductivity, the conductive stage may fail, in certain instances, to produce the same effect as produced in the case of a chromium black matrix.

When, in such a case, the conductive frame is disposed below the substrate, it is preferred that, as shown in FIG. 60, the conductive stage be almost identical in size with the region in which the transparent electrodes exist, and that the end portions of the conductive frame be formed within the transparent electrode-free region.

In this manner, the conductive stage is caused to exist in the region comprising transparent electrodes to form an electric field suited for spacer disposition. On the other hand, the transparent electrode-free region is caused to contact with the conductive frame or to be free from the conductive stage, to thereby prevent the potential drop in the end portions of the substrate and thus prevent spacers from being sprayed in a locally concentrated manner.

By forming a similar electric field above the region outside the display area, as mentioned above, in carrying out the method for producing a liquid crystal display device according to the fifth aspect of the invention, it becomes possible to dispose spacers uniformly all over the substrate, so that the liquid crystal display device obtained by that method can have a uniform cell thickness and high quality display performance characteristics without showing display unevenness.

The method for producing a liquid crystal display device according to the sixth aspect of the invention comprises spraying spacers onto at least one of a first substrate comprising at least pattern-forming transparent electrodes and an alignment layer and having one or more display areas and a second substrate to be disposed opposedly above the first substrate and filling a liquid crystal into the space between both the substrates, wherein, in spraying positively or negatively charged spacers onto the substrate, the substrate is disposed in close contact with an earthed conductive stage smaller in size than the substrate to allow the substrate periphery to be apart from the conductive stage, and a voltage of the same polarity as the spacer charge polarity is applied to the transparent electrodes on the substrate.

The above transparent electrodes, substrate, spacers and spacer charging method are not particularly restricted but may be the same as those mentioned hereinabove referring to the first aspect of the invention. The method for producing a liquid crystal display device according to the sixth aspect of the invention can be applied to the production of TFT type liquid crystal display devices, as explained hereinabove referring to the second aspect of the invention.

If, in practicing the six aspect of the present invention, a voltage of the same polarity as the spacer charge polarity is merely applied to the transparent electrodes in spraying spacers, the phenomenon of the number of spacers increasing or decreasing in the vicinity of the periphery of the display area is observed, as explained in detail referring to the fifth aspect of the invention, and, in the process of liquid crystal display device production, the spacers undergo distortion in various ways, causing variations in cell thickness, with the result that the product liquid crystal display device shows display unevenness, as explained hereinabove referring to the first and second aspects of the invention.

Further, since a voltage of the same polarity as the spacer charge polarity is applied to the transparent electrodes within the substrate, a repulsive force acts on spacers above the display area and, on the other hand, since the conductive stage is at the earth potential, an attractive force acts on the charged spacers and, as a result, those spacers in the peripheral region of the substrate tend to escape from within the substrate by the effects of both of the repulsive force from within the substrate and the attractive force from the conductive stage, as shown in FIG. 61.

For preventing these phenomena, the sixth aspect of the invention comprises, in spraying positively or negatively charged spacers onto the substrate, disposing the substrate in close contact with an earthed conductive stage smaller in size than the substrate to thereby maintain the peripheral region of the substrate apart from the conductive stage, as shown in FIG. 62, and applying a voltage of the same polarity as the spacer charge polarity to the transparent electrodes on the substrate. Thereby, the effect of earthing from the conductive stage upon the substrate end portions is weakened, and the electric potential on the transparent electrodes tends to become rather more influential, so that the number of spacers to be disposed in the peripheral portions of the substrate can be prevented from decreasing as compared with the case in which the conductive stage is greater in size than the substrate.

The earthed conductive stage, the method of applying a voltage of the same polarity as the spacer charge polarity to the transparent electrodes formed on the substrate, the material of the conductor, the shape and size of the conductor, the method of insulating the conductive stage from the conductor, the method of voltage application to the substrate, the voltage values to be applied to the transparent electrodes on the substrate and to the conductive frame, and the method of forming the conductive frame are the same as those mentioned hereinabove referring to the fourth aspect of the invention.

The state of the peripheral region of the substrate being apart from the conductive stage is the state in which the edges of the substrate are protruding from the conductive stage surface, as shown in FIG. 62.

Specific embodiments of the sixth aspect of the invention are now described.

The substrate onto which spacers are to be sprayed may have a black matrix formed thereon, as in the fifth aspect of the invention. The same effects as mentioned above can be obtained irrespective of whether the black matrix is an insulating one or a conductive one.

It is preferred, however, that the black matrix is conductive, and the conductive stage comprise one or more parts each smaller in size than the picture frame periphery of the black matrix in each display area on the substrate. In such a case, the number of spacers to be disposed in the peripheral portions of the substrate can be more satisfactorily inhibited from decreasing.

With a color filter substrate for liquid crystal display device production which has such a constitution as mentioned hereinabove in detail referring to the fifth aspect of the invention, the effect of the earthed conductive stage is produced all over the whole region of the conductive black matrix, and the electric potential on the conductive black matrix lowers even when a conductive stage smaller than the region in which the conductive black matrix is formed is used. The conductive black matrix region can thus reflect the effect of the conductive stage.

Therefore, even when the conductive stage is smaller than the substrate, an electric field suited for spacer disposition is formed in the region in which the conductive black matrix exists.

Since, on that occasion, that region which is outside the picture frame of the conductive black matrix is not earthed, the electric potential of the glass portion of the substrate is influenced by the voltage applied to the transparent electrodes, and said electric potential rises in the direction approaching to the electric potential of the transparent electrodes. The state in which the region outside the picture frame of the conductive black matrix is not earthed is encountered, for example, when there is a portion of the black matrix but the portion is separated from the picture frame by a parting line, or when there is no conductive black matrix portion outside the picture frame of the conductive black matrix.

When, in that state, the electric potential within the display area is compared with that outside the display area, a higher electric potential owing to the high voltage applied to the transparent electrodes and a lower electric potential in each transparent electrode gap exist within the display area.

On the other hand, when a dummy electrode is formed, the dummy electrode and the substrate glass portion both have a high electric potential, as shown in FIG. 63. Thus, from the whole substrate viewpoint, a high electric potential region is formed outside the display area and a low electric potential region is formed within the display area.

Therefore, the high electric potential region outside the display area serves as a wall of repulsive force and thus inhibits spacers within the display area from escaping to the outside of the display area. As a result, the number of spacers within the display area becomes uniform and the cell thickness is thereby rendered uniform, with the result that the product liquid crystal display device shows uniform display characteristics.

Even in cases where the substrate onto which spacers are to be sprayed is a dual-panel one having a number of display areas formed thereon, the same effects as mentioned above can be produced for all display areas, if the black matrix is conductive, by providing a plurality of conductive stages each having a size such that each stage lies within the picture frame periphery of the black matrix in each display area.

In the above case, a plurality of conductive stages may respectively be disposed corresponding to the plurality of display areas or grooves may be formed on a single conductive stage to give a plurality of conductive stages.

The area of contact between the above conductive stage and substrate is preferably not less than 30% of the area of the display area.

In cases where a conductive black matrix is formed as mentioned above, the conductive black matrix reflects the effect of the conductive stage even if the conductive stage is smaller than the black matrix region. As a result, an electric field suited for spacer disposition is formed.

However, if the area of contact between the conductive stage and display area (black matrix region) is too small, the effect of earthing will become weak. Therefore, for forming an electric field suited for spacer disposition above the display area, the area of contact between the conductive stage and substrate should preferably be not less than 30% of the area of the display area on the substrate. When it is less than 30%, the effect of earthing becomes weak, the electric field suited for spacer disposition disintegrates and the spacer disposition in the peripheral region of the display area becomes difficult.

The particle sprayer according to the seventh aspect of the invention is intended for selectively disposing charged particle on a substrate having a plurality of electrodes, said particle sprayer comprising
    a nozzle for spraying charged particles onto the substrate,
    a conductive stage having a fixed position and serving to hold the substrate onto which charged particles are to be sprayed,
    a plurality of push-up pins for mounting the substrate on and dismounting the substrate from the conductive stage, a probe for applying a voltage identical in polarity with the charged particles to a plurality of electrodes on the substrate disposed on the conductive stage,
    and a conductor electrically insulated from the conductive stage, said conductor being a conductive frame provided with an opening smaller in size than the substrate, disposed on the top of the substrate disposed on the conductive stage and being applied a voltage of the same polarity as the charged particle polarity thereto.

The above transparent electrodes, substrate, particles and particle charging method are the same as those mentioned hereinabove referring to the first aspect of the invention.

The earthed conductive stage, the method of applying a voltage of the same polarity as the spacer charge polarity to the transparent electrodes formed on the substrate, the material of the conductor, the shape and size of the conductor, the method of insulating the conductive stage from the conductor, the method of voltage application to the substrate, the voltage values to be applied to the transparent electrodes on the substrate and to the conductive frame and the method of forming the conductive frame are the same as those mentioned hereinabove referring to the fourth aspect of the invention.

The particle sprayer according to the seventh aspect of the invention can be applied to the production of liquid crystal display devices and, in that case, those spacers mentioned in reference to the first aspect of the invention may be used as the particles.

Here, it is desirable that the probe and conductor can move up and down in synchronization with each other or integrally with each other and/or, further, that the probe, conductor and push-up pins can be driven in synchronization with one another by a single driving mechanism.

It is preferred that one and the same voltage is applied to the plurality of electrodes and the conductor simultaneously.

Specific embodiments of the seventh aspect of the invention as applied to the production of liquid crystal display devices are now described referring to FIGS. 64 to 68.

FIG. 64 shows a schematic sectional view of an example of the particle sprayer according to the seventh aspect of the invention, FIG. 65 is an explanatory view showing the manner of feeding and carrying-out of the substrate in operating the sprayer shown in FIG. 64, FIG. 66 is an enlarged explanatory view of the essential parts of the sprayer shown in FIG. 64, and FIG. 67 is an explanatory plan view showing the relation between the substrate and conductive frame.

As shown in FIG. 64, the particle sprayer comprises a particle tank 11b for feeding spacers, which are particles to be sprayed onto a substrate, together with an air flow, a pipe 17 for carrying, by means of an air flow, the spacers supplied by the particle tank 11b to thereby cause the spacers to be charged as a result of their contacting with the pipe inside wall on the way to the site of spraying, a chamber 10 for spraying the spacers onto the substrate. The chamber 10 has, at its lower part, a driving mechanism 31 for driving a conductive frame, a probe, push-up pins and so forth, which are to be described later herein, in the vertical direction and, on its side, a robot mechanism 32 for feeding the substrate onto which spacers are to be sprayed into the chamber 10 and taking out the substrate having spacers sprayed thereon from within the chamber 10.

The chamber 10 is equipped, at its top, with a nozzle 11a for spraying the charged spacers fed through the pipe 17 from the particle tank 11b uniformly over a predetermined spacer spraying range 33 while swinging and, at its lower part, with a conductive stage 15 for holding the substrate 1 for liquid crystal display device production as mounted thereon. This conductive stage 15 is disposed at a fixed position relative to the chamber 10, and the spacers sprayed from the nozzle 11a fall onto and are disposed on the substrate 1 held by the top surface of the conductive stage.

The conductive stage 15 holds the substrate 1 placed thereon and, above this substrate 1, there is disposed vertically movably a conductive frame 34 which is to be overlapped and laid on the upper surface of the substrate 1. This conductive frame 34 is a thin plate-like conductor or a thin plate-like body coated with a conductive material and has a size sufficiently greater than the spacer spraying range 33 of the nozzle 11a and has an opening 34a, which is greater than the display area of the substrate 1 but smaller than the substrate 1 for exposing the display electrode domain comprising the transparent electrodes 3 on the substrate 1, as shown in FIG. 67.

It is preferred that this opening 34a be greater than the display area of a liquid crystal display device produced from the substrate 1 and other parts but be smaller than the dummy electrode region formed outside the display electrode region comprising display electrodes 3 for producing an antistatic effect, among others.

Above the conductive frame 34, there is a probe 35 which is movable up and down in synchronization with the conductive frame 34 and presses its tip or point to a transparent electrode 3 (preferably a dummy electrode) on the substrate 1 and thereby applies a voltage to the transparent electrodes 3. This probe 35 is connected, together with the conductive frame 34, with a voltage application apparatus 12 (cf. FIG. 64) and serves to apply a predetermined voltage having the same polarity as the spacer charge polarity to the transparent electrodes 3 on the substrate 1 and conductive frame 34.

Here, a force is preferably exerted on the probe 35 in a downward direction by means of a spring (not shown) so that the probe may stably contact with a transparent electrode 3 on the substrate 1. When a downward force is exerted on it, it may be fixed to the conductive frame 34, as shown in FIG. 66, or, when the same voltage is applied to the conductive frame 34 and the transparent electrodes 3 on the substrate 1, a conductor connector (not shown) may be provided as the probe 35, which is connected with the transparent electrodes 3 on the substrate 1 disposed in contact with the lower surface of the conductive frame 34.

For feeding the substrate 1 to be mounted on and held by the upper surface of the conductive stage 15 or taking out the substrate 1, a plurality of push-up pins 36 extending through the conductive stage 15 are provided so that they may push up the substrate 1 and enable insertion of arms 32a of the robot mechanism 32, as shown in FIG. 65.

These push-up pins 36 push up the substrate 1 and enable insertion of the arms 32a of the robot mechanism 32 and, further, peel the substrate 1 from the conductive stage 15 electrostatically kept in intimate contact therewith by the voltage applied in spacer spraying by the nozzle 11a while introducing air from the surroundings of the substrate. Preferably, those pins which push up the periphery of the substrate have a slightly greater length and those pins which push up the middle of the substrate have a slightly shorter length so that air introduction from around the periphery of the substrate may be facilitated.

For facilitating the peeling of the substrate 1 from the conductive stage 15, it is also possible to provide the conductive stage 15 with air holes (not shown) and feed air to between the conductive stage 15 and substrate 1 therethrough. In that case, it is no more necessary to make those push-up pins 36 on the substrate periphery longer.

By providing such air holes, it is also possible to facilitate the peeling of the substrate 1 by blowing air therethrough in pushing up the substrate 1 by means of the push-up pins 36 after bring the substrate 1 into intimate contact with the conductive stage by evacuation therethrough in mounting and holding the substrate 1 on the upper surface of the conductive stage 15.

The push-up pins 36 and conductive frame 34 are connected with the single driving mechanism 31. In accordance with the seventh aspect of the invention, this driving mechanism 31 is a flat plate-like one disposed below the conductive stage 15. When this flat plate-like driving mechanism 31 is moved up and down by means of a driving source (not shown), the push-up pins 36 and conductive stage 34 move up and down accordingly.

In feeding the substrate 1 or taking out the same, it is necessary to first raise the conductive frame 34 to make it possible to raise the push-up pins 36 and then raise the push-up pins 36 to thereby peel and lift the substrate 1 off from the conductive stage 15.

For this purpose, according to the seventh aspect of the invention, measures are taken so that a gap A may be formed between the substrate 1 and push-up pins 36 when the driving mechanism 31 is in its descended state, as shown in FIG. 66. Thus, when the driving mechanism 31 is raised, the conductive frame 34 alone is raised in the beginning and, after the rise of the conductive frame 34 by the gap A, the push-up pins rise to contact with the substrate 1 and then peel off the same from the conductive stage 15 and lift the same.

By separating, in the above manner, the substrate 1 from the conductive frame 34 by the gap A in the raised state of the driving mechanism 31, a sufficient gap is secured to slightly raise the arms 32a so that the substrate 1 may be out of contact with the push-up pins 36 in the step of feeding or taking out the substrate 1 by means of the robot mechanism 32.

A typical example of the layout of the push-up pins 36, the push-up shafts 34b of the conductive frame 34 and the arms 32a of the robot mechanism 32 is shown in FIG. 67. As shown in FIG. 67, a number of push-up pins 36 are preferably provided so that the substrate 1 may not be damaged in the step of peeling the substrate 1 off from the conductive stage 15.

The push-up shafts 34b of the conductive frame 34 are desirably disposed around the substrate 1 or conductive stage 15 so that they may not interfere with the latter. The arms 32a of the robot mechanism 32 are drawn by imaginary lines on the left of FIG. 67. The arms 32a formed as a plurality of branches so that they may not interfere with the push-up pins 36 or with the push-up shafts 34b of the conductive frame 34 are provided with sucking cups 32b for sucking and holding the substrate 1.

FIG. 68 is an explanatory view showing an equipotential line 37 observed when a voltage is applied to the conductive frame 34 and the transparent electrodes 3 on the substrate 1. As shown in FIG. 68, the electric potential is higher above the conductive frame 34 and transparent electrodes 3 and it is lower in each gap between electrodes (interelectrode gap), namely in each gap between neighboring transparent electrodes and in each gap between the conductive frame 34 and the neighboring transparent electrode 3.

Since the spacers sprayed from the nozzle 11a are charged and have the same polarity as the polarity of the voltage applied to the conductive frame 34 and transparent electrode domain 3, the spacers fall while being repelled by the repulsive force exerted by the electric field above the substrate, move toward the positions where the electric potential is low, and drop concentratedly in interelectrode gaps, namely the gaps between respective transparent electrodes and gaps between the conductive frame 34 and the respective neighboring transparent electrodes 3.

In the region outside the conductive frame 34, which are far away from the spacer spraying range 33, no spacer drops outside the conductive frame 34 even if there is repulsion by a repulsive force. The spacers sprayed from the nozzle 11a thus fall only onto the transparent electrode gaps and the gaps between the conductive frame 34 and the respective neighboring transparent electrodes 3.

The voltages to be applied to the conductive frame 34 and transparent electrodes 3 can be selected so that spacers fall onto the transparent electrode gaps and the gaps between the conductive frame 34 and the respective neighboring transparent electrodes 3 with an appropriate probability. By selecting one and the same voltage and selecting the gap distance between the neighboring transparent electrodes 3 and between the conductive frame 34 and the neighboring transparent electrodes 3 so that spacers may fall therein with an appropriate probability, it is possible, in gradually applying the voltage to or removing the same from the transparent electrodes 3 on the substrate 1 and the conductive frame 34, to simultaneously apply the voltage to them or remove the same therefrom and thus facilitate the voltage control on the power source apparatus 12.

Some typical embodiments of the seventh aspect of the invention have been described above. It is to be noted, however, that the seventh aspect of the invention is not limited to these embodiments but various modifications and variations can of course be made without departing from the spirit of the seventh aspect of the invention.

The eighth aspect of the invention is related to the liquid crystal display device produced by using the method of spraying particles according to the first aspect of the invention.

The ninth aspect of the invention is related to the liquid crystal display device produced by the method for producing a liquid crystal display device according to the second or third aspect of the invention.

The tenth aspect of the invention is related to the liquid crystal display device produced by the method for producing a liquid crystal display device according to the fourth, fifth or sixth aspect of the invention while using the particle sprayer according to the seventh aspect of the invention.

The liquid crystal display device according to the eighth, ninth or tenth aspect of the invention is uniform in cell thickness and show high quality display characteristics without display unevenness.

BEST MODES FOR CARRYING OUT THE INVENTION

The following examples illustrate the present invention in further detail. They are, however, by no means limitative of the scope of the invention.

EXAMPLE 1

A pair of soda glass-made insulating substrates each having an outer size of 370×480 mm and a thickness of 0.7 mm were used. On one of the insulating substrates 1, there were formed RGB color filters 4 with a black matrix 5, which is a light shielding layer, and an overcoat 6 for protecting the color filters 4. On the overcoat 6 were formed stripe-shaped display electrodes 3 made of ITO and further an alignment layer 9 made of a polyimide resin. After alignment treatment, a sealing material 24 was applied by the technique of screen printing. Glass beads to serve as spacers 25 within the sealing material was incorporated in the sealing material 24.

On the other insulating substrate 1, there were formed, as shown in FIG. 5 and FIG. 69, 285-$\mu$m-wide stripe-shaped display electrodes 3 made of ITO and having a thickness of 300 nm at intervals of 15 μm. Auxiliary electrodes 20 were further formed for voltage application to the display electrodes 3, dummy electrodes 21 were formed along the sides where there was no auxiliary electrode 20 and, further, an insulating layer 23 and an alignment layer 9 made of a polyimide resin were formed. In some instances, the insulating layer 23 need not be formed.

Here, the dummy electrodes 21 were electrically connected together by means of a conductive material (effective in reducing the number of power supplying parts). In FIG. 69, dummy electrodes 21 are disposed only along the upper, lower and right sides of the effective display area. This is because there are the auxiliary electrodes 20 for voltage application to the display electrodes outside the left side of the effective display area and this produces the same effect as the dummy electrodes 21 produces.

Using synthetic resin particles, BBS-60510-PH (product of Sekisui Fine Chemical), as spacers, these were charged negatively and sprayed onto said other insulating substrate 1. On that occasion, a voltage of −2 kV was applied to the display electrodes 3 and to the dummy electrodes 21 (cf. FIG. 5).

As a result, spacers 8 could be disposed only in the gaps between display electrodes 3. The selectivity of disposition of spacers 8 in interelectrode gaps was improved as compared with the case in which no dummy electrode 21 was provided.

Then, the insulating substrates 1 forming a pair were lapped over each other, hot-pressed at 180° C. and 0.8 kg/cm² and post-baked at 150° C. Thereafter, trimming was performed for removing unnecessary portions, whereupon the auxiliary electrodes 20 and dummy electrodes 21 were cut off. Then, a liquid crystal 7 was poured therebetween to give a liquid crystal display device (shown in FIG. 70) in which the pair of insulating substrates were bonded together.

EXAMPLE 2

A pair of soda glass-made insulating substrates each having an outer size of 370×480 mm and a thickness of 0.7 mm were used. On one of the insulating substrates 1, there were formed RGB color filters 4 with a black matrix 5, which is a light shielding layer, and an overcoat 6 for protecting the color filters 4. On the overcoat 6 were formed stripe-shaped display electrodes 3 made of ITO and further an alignment layer 9 made of a polyimide resin. After alignment treatment, a sealing material 24 was applied by the technique of screen printing. Glass beads to serve as spacers 25 within the sealing material was incorporated in the sealing material 24.

On the other insulating substrate 1, there were formed, as shown in FIG. 11 and FIGS. 13–16, 285-μm-wide stripe-shaped display electrodes 3a and 3b made of ITO and having a thickness of 300 nm at intervals of 15 μm. Auxiliary electrodes 20a and 20b and accessory electrodes 29 were formed and, further, an insulating layer 23 and an alignment layer 9 made of a polyimide resin were formed. The insulating layer 23 need not be formed in some instances.

Using synthetic resin particles, BBS-60510-PH (product of Sekisui Fine Chemical), as spacers, these were charged negatively and sprayed onto said other insulating substrate 1. On that occasion, a voltage of −500 V was applied to the display electrodes 3a and −700 V to the display electrodes 3b, to produce a potential difference of 200 V between the display electrodes 3a and 3b. The same voltage as that applied to the display electrodes 3b, namely −700 V, was applied to the accessory electrodes 29 (cf. FIG. 11 and FIGS. 13–16).

As a result, spacers 8 could be disposed only in the gaps between display electrodes 3a and the density of spacers disposed in the gaps between display electrodes 3a, inclusive of those gaps between display electrodes 3a in the vicinity of the periphery of each display area 30, could be rendered uniform within the display area 30.

Furthermore, spacers 8 could be disposed concentratedly in the middle of each gap between display electrodes 3a and the probability of spacers 8 being disposed in the edge portions of the display electrodes 3a could be reduced.

Then, the insulating substrates 1 forming a pair were lapped over each other, hot-pressed at 180° C. and 0.8 kg/cm² and post-baked at 150° C. Thereafter, trimming was performed for removing unnecessary portions, whereupon the auxiliary electrodes 20a and 20b and accessory electrodes 29 were cut off. Then, a liquid crystal 7 was poured therebetween to give a liquid crystal display device (shown in FIG. 70) in which the pair of insulating substrates were bonded together.

EXAMPLE 3

Spacers 8 were sprayed in the same manner as in Example 2 except that +500 V was applied to the display electrodes 3a and +300 V to the display electrodes 3b on the other insulating substrate 1, to give a potential difference of 200 V between the display electrodes 3a and 3b while the same voltage as applied to the display electrodes 3a (+500 V) was applied to the accessory electrodes 29 (cf. FIG. 11 and FIGS. 17–20).

As a result, spacers 8 could be disposed only in the gaps between display electrodes 3a, and the density of spacers disposed in the gaps between display electrodes 3a, inclusive of those gaps between display electrodes 3a in the vicinity of the periphery of each display area 30, could be rendered uniform within the display area 30.

Thereafter, a liquid crystal display device was manufactured in the same manner as in Example 2.

EXAMPLE 4

Spacers 8 were sprayed in the same manner as in Example 2 except that +50 V was applied to the display electrodes 3a and −150 V to the display electrodes 3b on the other insulating substrate 1, to give a potential difference of 200 V between the display electrodes 3a and 3b while −100 V was applied to the accessory electrodes 29 by connecting a conductor wire 18 therewith (cf. FIG. 12, FIG. 17 and FIGS. 21–23).

As a result, spacers 8 could be disposed only in the gaps between display electrodes 3a and the density of spacers disposed in the gaps between display electrodes 3a, inclusive of those gaps between display electrodes 3a in the vicinity of the periphery of each display area 30, could be rendered uniform within the display area 30.

Thereafter, a liquid crystal display device was manufactured in the same manner as in Example 2.

EXAMPLE 5

Spacers 8 were sprayed in the same manner as in Example 2 except that +150 V was applied to the display electrodes 3a and −50 V to the display electrodes 3b on the other insulating substrate 1, to give a potential difference of 200 V between the display electrodes 3a and 3b while +100 V was applied to the accessory electrodes 29 by connecting a conductor wire 18 therewith (cf. FIG. 12, FIG. 17 and FIGS. 24–26).

As a result, spacers 8 could be disposed only in the gaps between display electrodes 3a and the density of spacers disposed in the gaps between display electrodes 3a, inclusive of those gaps between display electrodes 3a in the vicinity of the periphery of each display area 30, could be rendered uniform within the display area 30.

Thereafter, a liquid crystal display device was manufactured in the same manner as in Example 2.

EXAMPLE 6

Spacers 8 were sprayed in the same manner as in Example 2 except that +50 V was applied to the display electrodes 3a and −150 V to the display electrodes 3b on the other insulating substrate 1, to give a potential difference of 200 V between the display electrodes 3a and 3b while −100 V was applied to the accessory electrodes 29 by connecting a conductor wire 18 therewith (cf. FIGS. 27–31).

As a result, spacers 8 could be disposed only in the gaps between display electrodes 3a and the density of spacers disposed in the gaps between display electrodes 3a, inclusive of those gaps between display electrodes 3a in the vicinity of the periphery of each display area 30, could be rendered uniform within the display area 30.

Thereafter, a liquid crystal display device was manufactured in the same manner as in Example 2.

EXAMPLE 7

Spacers 8 were sprayed in the same manner as in Example 2 except that −300 V was applied to the display electrodes 3a and accessory electrodes 29a and −500 V to the display electrodes 3b and accessory electrodes 29b on the other insulating substrate 1, to give a potential difference of 200 V between the display electrodes 3a and 3b (cf. FIGS. 32-35).

As a result, spacers 8 could be disposed only in the gaps between display electrodes 3a and the density of spacers disposed in the gaps between display electrodes 3a, inclusive of those gaps between display electrodes 3a in the vicinity of the periphery of each display area 30, could be rendered uniform within the display area 30.

Thereafter, a liquid crystal display device was manufactured in the same manner as in Example 2.

EXAMPLE 8

Spacers 8 were sprayed in the same manner as in Example 2 except that +300 V was applied to the display electrodes 3a and +500 V to the display electrodes 3b on the other insulating substrate 1, to give a potential difference of 200 V between the display electrodes 3a and 3b while the same voltage as applied to the display electrodes 3b (+500 V) was applied to the accessory electrodes 29 (cf. FIG. 11, FIG. 17 and FIGS. 36–38).

As a result, spacers 8 could be disposed only in the gaps between display electrodes 3a and the density of spacers disposed in the gaps between display electrodes 3a, inclusive of those gaps between display electrodes 3a in the vicinity of the periphery of each display area 30, could be rendered uniform within the display area 30.

Furthermore, spacers 8 could be disposed concentratedly in the middle of each gap between display electrodes 3a and the probability of spacers 8 being disposed in the edge portions of the display electrodes 3a could be reduced.

Thereafter, a liquid crystal display device was manufactured in the same manner as in Example 2.

EXAMPLE 9

A common electrode substrate (substrate having a sheet thickness of 0.7 mm with color filters formed thereon; aperture of each of RGB pixels=80×285 $\mu$m, black matrix line width=20 $\mu$m, ITO electrode width=290 $\mu$m, electrode gap distance=15 $\mu$m) for STN type liquid crystal display device production, as shown in FIG. 45, was prepared (after spacer disposition and the subsequent cutting off of the conductor lines, giving a common electrode substrate like the conventional one).

A 0.05-$\mu$m-thick polyimide alignment layer was formed on this substrate and subjected to rubbing treatment.

A spacer sprayer, such as shown in FIG. 71, was used as the sprayer. An antistatic mat having a surface resistance of not more than $10^7$ $\Omega$cm was laid in intimate contact with an earthed conductive stage made of aluminum and disposed in the lower part of the sprayer body, and the substrate was disposed thereon in close contact with the mat. Two connecting terminals for voltage application connected with a voltage application apparatus were provided within the sprayer and wires were introduced into the sprayer so that different direct current voltages might be applied to the transparent electrodes formed on the substrate.

Micropearl BB-6.8 $\mu$m-PH (trademark; product of Sekisui Fine Chemical) particles were prepared as spacers.

Then, the terminals for voltage application were connected with a power source and a voltage of −2.7 kV was applied to each dual conducting part (conducting line (A)) of 2:1 type comb-shaped electrodes and a voltage of −2.8 kV to each other conducting part (conducting line (B)).

Then, the conducting part (conducting line (A)) to which the voltage of −2.7 kV was applied was connected with each dummy electrode by wiring so that all dummy electrodes might have the same electric potential (in FIG. 45, the conducting line (A) was further connected with the dummy electrodes by wiring).

While maintaining this state, the spacers were passed through a stainless steel pipe capable of charging them negatively (−) and sprayed onto the substrate by means of compressed air. That the spacers were negatively charged on that occasion had been confirmed beforehand.

Observation of the substrate with the spacers sprayed thereon under the light microscope revealed that the spacers were disposed at black matrix sites in each gap between the two neighboring electrodes involved therein to which the voltage of −2.7 kV had been applied, uniformly all over the substrate.

Comparative, Example 1

The procedure of Example 9 was followed in the same manner except that no voltage was applied to the dummy electrodes.

Observation of the substrate with the spacers sprayed thereon under the light microscope revealed that the spacers were disposed at black matrix sites in each gap between the two neighboring electrodes involved therein to which the voltage of −2.7 kV had been applied but that there were marked decreases in the number of spacers in the peripheral region from the periphery of each display area to a line about 10 mm inside said periphery.

EXAMPLE 10

The procedure of Example 9 was followed in the same manner except that the substrate used had 2:1 type comb-shaped electrodes each single conducting part (conducting line (B)) of which was connected with the dummy electrodes, as shown in FIG. 44, and that a voltage of −2.7 kV was applied to each dual conducting part (conducting line (A)) of the 2:1 type comb-shaped electrodes, and a voltage of −2.8 kV to each other conducting part (conductor line (B)).

Observation of the substrate with the spacers sprayed thereon under the light microscope revealed that the spacers were disposed at black matrix sites in each gap between the two neighboring electrodes involved therein to which the voltage of −2.7 kV had been applied, uniformly all over the substrate.

EXAMPLE 11

The procedure of Example 9 was followed in the same manner except that the dummy electrodes were connected respectively and a voltage of −2.75 kV was applied thereto using a separate voltage application apparatus.

Observation of the substrate with the spacers sprayed thereon under the light-microscope revealed that the spacers were disposed at black matrix sites in each gap between the two neighboring electrodes involved therein to which the voltage of −2.7 kV had been applied, uniformly all over the substrate.

EXAMPLE 12

A common electrode substrate (substrate having a glass thickness of 0.7 mm with color filters formed thereon; aperture of each of RGB pixels=80×285 $\mu$m, metallic chromium-made black matrix line width=35 $\mu$m, acrylic resin overcoat layer=3.0 $\mu$m, ITO electrode width=290 $\mu$m, electrode gap distance=25 $\mu$m) for STN type liquid crystal display device production was prepared as the substrate.

A 0.05-$\mu$m-thick polyimide alignment layer was formed on this substrate and subjected to rubbing treatment.

The ITO electrodes were formed as shown in FIG. 3.

A spacer sprayer, such as shown in FIG. 71, manufactured by Nisshin Engineering was used as the sprayer. Prepared as the spacers were Micropearl BB, 7.25 $\mu$m-PH (trademark; product of Sekisui Fine Chemical) particles.

An earthed aluminum stage and an aluminum conductive frame were disposed within the sprayer, as shown in FIG. 46. The stage was insulated from the conductive frame by a butyl rubber type resin, and measures were taken so that voltage application might be made to both the ITO display electrodes and dummy electrodes, as shown in FIG. 50. Each probe used had a size sufficient to exert a pressure on several electrodes.

By applying −2.0 kV to the conductive frame by means of a voltage application apparatus, the same voltage of −2.0 kV was applied to the dummy electrodes and ITO display electrodes.

While maintaining the above state, the spacers were sprayed onto the substrate. The spacers were negatively (−) charged upon spraying.

Observation of the substrate with the spacers sprayed thereon under the light microscope revealed that the spacers were disposed in electrode gaps (black matrix sites) and, even in the peripheral display area, they were disposed uniformly.

EXAMPLE 13

The spacers were sprayed in the same manner as in Example 12 except that a substrate having such a structure as shown in FIG. 2 in which the dummy electrode and display electrodes were connected together was used in lieu of the substrate used in Example 12, that the constitution of the stage and conductive frame was as shown in FIG. 46 and that the voltage application from the conductive frame to the dummy electrode was carried out in the manner shown in FIG. 49.

Observation of the substrate with the spacers sprayed thereon under the light microscope revealed that the spacers were disposed in electrode gaps (black matrix sites) and, even in the peripheral display area, they were disposed uniformly.

EXAMPLE 14

The stage and conductive frame were constituted as shown in FIG. 47, a substrate having such an electrode structure as shown in FIG. 2 was used, a terminal derived from a voltage application apparatus was connected with the dummy electrode, and −2.0 kV was applied to the ITO display electrodes and dummy electrode.

Separately, a voltage of −2.7 kV was applied to the conductive frame using another power source. While maintaining this state, the spacers were sprayed as mentioned in Example 12.

Observation of the substrate with the spacers sprayed thereon under the light microscope revealed that the spacers were disposed in electrode gaps (black matrix sites) and, even in the peripheral display area, they were disposed uniformly.

Comparative Example 2

In Example 12, no conductive frame was used and the substrate was disposed directly on the stage so that voltage application might be made only to the ITO display electrodes by means of rod-shaped electrodes. Thus, −2.0 kV was applied thereto. In that state, the spacers were sprayed in the same manner as in Example 12.

Observation of the substrate with the spacers sprayed thereon under the light microscope revealed that the spacers were disposed in electrode gaps in the middle region of the substrate but no spacers were found in the peripheral zone (about 30 mm wide) of the display area.

EXAMPLE 15

A common electrode substrate (substrate having a glass thickness of 0.7 mm with color filters formed thereon; aperture of each of RGB pixels=80×285 $\mu$m, metallic chromium-made black matrix line width=35 $\mu$m, acrylic resin overcoat layer=3.0 $\mu$m, ITO electrode width=290 $\mu$m, electrode gap distance=25 $\mu$m) for STN type liquid crystal display device production was prepared as the substrate.

A 0.05-$\mu$m-thick polyimide alignment layer was formed on this substrate and subjected to rubbing treatment.

The ITO electrodes were formed as shown in FIG. 2 and measures were taken, as shown in FIG. 72, so that a voltage might be applied to all ITO electrodes on the substrate by applying the voltage to the dummy electrode.

A Nisshin Engineering model DISPA-$\mu$R (trademark) sprayer was used as the sprayer and, as shown in FIG. 73, chromium foil sections were provided on a flat vinyl chloride resin plate within the sprayer, the middle section, which was serve as the conductive stage, was earthed, a conductive frame was formed around the same and a terminal derived from a voltage application apparatus was connected with a part thereof so that voltage supply might be made via that terminal.

The positional relations among the substrate, stage and conductive frame were as shown in FIG. 57. Thus, the conductive stage was smaller in size than the substrate but was large enough to reach the inside of the dummy electrode domain (region outside the trimming lines), the conductive frame was formed from within the dummy electrode domain to the outside of the substrate, and the area occupied by the conductive stage and that occupied by the conductive frame within the dummy electrode domain were as follows: [area of conductive stage]>[area of conductive frame]. Further, a state was produced in which the substrate end portion, underside was in contact with the conductive frame.

Prepared as the spacers were Sekisui Fine Chemical's Micropearl BB-PH (trademark), 7.25 µm in particle size.

Then, −2.0 kV was applied to the dummy electrode and ITO electrodes by applying −2.0 kV to the conductive frame by means of a voltage application apparatus and, while maintaining this state, the spacers were sprayed onto the substrate. The negative charging of the spacers had been confirmed beforehand.

Observation of the substrate with the spacers sprayed thereon under the light microscope revealed that the spacers were disposed in electrode gaps, namely at black matrix sites. Furthermore, the spacers were uniformly disposed in the peripheral area of the display area as well.

Thereafter, this substrate was used to complete a liquid crystal display device in the conventional manner. The thus-completed liquid crystal display device showed high contrast owing to the absence of spacers at pixel sites, and showed good display performance characteristics with good display evenness owing to the spacer disposition all over the substrate, unlike the cases of spacer spraying by the conventional methods of liquid crystal display device production.

EXAMPLE 16

The procedure of Example 15 was followed in the same manner except that the conductive stage and conductive frame were made of separate stainless steel plates. The conductive frame was fixed within the sprayer by means of Teflon-made supporting rods, and the conductive stage and the conductive frame were insulated from each other by air.

Observation of the substrate with the spacers sprayed thereon under the light microscope revealed that the spacers were disposed in electrode gaps, namely at black matrix sites. Furthermore, the spacers were uniformly disposed in the peripheral area of the display area as well.

Thereafter, this substrate was used to complete a liquid crystal display device in the conventional manner. The thus-completed liquid crystal display device showed high contrast owing to the absence of spacers at pixel sites, and showed good display performance characteristics with good display evenness owing to the spacer disposition all over the substrate, unlike the cases of spacer spraying by the conventional methods of liquid crystal display device production.

EXAMPLE 17

The procedure of Example 15 was followed in the same manner except that the positional relations among the substrate, stage and conductive frame were as shown in FIG. 58. Thus, the conductive stage was smaller in size than the substrate but sufficiently enough to reach the inside of the dummy electrode domain (region outside the trimming lines), the conductive frame was formed outside the dummy electrode without overlapping with the same and, further, a state was produced in which the substrate end portion underside was in contact with the conductive frame.

Observation of the substrate with the spacers sprayed thereon under the light microscope revealed that the spacers were disposed in electrode gaps, namely at black matrix sites. Furthermore, the spacers were uniformly disposed in the peripheral area of the display area as well.

Thereafter, this substrate was used to complete a liquid crystal display device in the conventional manner. The thus-completed liquid crystal display device showed high contrast owing to the absence of spacers at pixel sites, and showed good display performance characteristics with good display evenness owing to the spacer disposition all over the substrate, unlike the cases of spacer spraying by the conventional methods of liquid crystal display device production.

EXAMPLE 18

The procedure of Example 15 was followed in the same manner except that the black matrix formed on the substrate was made of a resin and that the positional relations among the substrate, stage and conductive frame were as shown in FIG. 60. Thus, the size of the conductive stage was substantially identical with the domain in which the transparent electrodes were present, the conductive frame was formed from a region where there was no transparent electrode and, further, the substrate end portion underside was in contact with the conductive frame.

Observation of the substrate with the spacers sprayed thereon under the light microscope revealed that the spacers were disposed in electrode gaps, namely at black matrix sites. Furthermore, the spacers were uniformly disposed in the peripheral area of the display area as well.

Thereafter, this substrate was used to complete a liquid crystal display device in the conventional manner. The thus-completed liquid crystal display device showed high contrast owing to the absence of spacers at pixel sites, and showed good display performance characteristics with good display evenness owing to the spacer disposition all over the substrate, unlike the cases of spacer spraying by the conventional methods of liquid crystal display device production.

Comparative Example 3

The procedure of Example 16 was followed in the same manner except that the conductive stage was made of stainless steel but the size thereof remained the same and that the conductive frame was removed to give a conductive frame-free state.

Observation of the substrate with the spacers sprayed thereon under the light microscope revealed that the spacers were disposed in electrode gaps in the middle region of the substrate but no spacers were found in the peripheral zone (about 30 mm wide) of the display area.

Thereafter, this substrate was used to complete a liquid crystal display device in the conventional manner. The thus-completed liquid crystal display device showed high contrast display characteristics in the central portion of the substrate but showed display unevenness owing to the fact that the cell thickness had been reduced in the peripheral region of the substrate.

EXAMPLE 19

The procedure of Example 15 was followed in the same manner except that the conductive frame was disposed over an area extending to the display area inside, that the substrate end portion underside was in contact with the conductive frame and that the conductive stage was smaller than the conductive frame.

Observation of the substrate with the spacers sprayed thereon under the light microscope revealed that the spacers were disposed in electrode gaps in small numbers and disposed also on pixels in large numbers.

Thereafter, this substrate was used to complete a liquid crystal display device in the conventional manner. The thus-completed liquid crystal display device was inferior in contrast to that obtained in Example 15.

EXAMPLE 20

A common electrode substrate (substrate having a glass thickness of 0.7 mm with color filters formed thereon; aperture of each of RGB pixels=80×280 μm, resin-made black matrix line width=35 μm, acrylic resin overcoat layer= 3.0 μm, ITO electrode width=290 μm, electrode gap distance=25 μm) for STN type liquid crystal display device production was prepared as the substrate.

A 0.05-μm-thick polyimide alignment layer was formed on this substrate and subjected to rubbing treatment.

The substrate used was a dual panel substrate having two display areas formed on one substrate.

The ITO electrodes were formed to leave a margin of about 10 mm from each edge of the substrate and in a manner such that voltage application to the dummy electrode might result in voltage application to all ITO electrodes on the substrate, as shown in FIG. 2.

A Nisshin Engineering model DISPA-μR (trademark) sprayer, as shown in FIG. 74, was used as the sprayer and, as shown in FIG. 62, the conductive stage was almost identical in size with the ITO electrode domain on the substrate, hence the periphery thereof was about 10 mm inside from each substrate edge.

Sekisui Fine Chemical's Micropearl BB-PH (trademark) particles, 7.25 μm in particle size, were prepared as the spacers.

Then, a direct current source-derived terminal was connected with the dummy electrode on the substrate and −2.0 kV was applied to all ITO electrodes on the substrate and, while maintaining this state, the spacers were sprayed onto the substrate. The negative charging of the spacers had been confirmed beforehand.

Observation of the substrate with the spacers sprayed thereon under the light microscope revealed that the spacers were disposed in electrode gaps, namely at black matrix sites.

Thereafter, this substrate was used to complete a liquid crystal display device in the conventional manner. The thus-completed liquid crystal display device showed high contrast owing to the absence of spacers at pixel sites, and showed good display performance characteristics with good display evenness owing to the spacer disposition all over the substrate, unlike the cases of spacer spraying by the conventional methods of liquid crystal display device production.

EXAMPLE 21

The procedure of Example 20 was followed in the same manner except that a chromium black matrix with a line width of 35 μm was used as the black matrix, and that the conductive stage used had been divided into two parts corresponding to the two display areas on the substrate, respectively, with the periphery of each part being 5 mm inside the black matrix picture frame.

Observation of the substrate with the spacers sprayed thereon under the light microscope revealed that the spacers were disposed in electrode gaps, namely at black matrix sites.

Thereafter, this substrate was used to complete a liquid crystal display device in the conventional manner. The thus-completed liquid crystal display device showed high contrast owing to the absence of spacers at pixel sites, and showed good display performance characteristics with good display evenness owing to the spacer disposition all over the substrate, unlike the cases of spacer spraying by the conventional methods of liquid crystal display device production.

Comparative Example 4

Spacer spraying was carried out in the same manner as in Example 20 except that the conductive stage used had a size greater by 50 mm than the substrate.

Observation of the substrate with the spacers sprayed thereon under the light microscope revealed that the spacers were disposed in electrode gaps, namely at black matrix sites, but few spacers were found in the peripheral zone (about 30 mm wide) of the display area.

Thereafter, this substrate was used to complete a liquid crystal display device in the conventional manner. The thus-completed liquid crystal display device showed high contrast and good display characteristics in the central portion of the display area but, in the peripheral region of the display area showed display unevenness because of a reduced cell thickness owing to the absence of spacers.

EXAMPLE 22

Spacer spraying was carried out in the same manner as in Example 21 except that the conductive stage used had a size of 40%, 30% or 20% of the display area.

After observation of the substrates with the spacers sprayed thereon under the light microscope, these substrates were used to complete liquid crystal display devices in the conventional manner.

When the conductive stage having a size of 40% of the display area was used, the spacers were disposed in electrode gaps, namely at black matrix sites, like in Example 21, and the liquid crystal display device completed showed high contrast owing to the absence of spacers at pixel sites and had good display performance characteristics with display evenness owing to the spacer disposition all over the display area.

When the conductive stage having a size of 30% of the display area was used, some spacers were disposed in pixel sites but the liquid crystal display device completed showed little influence on the contrast and showed high contrast since the number of spacers disposed in the pixel sites was small.

When the conductive stage having a size of 20% of the display area was used, the spacers were disposed almost randomly on the display area and the liquid crystal display device completed showed no improvement in contrast.

EXAMPLE 23

Using a particle sprayer as shown in FIGS. 64–67, a substrate 1 onto which spacers were to be sprayed was first fed onto the conductive stage 15. For feeding the substrate 1, the substrate 1 was taken out of a substrate stock site (not shown) by means of arms 32a of a robot mechanism 32 and, at the same time, a drive mechanism 31 ascended and raised the push-up pins 36 and conductive frame 34 for producing a gap for insertion of the substrate 1 between the push-up pins 36 and conductive frame 34.

Then, the lid 10a of an opening provided at a chamber 10 site facing the robot mechanism 32 was opened and the arms 32a of the robot mechanism 32 were inserted into the chamber and further advanced to insert the substrate 1 between the push-up pins 36 and conductive frame 34. Thereafter, the push-up pins 36 and conductive frame 34 descended, whereby the substrate 1 was fed onto and disposed on the conductive stage 15. The conductive frame 34 further descended and was disposed and held on the conductive stage 15.

On that occasion, the probe 35 also descended with the conductive frame 34 and the tip of the probe 35 contacted with the transparent electrodes 3 on the substrate 1 and thus the preparation for voltage application to the conductive frame 34 and to the transparent electrodes 3 on the substrate 1 was completed. Then, a voltage of +1 kV was gradually applied to the conductive frame 34 and to the transparent electrodes 3 on the substrate 1. (Sudden application of a high voltage is undesirable since such a trouble as dielectric breakdown of the transparent electrodes 3 may be caused.)

Since, on that occasion, the conductive stage 15 was earthed, as shown in FIG. 64, and the substrate 1 was formed from an insulating material, the substrate 1 was attracted by and fixed on the conductive stage 15 by the static electricity generated between the substrate 1 and conductive stage 15. If necessary, the substrate 1 may be positioned on a predetermined location on the conductive stage 15 by using positioning pins or the like.

And, spacers were charged positively and sprayed from the nozzle 11a. As a result, as shown in FIG. 68, the spacers were sprayed concentratedly into the gaps between transparent electrodes 3 and the gaps between the conductive frame 34 and transparent electrodes 3.

The voltage being applied to the substrate 1 with the spacers disposed thereon in the above manner only in the electrode gaps and the gaps between the conductive frame 34 and electrodes 3 was gradually lowered again, and the substrate 1 was taken out to a finished goods stock site by the robot mechanism 32 (this time, the procedure of feeding the substrate 1 was reversed).

INDUSTRIAL APPLICABILITY

The method of spraying particles according to the present invention, which is constituted as mentioned above, makes it possible to dispose a predetermined quantity of particles in desired positions, to dispose spacers in electrode gaps in liquid crystal display devices without sacrificing the aperture ratio and, further, to properly dispose spacers in electrode gaps in the peripheral region of the display area as well by applying a voltage to an electrode or electrodes outside the display area.

The method of liquid crystal display production according to the invention, which is constituted as mentioned above, makes it possible, in conducting the method for producing a liquid crystal display device comprising disposing charged spacers in electrode gaps while applying a voltage to the transparent electrodes, to dispose spacers selectively only in predetermined transparent electrode gaps among neighboring transparent electrode gaps, namely at black matrix sites, even in the case of stripe-shaped transparent electrodes such as employed in STN type liquid crystal display devices, and to control the spacer disposition density in the vicinity of the peripheral portions of the display area as well as in the middle part of the display area, whereby it becomes possible to make the spacer disposition density uniform within the display area and thus provide liquid crystal display devices improved in contrast while preventing light leakage through spacers, without sacrificing the aperture ratio.

Further, since spacers can be disposed all over the substrate, the liquid crystal display device produced therefrom can have a uniform cell thickness and high quality display performance characteristics without display unevenness. Furthermore, spacers can be sprayed at predetermined sites other than electrode sites without the need of providing, outside the display area, a dummy electrode or electrodes sufficiently larger than the area of spacer spraying.

Furthermore, the liquid crystal display device according to the invention, which is constituted as mentioned above, has a uniform cell thickness and high quality display performance characteristics without display unevenness.

What is claimed is:

1. A method for producing a liquid crystal display device comprising
   spraying spacers onto at least one of a first substrate comprising at least pattern-forming transparent electrodes and having at least one display area and a second substrate to be disposed oppositely above the first substrate
   and filling a liquid crystal into the space between both the substrates,
   wherein, in providing accessory electrodes outside the display area and spraying positively or negatively charged spacers onto the substrate, two or more voltages differing in voltage value are applied to respective transparent electrodes and a voltage is applied to the accessory electrodes as well to thereby control the electric field generated above the transparent electrodes and above the accessory electrodes so as to cause selective spacer disposition only in a predetermined transparent electrode gap among the gaps between respective neighboring transparent electrodes.

2. The method for producing a liquid crystal display device according to claim 1,
   wherein the predetermined transparent electrode gap in which spacers are to be disposed selectively is provided between the respective transparent electrodes to which one and the same voltage is applied.

3. The method for producing a liquid crystal display device according to claim 2,
   wherein, when the spacers are positively charged, the predetermined transparent electrode gap in which spacers are to be disposed selectively is provided between the respective transparent electrodes to which the lowest of the two or more voltages differing in value applied to the transparent electrodes is applied
   and, when the spacers are negatively charged, the electrode gap is provided between the respective transparent electrodes to which the highest of the two or more voltages differing in value applied to the transparent electrodes is applied.

4. The method for producing a liquid crystal display device according to claim 3,
   wherein the two or more voltages differing in voltage value which are applied to the transparent electrodes have the same polarity as the polarity of the voltage for charging spacers.

5. The method for producing a liquid crystal display device according to claim 1, wherein the polarity of the voltage applied to the accessory electrodes is selected so that a repulsive force may be exerted on the spacers, when the electric field as formed above the whole region which comprises the transparent electrodes, exerts a repulsive force on the spacers, and the polarity of the voltage applied to the accessory electrodes is selected so that an attractive force may be exerted on the spacers, when the electric field as formed above the whole region which comprises the transparent electrodes exerts an attractive force on the spacers.

6. The method for producing a liquid crystal display device according to claim 5, wherein the voltage applied to the accessory electrodes is identical with the voltage exerting the greatest repulsive or attractive force on the spacers among the two or more voltages differing in voltage value as applied to the transparent electrode.

7. The method for producing a liquid crystal display device according to claim 1, wherein the transparent electrodes are stripe-shaped, and the accessory electrodes are disposed in parallel with the longer sides of the transparent electrodes.

8. The method for producing a liquid crystal display device according to claim 1, wherein the accessory electrodes are provided in almost the same electrode pattern as the transparent electrodes.

9. The method for producing a liquid crystal display device according to claim 1, wherein the accessory electrodes are dummy electrodes provided for reducing the transparent electrode-due level difference.

10. The method for producing a liquid crystal display device according to claim 1, wherein the accessory electrodes are dummy electrodes not applying display voltage thereto.

11. A method for producing a liquid crystal display device comprising spraying spacers onto at least one of a first substrate comprising at least pattern-forming transparent electrodes and a dummy electrode and a second substrate to be disposed oppositely above the first substrate and filling a liquid crystal into the space between both the substrates, wherein, in spraying positively or negatively charged spacers onto the substrate, two or more voltages differing in voltage value are applied to respective transparent electrodes and the dummy electrode as well, the predetermined transparent electrode gaps in which spacers are to be selectively disposed are provided between respective two neighboring transparent electrodes, the number of transparent electrodes is even, and the two or more voltages differing in value are applied in a manner such that when the spacer charge polarity is positive (+), the lowest of the two or more voltages differing in value is applied to the respective two neighboring transparent electrodes between which spacers are to be disposed in the middle, and when the spacer charge polarity is negative (−), the highest of the two or more voltages differing in value is applied to the respective two neighboring transparent electrodes between which spacers are to be disposed in the middle.

12. The method for producing a liquid crystal display device according to claim 11, wherein the voltage applied to a dummy electrode is within the range of the highest and lowest voltages among the two or more voltages differing in voltage as applied to the transparent electrodes.

13. The method for producing a liquid crystal display device according to claim 11, wherein, the cases where the spacer charge polarity is negative (−), the voltage application to the transparent electrodes is carried out by providing a common conductor line (A) connected with one of the two ends of each transparent electrode to which the highest voltage is to be applied, and applying the highest voltage by means of the conductor line (A), while providing a common conductor line (B) connected with one end, on the opposite side of the one end mentioned above, of the two ends of each transparent electrode to which a lower voltage is to be applied, and applying the voltage by means of the conductor line (B)

and, the cases where the spacer charge polarity is negative (+), the voltage application to the transparent electrodes is carried out by providing a common conductor line (A) connected with one of the two ends of each transparent electrode to which the lowest voltage is to be applied and applying the voltage by means of the conductor line (A), while providing a common conductor line (B) connected with one end, on the opposite side of the one end mentioned above, of the two ends of each transparent electrode to which a higher voltage is to be applied and applying the higher voltage by means of the conductor line (B).

14. The method for producing a liquid crystal display device according to claim 13, wherein the voltage application to a dummy electrode is carried out by connecting the dummy electrode with either the conductor line (A) or the conductor line (B).

15. The method for producing a liquid crystal display device according to claim 11, wherein the voltage application to dummy electrodes is carried out by connecting all dummy electrodes formed on the substrate with one another.

16. A method for producing a liquid crystal display device comprising spraying spacers onto at least one of a first substrate comprising at least pattern-forming transparent electrodes and a dummy electrode and a second substrate to be disposed oppositely above the first substrate and filling a liquid crystal into the space between both the substrates, wherein, in spraying positively or negatively charged spacers onto the substrate, the substrate is disposed in close contact with an earthed conductive stage, and a conductor is provided in a state electrically insulated from the conductive stage, said conductor being a conductive frame having an opening, said conductor frame being disposed on the periphery of the substrate with or without partial overlapping with the substrate periphery, and wherein a voltage is applied to the transparent electrodes and the conductive frame to prevent particles from being turned out of the area comprising the pattern-forming transparent electrodes.

17. The method for producing a liquid crystal display device according to claim 16, wherein the substrate has a transparent electrode as well as a dummy electrode and, in spraying positively or negatively charged spacers onto the substrate, a voltage is applied to the transparent electrodes, the dummy electrode, and to a conductive frame.

18. The method for producing a liquid crystal display device according to claim 17,
wherein the dummy electrode are connected with the transparent electrodes
and the voltage application to the dummy electrode is carried out via the conductive frame.

19. The method for producing a liquid crystal display device according to claim 18,
wherein the voltage applied to the conductive frame is different from the voltage applied to the transparent electrodes.

20. A method for producing a liquid crystal display device comprising
spraying spacers onto at least one of a first substrate comprising at least pattern-forming transparent electrodes and an alignment layer and having at least one display area and a second substrate to be disposed opposedly above the first substrate
and filling a liquid crystal into the space between both the substrates,
wherein, in spraying positively or negatively charged spacers onto the substrate, the substrate is disposed in close contact with an earthed conductive stage,
a voltage having the same polarity as the spacer charge polarity is applied to the transparent electrodes on the substrate,
a conductor is provided, outside the display area, in a state electrically isolated from the conductive stage,
and a voltage having the same polarity as the polarity of the voltage applied to the transparent electrodes is applied to the conductor to thereby form almost the same electric field within and without the substrate to prevent particles from being turned out of the area comprising the pattern-forming transparent electrodes.

21. The method for producing a liquid crystal display device according to claim 20,
wherein the conductor is larger in outermost size than the substrate, and is a conductive frame having an opening not greater than the substrate size,
said conductive frame being disposed with or without overlapping with the periphery of the substrate,
and wherein a voltage of the same polarity as that applied to the transparent electrodes is applied to the conductive frame to prevent particles from being turned out of the area comprising the pattern-forming transparent electrodes.

22. The method for producing a liquid crystal display device according to claim 20, wherein the conductive stage has a size not greater than the substrate size but extending to the area outside the parting lines
and the upper surface of the conductive frame is disposed on the almost same plane as the conductive stage surface or at a level lower than the same.

23. The method for producing a liquid crystal display device according to claim 20, wherein the conductive stage has a size not greater than the substrate size but extending to the area outside the parting lines,
the conductive frame is formed so as to extend from the area outside the parting lines to the outside of the substrate,
and the area occupied by the conductive stage and that by the conductive frame in the area outside the parting lines satisfies the relation:
[area occupied by conductive stage]>[area occupied by conductive frame].

24. The method for producing a liquid crystal display device according to claim 20, wherein the conductive stage has a size not greater than the substrate size but extending to the area outside the parting lines
and the conductive frame is formed outside the transparent electrodes without any overlapping with the area outside the parting lines.

25. The method for producing a liquid crystal display device according to claim 20, wherein the conductive stage is substantially identical in size with the range of occurrence of the transparent electrodes
and the conductive frame is formed by areas where no transparent electrodes are present.

26. A method for producing a liquid crystal display device comprising
spraying spacers onto at least one of a first substrate comprising at least pattern-forming transparent electrodes and an alignment layer and having one or more display areas and a second substrate to be disposed opposedly above the first substrate
and filling a liquid crystal into the space between both the substrates,
wherein, in spraying positively or negatively charged spacers onto the substrate, the substrate is disposed in close contact with an earthed conductive stage smaller in size than the substrate to allow the substrate periphery to be apart from the conductive stage,
and a voltage of the same polarity as the spacer charge polarity is applied to the transparent electrodes on the substrate.

27. The method for producing a liquid crystal display device according to claim 26,
wherein the substrate onto which spacers are to be sprayed has a black matrix formed thereon,
the black matrix is conductive,
and the conductive stage comprises one or more units each smaller in size than the picture frame periphery of the black matrix of each display area on the substrate.

28. The method for producing a liquid crystal display device according to claim 26, wherein the area of contact between the conductive stage and the substrate is not less than 30% of the display area area.

* * * * *

UNITED STATES PATENT AND TRADEMARK OFFICE
CERTIFICATE OF CORRECTION

PATENT NO. : 6,930,746 B2 Page 1 of 1
APPLICATION NO. : 10/459523
DATED : August 16, 2005
INVENTOR(S) : Kazuya Yoshimura et al.

It is certified that error appears in the above-identified patent and that said Letters Patent is hereby corrected as shown below:

Title Page (73) Assignees:
The Assignee should read Sekisui Chemical Co., Ltd.

In the Claims
Claim 13, column 62, line 16 should read: and , the cases where the space charge polarity is ~~negative~~ positive Signed and Sealed this Fourteenth Day of November, 2006

JON W. DUDAS
*Director of the United States Patent and Trademark Office*